US012725313B2

(12) United States Patent
King

(10) Patent No.: US 12,725,313 B2
(45) **Date of Patent: *Sep. 1, 2026**

(54) DECODING A COMPRESSED DATA STRUCTURE ENCODING A SET OF HAAR COEFFICIENTS FOR A QUAD OF PIXELS

(71) Applicant: Imagination Technologies Limited, Kings Langley (GB)

(72) Inventor: Rostam King, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 114 days.

This patent is subject to a terminal disclaimer.

(21) Appl. No.: 18/772,164

(22) Filed: Jul. 13, 2024

(65) Prior Publication Data

US 2024/0371044 A1 Nov. 7, 2024

Related U.S. Application Data

(63) Continuation of application No. 17/870,623, filed on Jul. 21, 2022, now Pat. No. 12,073,593.

(30) Foreign Application Priority Data

Jul. 22, 2021 (GB) ..................................... 2110587

(51) Int. Cl.
*G06T 9/00* (2006.01)
*G06T 15/04* (2011.01)

(52) U.S. Cl.
CPC ................ *G06T 9/00* (2013.01); *G06T 15/04* (2013.01)

(58) Field of Classification Search
CPC ......... G06T 9/00; G06T 15/04; H04N 19/635; H04N 19/48; H04N 19/90; H04N 19/82
See application file for complete search history.

(56) References Cited

U.S. PATENT DOCUMENTS 5,590,222 A 12/1996 Kojima
6,751,363 B1 6/2004 Natsev et al.
(Continued)

FOREIGN PATENT DOCUMENTS

CN 1857001 A 11/2006
CN 104904207 A 9/2015
(Continued)

OTHER PUBLICATIONS

Hemalatha et al, "Image compression using HAAR discrete wavelet transform," 5th International Conference On Devices, Circuits and Systems (ICDCS), 2020, pp. 271-274.
(Continued)

*Primary Examiner* — Phi Hoang
(74) *Attorney, Agent, or Firm* — Potomac Law Group, PLLC; Vincent M DeLuca

(57) ABSTRACT

A compressed data structure that encodes a set of Haar coefficients for a 2×2 quad of pixels of a block of pixels is decoded. The set of Haar coefficients comprises differential coefficients and an average coefficient. A first portion of the compressed data structure encodes the differential coefficients for the 2×2 quad of pixels. A second portion of the compressed data structure encodes the average coefficient for the 2×2 quad of pixels. The first portion is used to determine signs and exponents differential coefficients which are non-zero. The second portion is used to determine a representation of the average coefficient. The result of a weighted sum of the differential coefficients and the average coefficient for the 2×2 quad of pixels is determined using: (i) the determined signs and exponents for the differential coefficients which are non-zero, (ii) the determined representation of the average coefficient, and (iii) respective weights for the differential coefficients. The determined result is used to determine the decoded value.

20 Claims, 15 Drawing Sheets

(56) References Cited

U.S. PATENT DOCUMENTS

| | | | | |
|---|---|---|---|---|
| 9,743,101 | B1 | 8/2017 | Kumakura et al. | |
| 11,122,290 | B2 | 9/2021 | Jang et al. | |
| 2004/0218825 | A1 | 11/2004 | Graffagnino | |
| 2005/0249422 | A1 | 11/2005 | Nakajima | |
| 2007/0083578 | A1* | 4/2007 | Chen ...................... | H04N 19/48 708/203 |
| 2009/0116685 | A1 | 5/2009 | Yoo et al. | |
| 2010/0220783 | A1 | 9/2010 | Mallat et al. | |
| 2011/0099295 | A1 | 4/2011 | Wegener | |
| 2015/0010062 | A1* | 1/2015 | Gokhale .............. | H04N 19/117 375/240.03 |
| 2016/0196804 | A1 | 7/2016 | Skinner et al. | |
| 2017/0140079 | A1 | 5/2017 | Gentilhomme | |
| 2017/0221182 | A1 | 8/2017 | Cawley et al. | |
| 2017/0340212 | A1 | 11/2017 | Lin et al. | |
| 2018/0332289 | A1 | 11/2018 | Huang | |
| 2019/0349587 | A1 | 11/2019 | Jang et al. | |
| 2019/0370965 | A1 | 12/2019 | Lay et al. | |
| 2019/0387241 | A1 | 12/2019 | Kim et al. | |
| 2020/0013420 | A1 | 1/2020 | Wallace et al. | |
| 2020/0068195 | A1 | 2/2020 | Yoo et al. | |
| 2020/0177901 | A1 | 6/2020 | Choi et al. | |
| 2020/0177921 | A1 | 6/2020 | Koo | |
| 2020/0374531 | A1 | 11/2020 | Zhao et al. | |
| 2021/0014534 | A1 | 1/2021 | Koo et al. | |
| 2021/0144376 | A1 | 5/2021 | Tsukuba | |
| 2021/0211729 | A1 | 7/2021 | Koo et al. | |
| 2021/0218996 | A1 | 7/2021 | Koo et al. | |
| 2022/0303542 | A1 | 9/2022 | Paluri et al. | |

FOREIGN PATENT DOCUMENTS

| | | | |
|---|---|---|---|
| CN | 108028930 | A | 5/2018 |
| EP | 0905979 | A2 | 3/1999 |
| EP | 3618436 | A1 | 3/2020 |

OTHER PUBLICATIONS

Singh H et al, "Satellite image enhancement using beta wavelet based gamma corrected adaptive knee Transformation," International Conference on Communication and Signal Processing (ICCSP), • 016, pp. 128-132.

Welk et al, "Locally analytic schemes: A link between diffusion filtering and wavelet shrinkage," Applied and Computational Harmonic Analysis, vol. 24, 2007, pp. 195-224.

* cited by examiner

DECODING A COMPRESSED DATA STRUCTURE ENCODING A SET OF HAAR COEFFICIENTS FOR A QUAD OF PIXELS

CROSS-REFERENCE TO RELATED APPLICATIONS AND CLAIM OF PRIORITY

This application is a continuation under 35 U.S.C. 120 of copending application Ser. No. 17/870,623 filed Jul. 21, 2022, now U.S. Pat. No. 12,073,593, which claims foreign priority under 35 U.S.C. 119 from United Kingdom Application No. 2110587.9 filed Jul. 22, 2021, the contents of which are incorporated by reference herein in their entirety.

FIELD

The present disclosure relates to techniques for encoding and/or decoding blocks of pixels, e.g. textures or other images, within a computer graphics system.

BACKGROUND

In computer graphics, texturing is frequently used to add surface detail to objects within a scene to be rendered. Textures are typically stored as images, which are accessed to return a colour value for a pixel being processed. To obtain a texture colour value for a pixel, the values of multiple texels of the texture may be sampled, and the sampled texel values may then be filtered to obtain a final texture value for the pixel.

Typically a single pixel of an image being rendered does not map exactly to a single texel of the texture due to the projection of the texture onto 3D geometry within the image. For example, for textured pixels depicting a relatively close view of the texture, each pixel may be associated with a footprint which maps onto a relatively small region of a texture, e.g. covering zero or one texel, whereas for textured pixels depicting a relatively far view of the texture, each pixel may be associated with a footprint which maps onto a relatively large region of a texture, e.g. covering many (e.g. two or more) texels.

In some situations, anisotropic texture filtering may be performed. Anisotropic texture filtering recognises that the sampling rate of the texture, which depends on the mapping from screen-space (in which the image is depicted and the pixel coordinates defined) to texture space (in which the texture is depicted and the texel coordinates defined), is a function of the direction of travel in screen space. In other words, the optimal texture sampling rate may be different along different directions of travel, or axes, in screen space. When this is the case, the mapping between screen space and texture space may be said to be anisotropic. An example of an anisotropic mapping is the 3D projection of planar texture surfaces near the horizon, or any other situation in which a texture is applied to a surface in the scene which is significantly angled away from the viewpoint.

For anisotropic texture mappings, a sampling kernel in texture space mapped to a pixel in screen space is elongated along a certain axis in texture space, with the direction of this axis being dependent on the mapping between screen space and texture space. This is illustrated schematically in FIG. 1, which shows an image 100 formed of pixels having coordinates defined in image space, and a texture 102 formed of texels having coordinates defined in texel space. Image 100 includes an object 104 having surface detail specified by the texture 102, i.e. the texture 102 is mapped to the surface of the object 104. Remaining objects within the image 100 have been omitted for the purposes of clarity. Object 104 is at an oblique viewing angle within the image 100. As mentioned above, if a texture is applied to geometry which is at an oblique angle relative to the viewing direction, then an isotropic footprint for a pixel in image space maps to an anisotropic footprint in texture space. Consequently, the shape of the footprint of a texture-mapped pixel within the image 100 is not maintained in the mapping to texture space. Numeral 106 denotes the pixel footprint in image space, which is circular, and numeral 108 denotes the corresponding pixel footprint in texel space. It can be seen that the footprint has been elongated in texture space to form an ellipse such that it is anisotropic. In general, the mapping of a pixel with a circular footprint in image space to texture space can be approximated by an ellipse, insofar as the texture mapping itself can be approximated by an affine mapping at the pixel's origin. Here, it is noted that the term 'footprint' as used with respect to pixels does not necessarily refer to the physical shape of the pixel in a display device, but may refer to the area of a pixel filter used to construct the final pixel value for that pixel. The pixel's footprint in texture space may therefore be said to be equivalent to the sampling kernel in texture space for the pixel; i.e. the footprint in texture space identifies the texels to be sampled and filtered to form the texture colour value for the pixel.

As mentioned above, textures are typically represented as images, which are stored in a memory so that when a graphics processing unit intends to apply a texture to geometry in a scene being rendered, a portion of the texture can be retrieved from the memory and filtered in order to determine textured values on the geometry. In order to reduce the amount of data that needs to be stored in the memory and transferred to and from the memory (i.e. the "memory bandwidth") the texture data can be encoded (i.e. compressed) before it is stored in the memory. In this case, the graphics processing unit can fetch encoded texture data and then decode (i.e. decompress) the encoded texture data before applying it to geometry.

It is generally considered acceptable for the texture encoding and decoding process to be a lossy process, i.e. when a texture is encoded and then decoded, some information may be lost. By allowing the texture encoding and decoding process to be lossy, the textures can be compressed to greater extents such that the memory storage and memory bandwidth requirements can be reduced. There are generally three competing aims for the encoding/decoding process: (i) it is beneficial for the amount of data used to represent the encoded texture to be reduced, (ii) it is beneficial for any artefacts introduced by the encoding and decoding process to be minimal, and (iii) it is beneficial for the encoding and decoding processes to be cheap to implement (e.g. in terms of processing latency, power consumption and/or silicon area). Typically, improving one of these three factors will be to the detriment of one or both of the other factors. When combined with texture filtering, these costs may be compounded. For example, high quality texture filtering (such as would minimise sampling artefacts) is typically expensive, both in terms of memory bandwidth and throughput requirements.

Another context in which it is useful to encode and/or decode blocks of pixels is for compressing images, e.g. for compressing images that have been rendered by a graphics processing unit (GPU). This process may be referred to as frame buffer compression and/or frame buffer decompression. Compressing images reduces the amount of data that is used to represent those images, which can be useful in terms of reducing the amount of memory that is used to store the images and in terms of reducing the amount of data that is transferred from a processing unit (e.g. a GPU) to a memory. This can lead to reductions in latency, power consumption and silicon area. With a frame buffer compression/decompression technique filtering tends not to be applied, and normally the decompressed values are intended to be similar to (or exactly the same as) the original values prior to being compressed. For example, if the compression/decompression technique is lossless then the decompressed values will be the same as the original values prior to compression, whereas if the compression/decompression technique is lossy then the decompressed values might not be exactly the same as (but they are an approximate representation of) the original values prior to compression.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of decoding a compressed data structure to determine a decoded value, wherein the compressed data structure encodes a set of Haar coefficients for a 2×2 quad of pixels of a block of pixels, wherein the set of Haar coefficients comprises a plurality of differential coefficients and an average coefficient,

- wherein a first portion of the compressed data structure encodes the differential coefficients for the 2×2 quad of pixels and comprises: (i) a first set of bits which indicates an order of the magnitudes of the differential coefficients, and (ii) a second set of bits which indicates a sign and an exponent for each of one or more of the differential coefficients which are non-zero,
- wherein a second portion of the compressed data structure encodes the average coefficient for the 2×2 quad of pixels,
- wherein the method comprises:
  - using the first portion of the compressed data structure to determine signs and exponents for said one or more of the differential coefficients which are non-zero;
  - using the second portion of the compressed data structure to determine a representation of the average coefficient;
  - determining the result of a weighted sum of the differential coefficients and the average coefficient for the 2×2 quad of pixels using: (i) the determined signs and exponents for said one or more of the differential coefficients which are non-zero, (ii) the determined representation of the average coefficient, and (iii) respective weights for the differential coefficients;
  - using the determined result to determine the decoded value; and
  - outputting the determined decoded value.

Said determining the result of a weighted sum of the differential coefficients and the average coefficient for the 2×2 quad of pixels may comprise:

- performing a binary shift of the weights in accordance with the determined exponents for the respective one or more of the differential coefficients which are non-zero; and
- summing the determined representation of the average coefficient and the shifted weights in accordance with the determined signs for the respective one or more of the differential coefficients which are non-zero.

Said determining the result of a weighted sum of the differential coefficients and the average coefficient for the 2×2 quad of pixels might not involve performing any multiplication or division operations.

Determining the result of the weighted sum of the differential coefficients and the average coefficient for the 2×2 quad of pixels may comprise adding a gamma correction term.

The respective weights for the differential coefficients may be predetermined, and wherein said using the determined result to determine the decoded value may comprise using said determined result as the decoded value representing a value at a pixel position of the 2×2 quad of pixels.

The steps of determining the result of a weighted sum of the differential coefficients and the average coefficient for the 2×2 quad of pixels and using the determined result to determine the decoded value may be performed four times for the respective four pixels of the 2×2 quad of pixels, wherein the predetermined weights for the differential coefficients may be different in each of the times that said steps are performed so that four decoded values representing values at the four pixel positions of the 2×2 quad of pixels are determined.

The method may further comprise determining the respective weights for the differential coefficients.

The weights may be determined based on one or more of:

- a position, relative to the 2×2 quad of pixels, that the decoded value is to be determined;
- an indication of a level of detail to be provided by the decoded value; and
- an indication of an amount and/or direction of anisotropy to be provided by the decoded value.

The block of pixels may be a 4×4 block of pixels comprising four 2×2 quads of pixels, wherein for each of the four 2×2 quads of pixels a result of a weighted sum of the differential coefficients and the average coefficient for that 2×2 quad of pixels may be determined, and wherein the four determined results for the respective four 2×2 quads of pixels may be combined to determine the decoded value for the block of pixels.

The four determined results for the respective four 2×2 quads of pixels may be combined to determine the decoded value for the block of pixels by performing bilinear interpolation on the four determined results.

If a position at which the decoded value is to be determined is within an area that is representable by considering the pixels of a single one of the 2×2 quads of pixels in the block of pixels then the decoded value for the block of pixels may be equal to the determined result for that single 2×2 quad of pixels.

If a position at which the decoded value is to be determined is not within an area that is representable by considering the pixels of a single one of the 2×2 quads of pixels in the block of pixels then the decoded value for the block of pixels may be the result of a weighted sum of two or more of the determined results for the 2×2 quads of pixels.

Said determining the respective weights for the differential coefficients may comprise:

- determining initial weights based on an indication of a level of detail to be provided by the decoded value, an indication of an amount of anisotropy and an indication of a direction of anisotropy; and
- multiplying the determined initial weights by respective transfer functions to determine the weights for the differential coefficients, wherein each of the transfer functions is based on a position, relative to the 2×2 quad of pixels, that the decoded value is to be determined, and wherein each of the transfer functions: (i) is zero at the centre of the 2×2 quad of pixels, (ii) has a magnitude of one at each of the pixel positions of the 2×2 quad of pixels, and (iii) is extrapolated out to the edges of the area represented by the 2×2 quad of pixels.

Beyond edges of the area represented by a 2×2 quad of pixels, the transfer functions may be clamped to their values on the nearest edge of said area.

The pixels within the 4×4 block of pixels may be selectively mirrored about neither, one or both of: (i) a horizontal axis passing through the centre of the block of pixels, and (ii) a vertical axis passing through the centre of the block of pixels, so that the position at which the decoded value is to be determined is within a particular quadrant of the block of pixels.

The first set of bits may further indicate how many of the differential coefficients are non-zero.

The second set of bits may comprise:

a first section which indicates a sign for each of said one or more of the differential coefficients which are non-zero; and a second section which indicates an exponent for each of said one or more of the differential coefficients which are non-zero.

If one or more of the differential coefficients are zero, the first section may indicate a mantissa bit for the differential coefficient which has the largest magnitude, wherein said determining the result of a weighted sum of the differential coefficients and the average coefficient for the 2×2 quad of pixels may comprise including two terms in the weighted sum for the differential coefficient which has the largest magnitude, the two terms being: (i) the weight for that differential coefficient shifted in accordance with the exponent for that differential coefficient, and (ii) the weight for that differential coefficient shifted in accordance with an amount that is one less than the exponent for that differential coefficient.

The second set of bits may comprise a single section which indicates a sign and an exponent for each of the one or more of the differential coefficients which are non-zero.

If the differential coefficients are non-zero and are not all equal, the compressed data structure might not indicate any mantissa bits for the differential coefficients.

The plurality of differential coefficients for a 2×2 quad of pixels may comprise three directional differential coefficients, respectively indicating a horizontal differential, a vertical differential and a diagonal differential in the 2×2 quad of pixels.

The second portion of the compressed data structure may comprise bits representing the value of the average coefficient determined for the 2×2 quad of pixels.

Each pixel in the block of pixels may have a value in a plurality of channels, and wherein the encoded differential coefficients of the Haar coefficients for the 2×2 quad of pixels in the compressed data structure may represent a combination of differential channel coefficients determined for the respective channels, wherein said using the first portion of the compressed data structure to determine signs and exponents for said one or more of the differential coefficients which are non-zero may comprise determining signs and exponents for one or more differential channel coefficients for each of the channels.

The number of differential channel coefficients for each of the channels may be the same as the number of differential coefficients of the Haar coefficients that are determined for the 2×2 quad of pixels.

A third portion of the compressed data structure may indicate a combining mode, from a set of predetermined combining modes, according to which the differential channel coefficients determined for the channels are combined to determine the encoded differential coefficients of the Haar coefficients for the 2×2 quad of pixels, wherein the method may comprise identifying the combining mode using the third portion of the compressed data structure and using the identified combining mode to determine the differential channel coefficients for each of the channels.

Said plurality of channels may comprise Red, Green and Blue channels. Each pixel in the block of pixels may have a further value in an Alpha channel, wherein the method may further comprise decoding the alpha channel separately to the Red, Green and Blue channels.

The block of pixels may be a 4×4 block of pixels comprising four 2×2 quads of pixels, wherein the compressed data structure may comprise a first portion for each of the 2×2 quads of pixels which is determined using differential coefficients for that 2×2 quad of pixels;

wherein the second portion of the compressed data structure may encode a set of L1 Haar coefficients for a 2×2 quad of coefficients represented by the average coefficients for each of the 2×2 quads of pixels, wherein the set of L1 Haar coefficients may comprise a plurality of L1 differential coefficients and an L1 average coefficient, wherein a first sub-portion of the second portion of the compressed data structure may encode the L1 differential coefficients for the 2×2 quad of coefficients and may comprise: (i) a first set of bits which indicates an order of the magnitudes of the L1 differential coefficients, and (ii) a second set of bits which indicates a sign and an exponent for each of one or more of the L1 differential coefficients which are non-zero, wherein a second sub-portion of the second portion of the compressed data structure may encode the L1 average coefficient for the 2×2 quad of coefficients, wherein the method may comprise:

using the first portion of the compressed data structure for each of the 2×2 quads of pixels to determine signs and exponents for one or more of the differential coefficients which are non-zero for each of the 2×2 quads of pixels; and using the second portion of the compressed data structure to determine representations of the average coefficients for each of the 2×2 quads of pixels by:

using the first sub-portion of the second portion of the compressed data structure to determine signs and exponents for said one or more of the L1 differential coefficients which are non-zero;

using the second sub-portion of the second portion of the compressed data structure to determine a representation of the L1 average coefficient for the 2×2 quad of coefficients; and determining the result of a weighted sum of the L1 differential coefficients and the L1 average coefficient for the 2×2 quad of coefficients using: (i) the determined signs and exponents for said one or more of the L1 differential coefficients which are non-zero, (ii) the determined representation of the L1 average coefficient, and (iii) respective weights for the L1 differential coefficients;

wherein, for each of the 2×2 quads of pixels, the respective weights for the L1 differential coefficients may be set such that the determined result of the weighted sum provides the determined representation of the average coefficient for that 2×2 quad of pixels.

The second sub-portion of the second portion of the compressed data structure may comprise bits representing the value of the L1 average coefficient determined for the 2×2 quad of coefficients.

Said using the determined result to determine the decoded value may comprise:

using the determined result to determine a delta value; and adding a predicted value to the delta value to determine the decoded value for the block of pixels, wherein the predicted value is determined based on one or more neighbouring blocks of pixels.

There is provided a decoding unit configured to decode a compressed data structure to determine a decoded value, wherein the compressed data structure encodes a set of Haar coefficients for a 2×2 quad of pixels of a block of pixels, wherein the set of Haar coefficients comprises a plurality of differential coefficients and an average coefficient, wherein a first portion of the compressed data structure encodes the differential coefficients for the 2×2 quad of pixels and comprises: (i) a first set of bits which indicates an order of the magnitudes of the differential coefficients, and (ii) a second set of bits which indicates a sign and an exponent for each of one or more of the differential coefficients which are non-zero, wherein a second portion of the compressed data structure encodes the average coefficient for the 2×2 quad of pixels, wherein the decoding unit is configured to:

use the first portion of the compressed data structure to determine signs and exponents for said one or more of the differential coefficients which are non-zero;

use the second portion of the compressed data structure to determine a representation of the average coefficient;

determine the result of a weighted sum of the differential coefficients and the average coefficient for the 2×2 quad of pixels using: (i) the determined signs and exponents for said one or more of the differential coefficients which are non-zero, (ii) the determined representation of the average coefficient, and (iii) respective weights for the differential coefficients;

use the determined result to determine the decoded value; and output the determined decoded value.

The decoding unit may further comprise a filter parameter setup module configured to determine the respective weights for the differential coefficients.

The block of pixels may be a 4×4 block of pixels comprising four 2×2 quads of pixels, and the decoder unit may further comprise:

four decoder instances, each of which is configured to determine, for a respective one of the four 2×2 quads of pixels, a result of a weighted sum of the differential coefficients and the average coefficient for that 2×2 quad of pixels; and a bilinear interpolation unit configured to combine the four determined results for the respective four 2×2 quads of pixels to determine the decoded value for the block of pixels by performing bilinear interpolation on the four determined results.

There may be provided a method of encoding a block of pixels into a compressed data structure, the method comprising:

determining a set of Haar coefficients for a 2×2 quad of pixels of the block of pixels, wherein the set of Haar coefficients comprises a plurality of differential coefficients and an average coefficient;

determining a first portion of the compressed data structure using the differential coefficients determined for the 2×2 quad of pixels, wherein the first portion comprises:

a first set of bits which indicates an order of the magnitudes of the differential coefficients; and a second set of bits which indicates a sign and an exponent for each of one or more of the differential coefficients which are non-zero;

determining a second portion of the compressed data structure using the average coefficient determined for the 2×2 quad of pixels; and storing the compressed data structure.

There may be provided an encoding unit configured to encode a block of pixels into a compressed data structure, the encoding unit comprising:

a Haar coefficient determining module configured to determine a set of Haar coefficients for a 2×2 quad of pixels of the block of pixels, wherein the set of Haar coefficients comprises a plurality of differential coefficients and an average coefficient; and a coefficient encoding module configured to determine a first portion of the compressed data structure using the differential coefficients determined for the 2×2 quad of pixels, wherein the first portion comprises:

a first set of bits which indicates an order of the magnitudes of the differential coefficients; and a second set of bits which indicates a sign and an exponent for each of one or more of the differential coefficients which are non-zero;

wherein the encoding unit is configured to:

determine a second portion of the compressed data structure using the average coefficient determined for the 2×2 quad of pixels; and output the compressed data structure for storage.

There is provided an encoding unit and a decoding unit configured to perform methods described herein.

The encoding unit/decoding unit may be embodied in hardware on an integrated circuit. There may be provided a method of manufacturing, at an integrated circuit manufacturing system, an encoding unit/decoding unit. There may be provided an integrated circuit definition dataset that, when processed in an integrated circuit manufacturing system, configures the system to manufacture an encoding unit/decoding unit. There may be provided a non-transitory computer readable storage medium having stored thereon a computer readable description of an encoding unit/decoding unit that, when processed in an integrated circuit manufacturing system, causes the integrated circuit manufacturing system to manufacture an integrated circuit embodying an encoding unit/decoding unit.

There may be provided an integrated circuit manufacturing system comprising: a non-transitory computer readable storage medium having stored thereon a computer readable description of the encoding unit/decoding unit; a layout processing system configured to process the computer readable description so as to generate a circuit layout description of an integrated circuit embodying the encoding unit/decoding unit; and an integrated circuit generation system configured to manufacture the encoding unit/decoding unit according to the circuit layout description.

There may be provided computer program code for performing any of the methods described herein. In other words, there may be provided computer readable code configured to cause any of the methods described herein to be performed when the code is run. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
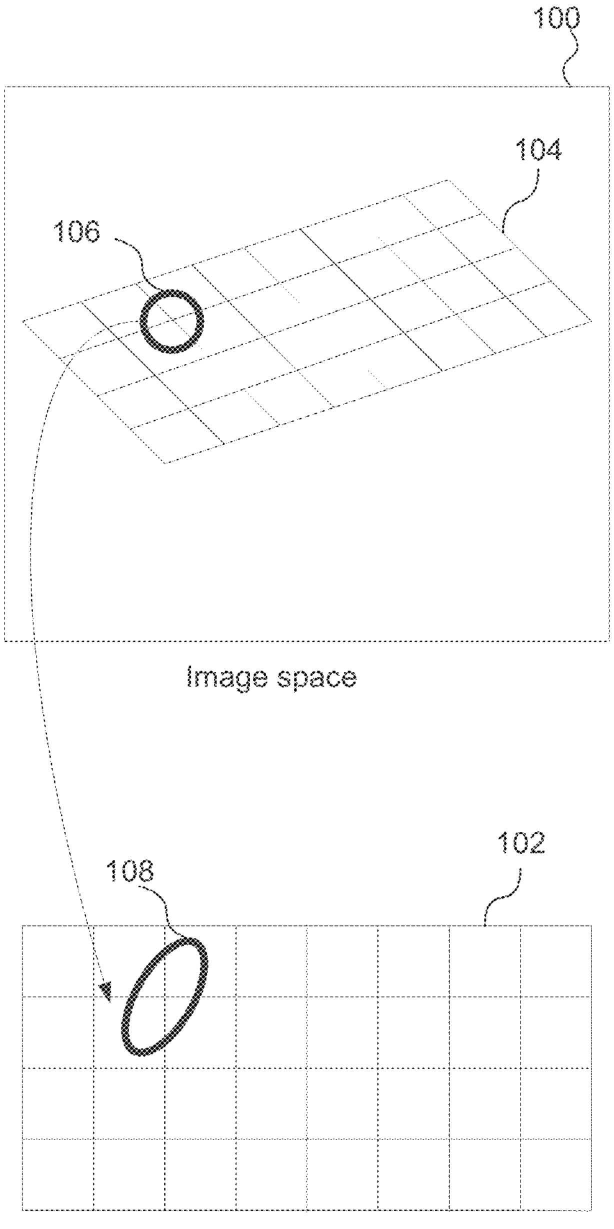
FIG. 1 shows a schematic illustration of a mapping of a sampling kernel between screen space and texture space.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only. The examples described herein provide an encoding unit for encoding a block of pixels (e.g. representing a portion of a texture) using Haar coefficients. Similarly, a decoding unit is provided for decoding a compressed data structure to determine a block of pixels using Haar coefficients. The examples described herein can cheaply decompose images into downscaled images with directional derivatives (e.g. Haar wavelet coefficients). The compression format is designed to reduce the complexity of reconstructing an image whereby the wavelet coefficients are independently weighted according to an algorithm that serves as an implementation of a parametric texture filter that can deliver a range of isotropic and anisotropic filtering automatically as part of the decoding process. Furthermore, the Haar coefficients are stored using indications of their signs and exponents, so that performing a weighted sum of the Haar coefficients reduces from a ‘multiply and add’ operation to a ‘shift and add’ operation, where the weights are shifted by the exponents of the Haar coefficients. The encoding format is simple enough to allow rapid online compression of a small footprint of pixels.

Examples described herein relate to encoding a block of pixels. The block of pixels may be part of a texture, where the "pixels" are the "texels" of the texture. In some other examples, the block of pixels may be part of an image that is being rendered by a graphics processing system, so that the image can be compressed before being written out to a memory.

Examples are described herein in which a block of pixels (e.g. a 2×2 block or a 4×4 block to give just two examples) are encoded into a compressed data structure. Different implementations may achieve different compression ratios, e.g. some examples achieve a 50% compression ratio whereby the amount of data in the compressed data structure is half that of the block of pixels, and some examples achieve a 25% compression ratio whereby the amount of data in the compressed data structure is a quarter of that of the block of pixels.

The encoding methods described herein can be implemented efficiently (e.g. in terms of processing latency, power consumption and/or silicon area). Furthermore, the encoding methods encode the data in the compressed data structure in a format such that the decoding of the compressed data structure to determine a decoded block of pixels can be performed efficiently (e.g. in terms of processing latency, power consumption and/or silicon area). In particular, the encoded data indicates signed exponent values (i.e. values which are powers of 2), and the decoding process involves performing a weighted sum of the signed exponent values. Since the signed exponent values are powers of 2, the multiplication of the signed exponent values by respective weights can be implemented with respective binary shifts of the weights, wherein the directions and magnitudes of the shifts are represented by the sign and the exponent of the signed exponents. Binary shift operations are relatively cheap to implement compared to multiplication operations (e.g. in terms of processing latency, power consumption and/or silicon area).

Furthermore, the encoding methods described herein involve determining Haar coefficients for a 2×2 quad of pixels and encoding those Haar coefficients. As described in more detail below, the Haar coefficients for a 2×2 quad of pixels comprise three directional differential coefficients (dx, dy and dxy) and an average coefficient (dc). The directional differential coefficients allow different levels of detail to be represented in different directions when the compressed data structure is decoded. The decoding process involves representing a decoded block of pixels as the dc value+some differential term, which is determined by performing a weighted sum of the dx, dy and dxy coefficients. Just representing a quad as the dc value effectively blurs the whole quad so that details at a spatial frequency higher than that of the quad are lost, but then detail can be added back in using the differential terms, and by selecting the weights of the different differential terms, different levels of detail can be added in different directions. For example, if, in addition to the average coefficient (dc), the horizontal differential coefficient (dx) is used to decode a 2×2 quad of pixels (by setting its weight to a non-zero value) but the vertical and diagonal differential coefficients (dy and dxy) are not used to decode the 2×2 quad of pixels (by setting their weights to zero) then the level of detail in the decoded block of pixels in the horizontal direction will be twice that in the vertical direction. In this example, the decoding process implements anisotropic filtering with an anisotropic ratio of 2 and with the direction of anisotropy along the vertical direction (since the maximum blurring occurs along that axis). By altering the weights applied to the dx, dy and dxy differential coefficients, the anisotropic ratio and the direction of anisotropy can be varied. In this way, the encoding/decoding process functions as a parametric texture filter, whereby different parameters (e.g. a desired anisotropic ratio and direction of anisotropy) can be supplied to the decoding unit to apply different types of filtering when decoding a compressed data structure. As another example, if the weights applied to dx and dy are equal magnitude and the weight applied to dxy is equal to the product of the weights applied to dx and dy then the decoding unit will operate as an isotropic filter. In particular, when the weights applied to dx, dy and dxy all have unit magnitude and the sign of the weight applied to dxy is the sign of the product of the weights applied to dx and dy, then the decoder will reconstruct one of the original 4 pixels in the 2×2 quad i.e. the top left pixel will be recovered if the weights applied to dx and dy are both −1 (with a weight of +1 for dxy), the top right pixel will be recovered if the weight applied to dx is +1, but the weight applied to dy is −1 (with a weight of −1 for dxy), the bottom left pixel will be recovered if the weight applied to dx is −1, but the weight applied to dy is +1 (with a weight of −1 for dxy) and the bottom right pixel will be recovered if the weights applied to dx and dy are both +1 (with a weight of +1 for dxy), These cases correspond to an isotropic parametric texture filter with parametric Level of Detail (LOD) of zero with sample locations falling on the pixels themselves.

Figure 2:
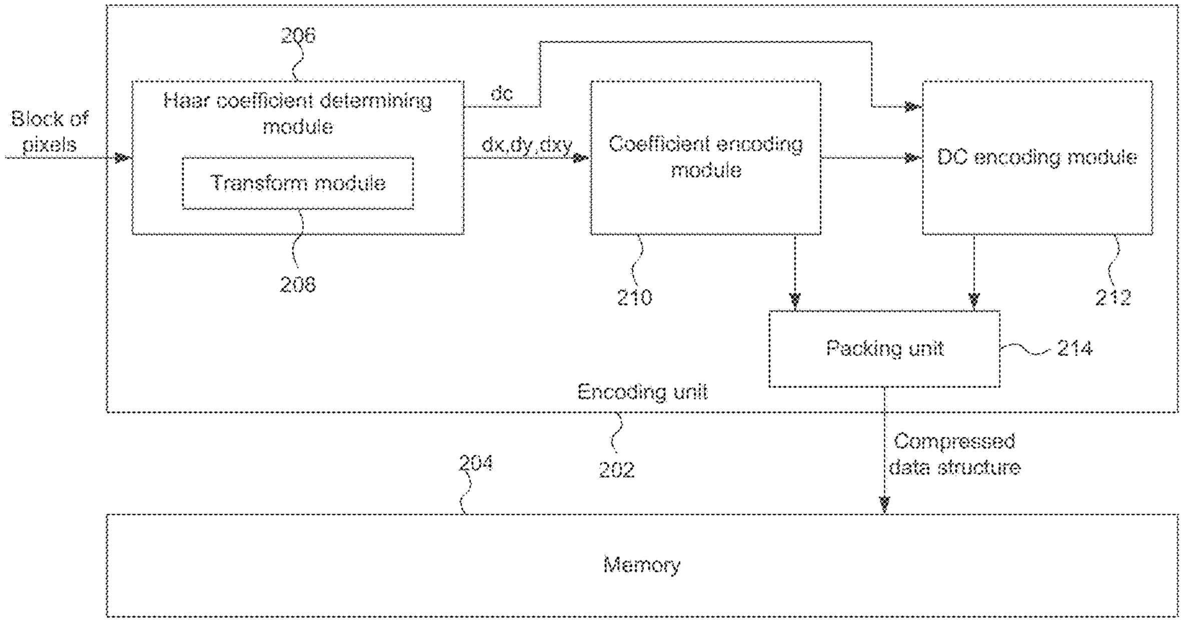
FIG. 2 illustrates a first example encoding system for encoding a block of pixels.

FIG. 2 illustrates a first example encoding system for encoding a block of pixels. The encoding system comprises an encoding unit 202 and a memory 204. The encoding unit 202 comprises a Haar coefficient determining module 206, which comprises a transform module 208. The encoding unit 202 also comprises a coefficient encoding module 210, a DC encoding module 212 and a packing unit 214. The components of the encoding unit 202 shown in FIG. 2 may be implemented in hardware (e.g. fixed function circuitry), software, or a combination thereof.

Figure 3:
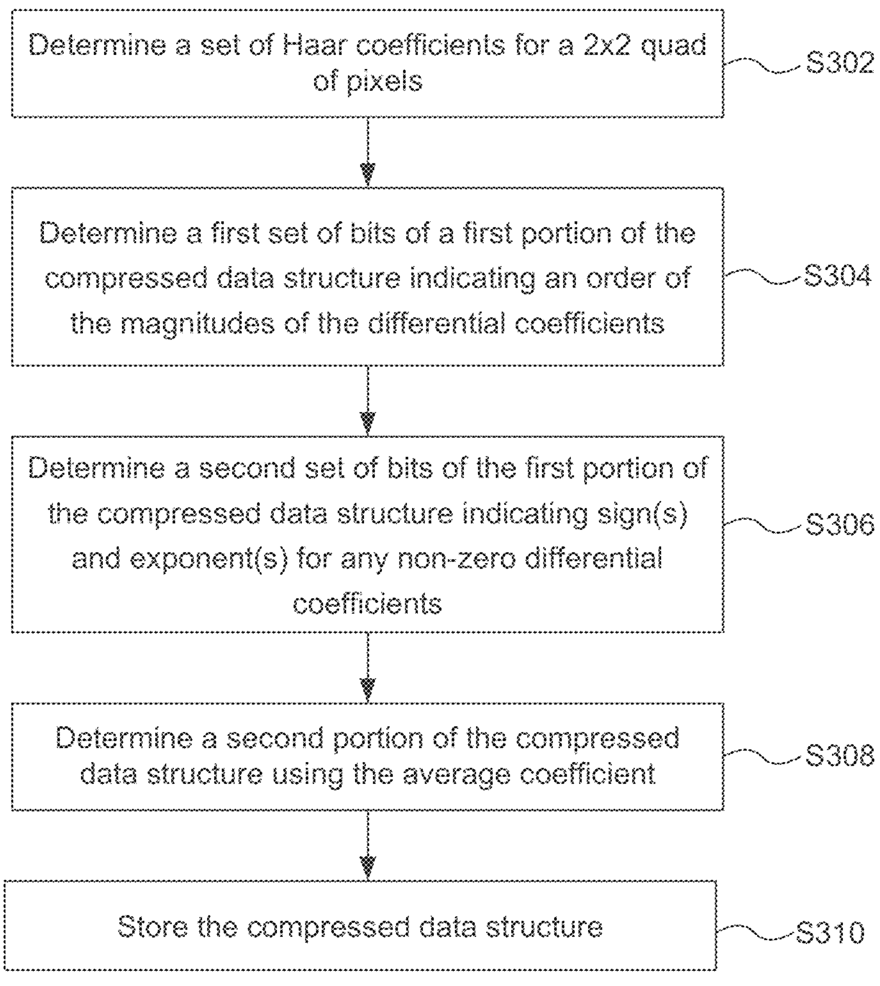
FIG. 3 is a flow chart for a method of encoding a block of pixels into a compressed data structure.

FIG. 3 is a flow chart for a method of encoding a block of pixels into a compressed data structure. The steps of the method may be performed in hardware (e.g. using dedicated hardware, such as fixed function circuitry) or software or a combination thereof in the encoding unit 202. We will first describe a simple example in which a 2×2 quad of pixels is encoded, wherein each pixel comprises value in a single channel, but the same steps shown in FIG. 3 are applied in other, more complex, examples as described below. In this example each pixel value in the channel is represented with 8 bits, but it is to be understood that this is just an example, and the same principles could be applied with pixel values having different numbers of bits.

The block of pixel values are received at the Haar coefficient determining module 206 of the encoding unit 202. In step S302 the Haar coefficient determining module 206 (in particular, the transform module 208 in this example) determines a set of Haar coefficients for the 2×2 quad of pixels. As described above, the set of Haar coefficients comprises a plurality of differential coefficients (dx, dy and dxy) and an average coefficient (dc).

Figure 4:
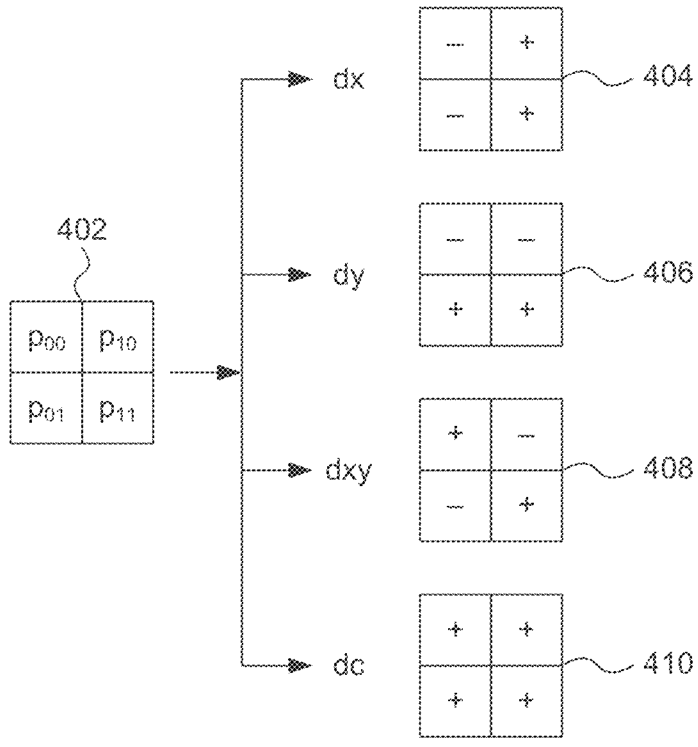
FIG. 4 illustrates how Haar coefficients are determined for a 2×2 quad of pixels.

FIG. 4 illustrates how the Haar coefficients are determined for the 2×2 quad of pixels 402. The quad of pixels 402 comprises pixels with values $p_{00}$, $p_{01}$, $p_{10}$ and $p_{11}$. The horizontal differential coefficient (dx) represents an average change in pixel value across the quad in the horizontal direction, and is calculated as $dx=\frac{1}{4}(p_{10}+p_{11}-p_{00}-p_{01})$ wherein the value of dx may be rounded, e.g. to the nearest representable number in the format of the pixel values or to said format, extended by one or more bits of precision (for accuracy). The horizontal differential coefficient (dx) is represented as 404 in FIG. 4. The vertical differential coefficient (dy) represents an average change in pixel value across the quad in the vertical direction, and is calculated as $dy=\frac{1}{4}(p_{01}+p_{11}-p_{00}-p_{10})$ wherein the value of dy may be rounded, e.g. to the nearest representable number in the format of the pixel values or to said format, extended by one or more bits of precision (for accuracy). The vertical differential coefficient (dy) is represented as 406 in FIG. 4. The dx and dy coefficients represent the linear variation of pixel values within the 2×2 quad i.e. the total derivative. The diagonal differential coefficient (dxy), or cross derivative, represents the nonlinear variation of pixel values within the 2×2 quad, and is calculated as $dxy=\frac{1}{4}(p_{00}+p_{11}-p_{10}-p_{01})$ wherein the value of dxy may be rounded, e.g. to the nearest representable number in the format of the pixel values or to said format, extended by one or more bits of precision (for accuracy). It can be thought of as a derivative first in x and then in y (hence the notation), or vice-versa, and as a second order term, does not have a unique direction associated with it (but since it still plays a role in the directional filtering described herein, we refer to it elsewhere in this description as a directional derivative). The dxy differential coefficient (dxy) is represented as 408 in FIG. 4. The average coefficient (dc) represents an average of the pixel values in the quad, and is calculated as $dc=\frac{1}{4}(p_{00}+p_{01}+p_{10}+p_{11})$ wherein the value of dc may be rounded, e.g. to the nearest representable number in the format of the pixel values. The average coefficient (dc) is represented as 410 in FIG. 4. The values of dx, dy and dxy are passed from the Haar coefficient determining module 206 to the coefficient encoding module 210. The value of dc is passed from the Haar coefficient determining module 206 to the DC encoding module 212.

Figure 5:
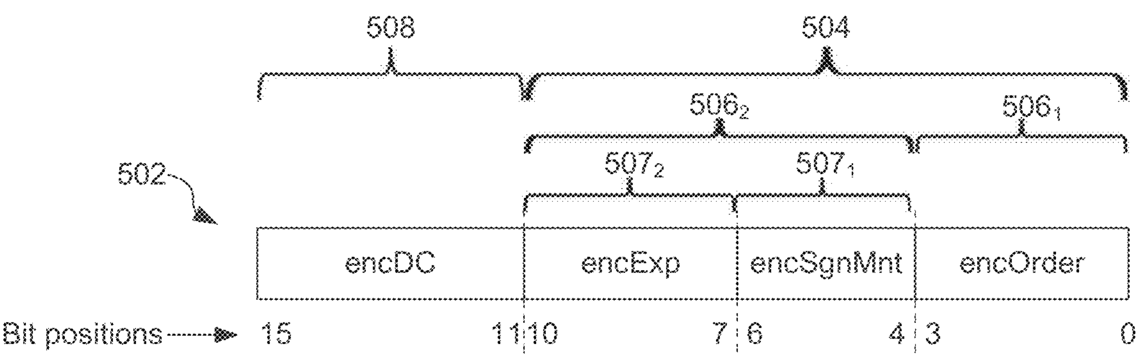
FIG. 5 shows a first example format of data in the compressed data structure.

FIG. 5 shows a first example format of data in the compressed data structure 502. In this example, the compressed data structure comprises a first portion 504 and a second portion 508. The first portion 504 comprises a first set of bits $\mathbf{506}_1$ and a second set of bits $\mathbf{506}_2$. In this example, the compressed data structure has 16 bits, and the bit positions of the different fields are shown in FIG. 5. In this example, the first portion 504 comprises 11 bits and the second portion 508 comprises 5 bits. In this example, the first set of bits $\mathbf{506}_1$ of the first portion comprises 4 bits, and the second set of bits $\mathbf{506}_2$ of the first portion comprises 7 bits. In this example, the input data values of the pixels in the 2×2 pixel quad were 8-bit values, so the input data representing the quad has 32 bits and the compressed data structure has 16 bits, so the compression ratio is 50% in this example.

The coefficient encoding module 210 determines (in steps S304 and S306) the first portion 504 of the compressed data structure using the differential coefficients (dx, dy and dxy) determined for the 2×2 quad of pixels.

In particular, in step S304 the coefficient encoding module 210 determines the first set of bits $\mathbf{506}_1$ of the first portion of the compressed data structure, wherein these bits $\mathbf{506}_1$ (which are denoted "encOrder" in FIG. 5) indicate an order of the magnitudes of the differential coefficients. As described above, the differential terms (dx, dy and dxy) are used to represent detail within the 2×2 quad in different directions. Since the encoding process is a lossy process, some data is lost, and by determining the order of the magnitudes of the differential coefficients, the methods described herein are able to ensure that the more important differential coefficients (i.e. those with larger magnitudes) are prioritised over less important differential coefficients (i.e. those with smaller magnitudes) when it comes to deciding which of the differential coefficients should maintain the most data. Furthermore, properties of the coefficients, as described below in the various defined encodings, refer to approximations that have been made by the encoder to select a "best fit" from the available options (e.g. comparisons may be made with rounded coefficients rather than the coefficients themselves). The differential coefficients are ordered according to their magnitudes.

The first set of bits $\mathbf{506}_1$ further indicates how many of the differential coefficients (dx, dy and dxy) are non-zero. In the example shown in FIG. 5, the first set of bits $\mathbf{506}_1$ has 4 bits, so it can represent 16 different options. It is noted that in other examples, the first set of bits may have a different number of bits so that a different number of options can be represented.

If the three differential coefficients are non-zero, and if they are not all of equal magnitude, then there are six permutations of the ordering of the magnitudes of the coefficients, and these are represented with the following encOrder bits:

| encOrder bits $506_1$ | first (i.e. largest) coefficient | second (i.e. middle) coefficient | third (i.e. smallest) coefficient |
|---|---|---|---|
| 0000 | dx | dy | dxy |
| 0001 | dy | dx | dxy |
| 0010 | dxy | dx | dy |
| 0011 | dx | dxy | dy |
| 0100 | dy | dxy | dx |
| 0101 | dxy | dy | dx |

If two of the three differential coefficients are non-zero and one is zero, then there are six permutations of the ordering of the magnitudes of the coefficients, and these are represented with the following encOrder bits:

| encOrder bits $506_1$ | first (i.e. largest) coefficient | second (i.e. smallest non-zero) coefficient |
|---|---|---|
| 0110 | Dx | dy |
| 0111 | Dy | dx |
| 1000 | Dxy | dx |
| 1001 | Dx | dxy |
| 1010 | Dy | dxy |
| 1011 | Dxy | dy |

It should be noted that while other orderings of permutations are possible, in this example, the integer "encOrder" describes a cyclic rotation of the coefficients with an additional pairwise transposition of the smaller (including zero) elements indicated by the least significant bit, which as such, indicates the parity of the permutation. This structure can simplify the encoder and/or decoder logic.

If one of the three differential coefficients are non-zero and two are zero, then there are three permutations of the ordering of the magnitudes of the coefficients, and these are represented with the following encOrder bits (note that, in this example, these encodings extend the cyclic ordering of coefficients):

| encOrder bits $506_1$ | first (i.e. largest, and only non-zero) coefficient |
|---|---|
| 1100 | dx |
| 1101 | dy |
| 1110 | dxy |

If all of the three differential coefficients are of equal magnitude (including if they are all zero), then there is one permutation of the ordering of the magnitudes of the coefficients, and this is represented with the following encOrder bits:

| encOrder bits $506_1$ | first coefficient | second coefficient | third coefficient |
|---|---|---|---|
| 1111 | Dx | dy | dxy |

The differential coefficients are considered to be in a floating point format. If the differential coefficients were to be represented without loss of data, each differential coefficient would be represented with a sign bit, one or more exponent bits and one or more mantissa bits. In step S306 the coefficient encoding module 210 determines the second set of bits 506$_2$ of the first portion of the compressed data structure, wherein these bits 506$_2$ indicate a sign and an exponent for each of one or more of the differential coefficients which are non-zero. As shown in FIG. 5, the second set of bits 506$_2$ comprises a first section 507$_1$ (denoted "encSgnMnt" in FIG. 5) and a second section 507$_2$ (denoted "encExp") in FIG. 5. The first section 507$_1$ indicates a sign for each of said one or more of the differential coefficients which are non-zero. In the example shown in FIG. 5, this first section 507$_1$ has three bits. The second section 507$_2$ indicates an exponent for each of said one or more of the differential coefficients which are non-zero.

The signs and the exponents are the most important pieces of information to maintain in the compressed data structure, i.e. they are more important than the mantissa bits. As described below, in some situations, e.g. if the differential coefficients are non-zero and are not all equal, the compressed data structure does not indicate any mantissa bits for the differential coefficients. In other situations, e.g. if one or more of the differential coefficients are zero, the first section 507$_1$ of the second set of bits 506$_2$ indicates one or more mantissa bits for the differential coefficient which has the largest magnitude. Referring to the earlier discussion, when there are fewer than maximum non-zero terms with which to perform a weighted sum, additional precision can be accommodated without increasing the arithmetic complexity (e.g. a floating point term with one bit of mantissa can be written as the sum of two signed exponent terms).

The encoding of the second set of bits 506$_2$ depends on the number of non-zero differential coefficients (as indicated by the first set of bits 506$_1$ ("encOrder")).

When there are three non-zero differential coefficients and they are not all equal in magnitude (e.g. if "encOrder" is between 0000 and 0101), the first section 507$_1$ of the second set of bits 506$_2$ has three bits which respectively indicate the signs of the three differential coefficients, and the second section 507$_2$, which in this example has four bits, indicates one of a set of possible combinations of exponents for the three differential coefficients. In the example shown below, in all of the possible combinations, the first coefficient has an exponent that lies within the range [4, 7](note that these exponents correspond directly to a power of 2 except 0, which is reserved to encode the special value of zero, which cannot be represented by a finite exponent), and the exponents of the other two coefficients are encoded differentially with respect to the exponent of the first coefficient, such that they are at most 2. In the example shown below, the two least significant bits (LSBs) of the second section 507$_2$ ("encExp") encode the two LSBs of the exponent of the first coefficient directly. If the exponents of the two other coefficients differ, the most significant bit (MSB) of the second section 507$_2$ ("encExp") encodes the LSB of the difference between the exponents of the first and second coefficients and the remaining bit in the second section 507$_2$ ("encExp") encodes the LSB of the difference between the exponents of the first and third coefficients. The ordering of the exponents ensures that these values are unique (e.g. if the LSB of the first and second exponents difference is 1 and the LSB of the first and third exponent difference is 0, the later exponent difference must be 2 to ensure that the third coefficient is smaller than the second coefficient). If the exponents of the second and third coefficients match, this is indicated by a value of 1 in each of the two MSBs of the second section 507$_2$ ("encExp"); note that in this example it is not possible for second and third coefficients with distinct exponents no greater than 2 smaller than the first coefficient to both have an LSB of 1. In this case, the parity of the coefficient ordering is redundant and the LSB of encOrder (which is labelled "orderSgn") is reinterpreted to encode the LSB of the difference between the exponents of the first and second coefficients (which is the same as the LSB of the difference between the exponents of the first and third coefficients). Note that in this example, whether the second and third coefficients have matching exponents or not, encodings that correspond with three matching magnitudes are excluded from the list of options. This is summarised in the table below (where the symbol 'X' indicates "don't care"):

| orderSgn | encExp | exponent of first (i.e. largest) coefficient | exponent of second (i.e. middle) coefficient | exponent of third (i.e. smallest) coefficient |
|---|---|---|---|---|
| X | 0000 | 4 | 4 | 2 |
| X | 0001 | 5 | 5 | 3 |
| X | 0010 | 6 | 6 | 4 |
| X | 0011 | 7 | 7 | 5 |
| X | 0100 | 4 | 4 | 3 |
| X | 0101 | 5 | 5 | 4 |
| X | 0110 | 6 | 6 | 5 |
| X | 0111 | 7 | 7 | 6 |
| X | 1000 | 4 | 3 | 2 |
| X | 1001 | 5 | 4 | 3 |
| X | 1010 | 6 | 5 | 4 |
| X | 1011 | 7 | 6 | 5 |
| 0 | 1100 | 4 | 2 | 2 |
| 0 | 1101 | 5 | 3 | 3 |
| 0 | 1110 | 6 | 4 | 4 |
| 0 | 1111 | 7 | 5 | 5 |
| 1 | 1100 | 4 | 3 | 3 |
| 1 | 1101 | 5 | 4 | 4 |
| 1 | 1110 | 6 | 5 | 5 |
| 1 | 1111 | 7 | 6 | 6 |

When there are two non-zero differential coefficients (e.g. if encOrder is between 0110 and 1011), the first section 507$_1$ of the second set of bits 506$_2$ has three bits, two of which respectively indicate the signs of the two non-zero differential coefficients, whilst the third of which may indicate a mantissa bit for the first coefficient. The second section 507$_2$, which in this example has four bits, indicates one of a set of possible combinations of exponents for the two non-zero differential coefficients. In the example shown below, in all of the possible combinations, the first coefficient has an exponent that lies within the range [4, 7], if the two encoded coefficients are distinct (including the mantissae) and within the range [1, 8] if they are equal. In the example shown below, the exponent of the second coefficient is encoded differentially with respect to the exponent of the first coefficient such that it lies within the range [−1, 3]. A value of −1, however, is only valid when the mantissa bit of the first coefficient is set (i.e. when it is a 1) since otherwise the first coefficient would be smaller than the second coefficient, and a value of 3 is instead valid when the mantissa bit of the first coefficient is not set (i.e. when it is a 0). Note that this assumes the coefficients have been sorted prior to rounding and that it remains beneficial to encode the largest value with greater precision even if the second coefficient rounds with lesser precision to a greater value. The two LSBs of the second section 507$_2$ ("encExp") encode the two LSBs of the exponent of the first coefficient directly. The 2 MSBs of the second section 507$_2$ encode (d1_exp−d0_exp) mod 4, where d0_exp is the exponent of the first coefficient and d1_exp is the exponent of the second coefficient. If this value is 0, the exponents match, and if in addition the mantissa bit of the first coefficient ("d0_mnt") is not set (i.e. if it is 0), the parity of the coefficient ordering (as indicated by encOrder) is redundant and the LSB of the encOrder bits ("orderSgn") is reinterpreted to encode the MSB of d0_exp mod 8=d1_exp mod 8. This is summarised in the table below:

| d0_mnt | orderSgn | encExp | exponent of first (i.e. largest) coefficient | exponent of second (i.e. middle) coefficient |
|---|---|---|---|---|
| 0 | 0 | 0000 | 8 | 8 |
| 0 | 0 | 0001 | 1 | 1 |
| 0 | 0 | 0010 | 2 | 2 |
| 0 | 0 | 0011 | 3 | 3 |
| 0 | 1 | 0000 | 4 | 4 |
| 0 | 1 | 0001 | 5 | 5 |
| 0 | 1 | 0010 | 6 | 6 |
| 0 | 1 | 0011 | 7 | 7 |
| 1 | X | 0000 | 4 | 4 |
| 1 | X | 0001 | 5 | 5 |
| 1 | X | 0010 | 6 | 6 |
| 1 | X | 0011 | 7 | 7 |
| X | X | 0100 | 4 | 3 |
| X | X | 0101 | 5 | 4 |
| X | X | 0110 | 6 | 5 |
| X | X | 0111 | 7 | 6 |
| X | X | 1000 | 4 | 2 |
| X | X | 1001 | 5 | 3 |
| X | X | 1010 | 6 | 4 |
| X | X | 1011 | 7 | 5 |
| 0 | X | 1100 | 4 | 1 |
| 0 | X | 1101 | 5 | 2 |
| 0 | X | 1110 | 6 | 3 |
| 0 | X | 1111 | 7 | 4 |
| 1 | X | 1100 | 4 | 5 |
| 1 | X | 1101 | 5 | 6 |
| 1 | X | 1110 | 6 | 7 |
| 1 | X | 1111 | 7 | 8 |

When there is one non-zero differential coefficient (e.g. if encOrder is between 1100 and 1110), the first section 507$_1$ of the second set of bits 506$_2$ has three bits, one of which indicates the sign of the non-zero differential coefficient, whilst the second and third of which may indicate two mantissa bits for the first coefficient (i.e. for the non-zero coefficient). Alternatively, one or more of the second and third bits may instead be used to increase the precision of the dc coefficient (e.g. when the exponent is small). The second section 507$_2$ indicates one of a set of possible combinations of exponents for the non-zero differential coefficient. In the example shown below, the exponent of the first coefficient lies within the range [1, 8]. It is noted that the non-zero coefficient cannot be zero (an exponent of 0 is reserved for the value zero rather than $2^0=1$). The three LSBs of the second section 507$_2$ ("encExp") encode d0_exp mod 8. The MSB of the second section 507$_2$ is used to increase the precision of the dc coefficient, i.e. the MSB of the second section 507$_2$ is repurposed and used as an extra bit in the second portion 508, such that the second portion 508 can have 6 bits to represent the average coefficient (dc). This is summarised in the table below:

| encExp | exponent of first (i.e. largest) coefficient |
|---|---|
| X000 | 8 |
| X001 | 1 |
| X010 | 2 |
| X011 | 3 |
| X100 | 4 |
| X101 | 5 |
| X110 | 6 |
| X111 | 7 |

When the three coefficients are of equal magnitude (e.g. if encOrder is 1111), the first section 507$_1$ of the second set of bits 506$_2$ has three bits which respectively indicate the signs of the three differential coefficients unless all coefficients are zero, in which case these three bits may be repurposed and used as extra bits in the second portion 508. The second section 507$_2$ indicates one of a set of possible combinations of exponents for the (equal magnitude) differential coefficients. In this case, when there are 3 matching differential coefficients present, the exponent lies within the range [0, 7]. As mentioned above, when the three coefficients have equal magnitude then they might all be zero. The three LSBs of the second section 507$_2$ ("encExp") encode this value directly. If the coefficients are nonzero the MSB of the second section 507$_2$ is used to increase the precision of the dc coefficient, i.e. the MSB of the second section 507$_2$ is repurposed and used as an extra bit in the second portion 508, such that the second portion 508 can have 6 bits to represent the average coefficient (dc). If the coefficients are zero, however, the three bits of the first section 507$_1$ are used to increase the precision of the dc (such that second portion 508 can have 8 bits to represent the average coefficient) and the MSB of the second section 507$_2$ is instead reserved for a "bypass" flag used in an optional coefficient prediction feature (described later). This is summarised in the table below:

| encExp | exponent of first (i.e. largest) coefficient | exponent of second (i.e. middle) coefficient | exponent of third (i.e. smallest) coefficient |
|---|---|---|---|
| X000 | 0 | 0 | 0 |
| X001 | 1 | 1 | 1 |
| X010 | 2 | 2 | 2 |
| X011 | 3 | 3 | 3 |
| X100 | 4 | 4 | 4 |
| X101 | 5 | 5 | 5 |
| X110 | 6 | 6 | 6 |
| X111 | 7 | 7 | 7 |

So when the first portion 504 of the compressed data structure has been determined, then method passes to step S308 in which the second portion 508 of the compressed data structure is determined using the average coefficient (dc) determined for the 2×2 quad of pixels. For example, the DC encoding module 212 may receive the average coefficient (dc) and may receive an indication of how the differential coefficients have been encoded. The DC encoding module 212 may round the average coefficient to determine bits representing the value of the average coefficient determined for the 2×2 quad of pixels. For example, the average coefficient (dc) may have 8 bits, and if the second portion 508 has 5 bits (as shown in FIG. 5) then the average coefficient is rounded to the nearest 5-bit number for storage in the second portion 508 of the compressed data structure. Different rounding modes and/or rounding techniques may be used for this purpose in different implementations. As described above, in some situations (e.g. if there is only one non-zero differential coefficient, or if all of the differential coefficients are equal) then there may be more than 5 bits available for the second portion, so less (or no) rounding may need to be applied in some cases.

In step S310 the compressed data structure is stored in the memory 204. In particular, the first portion 504 of data is provided to the packing unit 214 from the coefficient encoding module 210. The second portion 508 of data is provided to the packing unit 214 from the DC encoding module 212. The packing unit packs the first portion 504 and the second portion 508 into the compressed data structure and outputs the compressed data structure for storage in the memory 204.

In the example described above, each pixel has a value in a single channel. In another example, each pixel in a block of pixels has a value in a plurality of channels. The plurality of channels may be Red, Green and Blue channels.

Figure 6:
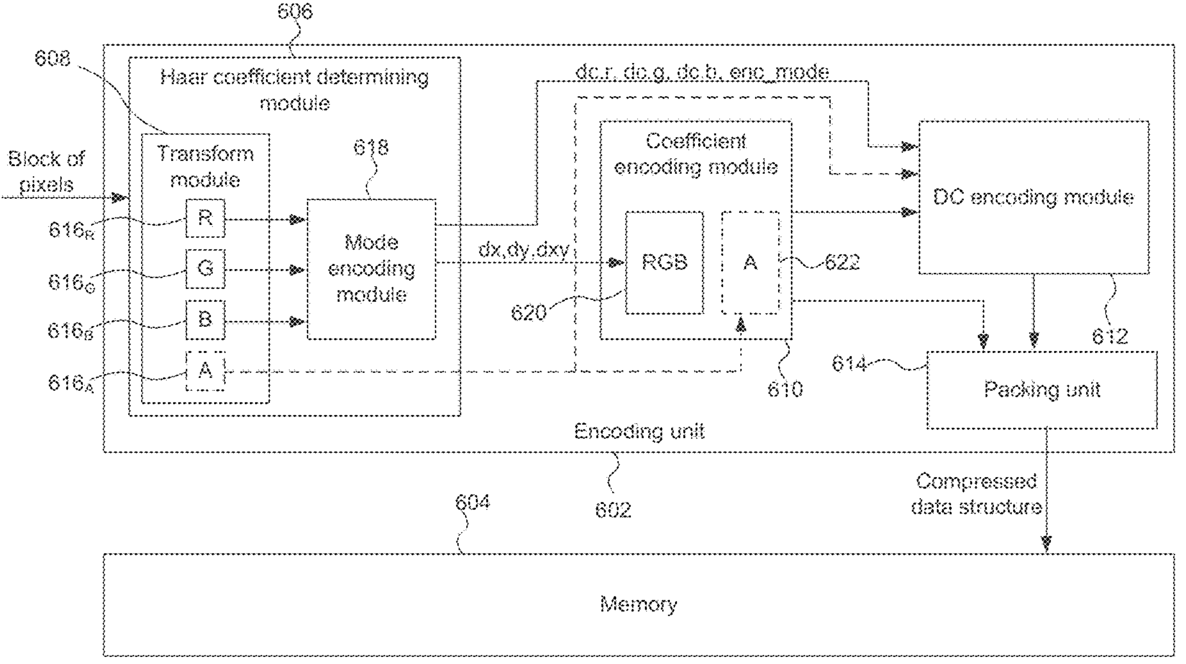
FIG. 6 illustrates a second example encoding system for encoding a block of pixels.

FIG. 6 illustrates a second example encoding system for encoding a block of pixels. The encoding system comprises an encoding unit 602 and a memory 604. The encoding unit 602 comprises a Haar coefficient determining module 606, which comprises a transform module 608 and a mode encoding module 618. The encoding unit 602 also comprises a coefficient encoding module 610, a DC encoding module 612 and a packing unit 614. The transform module 608 comprises respective channel transform modules for the Red Green and Blue channels 616R, 616G and 616B. In some examples, the transform module 608 may also include an alpha channel transform module 616A. The alpha channel transform module 616A is shown with a dashed box in FIG. 6 because it is not always present, and we first describe an example which does not include the alpha channel transform module 616A. The coefficient encoding module 610 comprises first coefficient encoding logic 620 for encoding the differential coefficients for the Red Green and Blue channels. In some examples, the coefficient encoding module 610 may also include alpha coefficient encoding logic 622. The alpha coefficient encoding logic 622 is shown with a dashed box in FIG. 6 because it is not always present, and we first describe an example which does not include the alpha coefficient encoding logic 622. The components of the encoding unit 602 shown in FIG. 6 may be implemented in hardware (e.g. fixed function circuitry), software, or a combination thereof.

The encoding system shown in FIG. 6 can perform the steps of the flow chart shown in FIG. 3 to encode a 2×2 quad of pixels, wherein the pixels have values in Red, Green and Blue channels. As an example, each pixel value in each channel is represented with 8 bits (so 96 bits are used to represent the three channels of the four pixels in a 2×2 quad), but it is to be understood that this is just an example, and the same principles could be applied with pixel values having different numbers of bits.

The block of pixel values are received at the Haar coefficient determining module 606 of the encoding unit 602. In step S302 the Haar coefficient determining module 606 determines a set of Haar coefficients for the 2×2 quad of pixels. The set of Haar coefficients comprises, for each channel, a plurality of differential coefficients (dx, dy and dxy) and an average coefficient (dc). In particular, in step S302, the Haar coefficient determining module 606 determines, for each of the channels, differential channel coefficients as described above. So for the Red channel three differential channel coefficients (dx.r, dy.r and dxy.r) and an average coefficient (dc.r) are determined; for the Green channel three differential channel coefficients (dx.g, dy.g and dxy.g) and an average coefficient (dc.g) are determined, and for the Blue channel three differential channel coefficients (dx.b, dy.b and dxy.b) and an average coefficient (dc.b) are determined. These nine differential coefficients and three average coefficients are provided to the mode encoding module 618. In other examples, the three average coefficients might not be provided to the mode encoding module 618 because the mode encoding module operates on the differential coefficients, not the average coefficients.

The mode encoding module 618 combines the differential channel coefficients determined for the channels to determine the differential coefficients of the Haar coefficients for the 2×2 quad of pixels. It is noted that in this example, the number of differential channel coefficients for each of the channels (i.e. three) is the same as the number of differential coefficients of the Haar coefficients that are determined for the 2×2 quad of pixels. In this example, the mode encoding module 618 combines, according to a combining mode, the nine channel differential coefficients (dx.r, dy.r, dxy.r, dx.g, dy.g, dxy.g, dx.b, dy.b and dxy.b) to determine three differential coefficients (dx, dy and dxy) which can be passed to the coefficient encoding module. An indication of the combining mode ("enc_mode") is passed from the mode encoding module 618 to the DC encoding module 612 and then to the packing unit 614 so that it can be included in the compressed data structure. It is noted that in the example shown in FIG. 6 the combining mode (enc_mode) can be overwritten by the DC encoding module 612 after the coefficients have been determined by the mode encoding module 618 (e.g. so that bits can be stolen for the dc coefficients) so the indication of enc_mode is first passed to the DC encoding module 612 before being passed on to the packing unit 614. In other examples the indication of enc_mode may be passed directly from the mode encoding module 618 to the packing unit 614 (e.g. in examples in which the combining mode cannot be overwritten by the DC encoding module 612).

Figure 7:
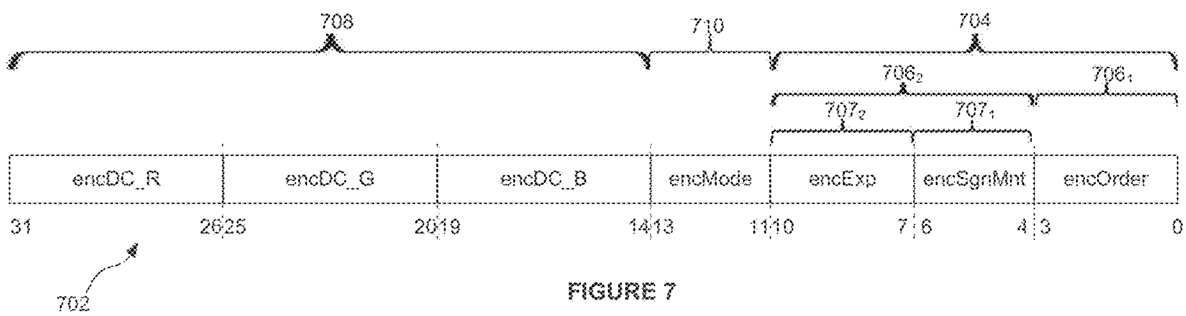
FIG. 7 shows a second example format of data in the compressed data structure.

FIG. 7 shows the format of data in the compressed data structure 702 in this example. The compressed data structure 702 comprises a first portion 704, a second portion 708 and a third portion 710. The first portion 704 has the same structure and format as the first portion 504 of the compressed data structure 502 shown in FIG. 5, such that it has a first set of bit 706$_1$ (denoted "encOrder" in FIG. 7) and a second set of bits 706$_2$, which comprises a first section 707$_1$ (denoted "encSgnMnt" in FIG. 7) and a second section 7072 (denoted "encExp" in FIG. 7). As described above, in this example, the input data values of the pixels in the 2×2 quad of pixels are represented with 96 bits and the compressed data structure 702 has 32 bits, so the compression ratio is 33% in this example (though it is sometimes quoted as 25% if the original data is assumed to be packed as 32 bit RGBA values, despite the absence of an alpha channel).

The third portion 710 includes the indication of the combining mode ("encMode"). In this example, step S302 comprises determining the third portion 710 of the compressed data structure 702 which indicates the combining mode, from a set of predetermined combining modes, according to which the differential channel coefficients determined for the channels are combined to determine the differential coefficients of the Haar coefficients for the 2×2 quad of pixels. The third portion 710 of the compressed data structure 702 has a number of bits $n_{mode}$, wherein the set of predetermined combining modes comprises $2^{n_{mode}}$ combining modes. For example, $n_{mode}$ may be 3, such that there are 8 combining modes in the set of predetermined combining modes.

A combining mode is chosen with the aim of preserving as much detail as possible when the nine channel differential coefficients are combined into three differential coefficients. The table below indicates a set of eight predetermined combining modes which may be used, for each combining mode and for each of the nine channel differential coefficients (dx.r, dy.r, dxy.r, dx.g, dy.g, dxy.g, dx.b, dy.b and dxy.b) it indicates which of the output differential coefficients (dx, dy and dxy) that channel differential coefficient contributes to (with a value of 0 indicating that it makes no contribution). The table also indicates the bits of the indication (encMode) used to represent each combining mode:

| encMode | dx.r | dx.g | dx.b | dy.r | dy.g | dy.b | dxy.r | dxy.g | dxy.b |
|---|---|---|---|---|---|---|---|---|---|
| 000 | dx | dx | dx | dy | dy | dy | dxy | dxy | dxy |
| 001 | dx | dy | dxy | 0 | 0 | 0 | 0 | 0 | 0 |
| 010 | 0 | 0 | 0 | dx | dy | dxy | 0 | 0 | 0 |
| 011 | 0 | 0 | 0 | 0 | 0 | 0 | dx | dy | dxy |
| 100 | dx | dy | dxy | dx | dy | dxy | dx | dy | dxy |
| 101 | dx | dy | dxy | dx | dy | dxy | −dx | −dy | −dxy |
| 110 | dx | dy | dxy | −dx | −dy | −dxy | dx | dy | dxy |
| 111 | dx | dy | dxy | −dx | −dy | −dxy | −dx | −dy | −dxy |

Figure 8:
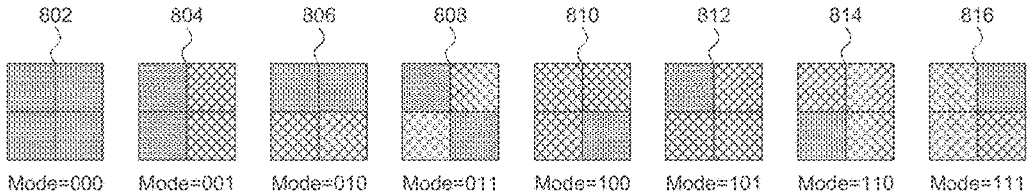
FIG. 8 shows different arrangements corresponding to different combining modes.

FIG. 8 shows different arrangements corresponding to the different combining modes shown in the table above. In particular, block 802 corresponds to encMode 000 and represents the quad as luma values. In this mode, the output differential coefficients dx, dy and dxy are determined as:

$$dx=[dx.r+dx.g+dx.b]/3$$

$$dy=[dy.r+dy.g+dy.b]/3$$

$$dxy=[dxy.r+dxy.g+dxy.b]/3$$

The other seven combining modes represent different options for dividing the 2×2 quad up into two colours. Block 804 corresponds to encMode 001 and represents the quad as two colours with a vertical division between the two colours. In this mode, the output differential coefficients dx, dy and dxy are determined as: dx=dx.r, dy=dx.g, dxy=dx.b.

Block 806 corresponds to encMode 010 and represents the quad as two colours with a horizontal division between the two colours. In this mode, the output differential coefficients dx, dy and dxy are determined as: dx=dy.r, dy=dy.g, dxy=dy.b.

Block 808 corresponds to encMode 011 and represents the quad as two colours with the top left and bottom right pixels being a first colour and the top right and bottom left pixels being a second colour. In this mode, the output differential coefficients dx, dy and dxy are determined as: dx=dxy.r, dy=dxy.g, dxy=dxy.b.

Block 810 corresponds to encMode 100 and represents the quad as two colours with the bottom right pixel being a first colour and the other three pixels being a second colour. In this mode, the output differential coefficients dx, dy and dxy are determined as:

$$dx=[dx.r+dy.r+dxy.r]/3$$

$$dy=[dx.g+dy.g+dxy.g]/3$$

$$dxy=[dx.b+dy.b+dxy.b]/3$$

Block 812 corresponds to encMode 101 and represents the quad as two colours with the top left pixel being a first colour and the other three pixels being a second colour. In this mode, the output differential coefficients dx, dy and dxy are determined as:

$$dx=[dx.r+dy.r-dxy.r]/3$$

$$dy=[dx.g+dy.g-dxy.g]/3$$

$$dxy=[dx.b+dy.b-dxy.b]/3$$

Block 814 corresponds to encMode 110 and represents the quad as two colours with the bottom left pixel being a first colour and the other three pixels being a second colour. In this mode, the output differential coefficients dx, dy and dxy are determined as:

$$dx=[dx.r-dy.r+dxy.r]/3$$

$$dy=[dx.g-dy.g+dxy.g]/3$$

$$dxy=[dx.b-dy.b+dxy.b]/3$$

Block 816 corresponds to encMode 111 and represents the quad as two colours with the top right pixel being a first colour and the other three pixels being a second colour. In this mode, the output differential coefficients dx, dy and dxy are determined as:

$$dx=[dx.r-dy.r-dxy.r]/3$$

$$dy=[dx.g-dy.g-dxy.g]/3$$

$$dxy=[dx.b-dy.b-dxy.b]/3$$

The values of dx, dy and dxy determining by the mode encoding module 618 are provided to the first coefficient encoding logic 620. The first coefficient encoding logic 620 operates as described above for the coefficient encoding module 210 to thereby determine the first portion 704 of the compressed data structure 702 encoding the differential coefficients. The third portion 710 (encMode) is provided from the mode encoding module 618 to the DC encoding module 612. The average coefficients (dc.r, dc.g and dc.b) are provided to the DC encoding module 612. The DC encoding module 612 determines the second portion 708 of the compressed data structure 708 as described above for the DC encoding module 212. In particular, the DC encoding module 612 rounds each of the average coefficients to determine an indication of the average coefficients (denoted encDC_R, encDC_G and encDC_B in FIG. 7). In this way, the second portion 708 of the compressed data structure 702 comprises bits representing the values of the average channel coefficients. It is noted that in the example shown in FIG. 7, each average coefficient is encoded with 6 bits, whereas in the example shown in FIG. 5, each average coefficient is encoded with 5 bits. Furthermore, in contrast with the DC encoding module 212, there are three channels with which to distribute repurposed bits (as opposed to one). The DC encoding module 612 therefore allocates some portion of available bits to the channels according to some precedence (typically green is considered most important, followed by red, followed by blue). In addition, since the special case where all differential coefficients are zero does not depend on the mode encoding and three equal magnitude coefficients encoded in the luma mode can be equally well represented as one of the modes given above by encMode=100, encMode=101, encMode=110 or encMode=111, some examples may choose to reserve encOrder=1111 with encMode=000 to encode the zero vector only. In this way, all seven bits of the second set of bits $706_2$ of the first portion 704 of the compressed data structure may be repurposed such that the DC coefficients of each of the red, green and blue channels may be encoded with 8 bits of precision, and the remaining bit can be used to indicate a bypass mode (as described below). This is a useful feature as it allows flat regions of an image to be represented without loss of precision (avoiding problems like banding artefacts). It is straightforward for the DC encoding module 612, using the received encMode (710) and encoded coefficients (704) to convert matching coefficient luma mode encodings to palette coefficient encodings. The mode encoding module may also ensure that zero coefficient cases automatically select the luma mode so that zero coefficients cases need not be converted from non-luma modes (to enable the re-purposing of the coefficient bits).

When deciding which combining mode to choose, the mode encoding module 618 selects the combining mode from the set of predetermined combining modes that gives the largest magnitude (or some suitable approximation) for the differential coefficients of the Haar coefficients (dx, dy and dxy) for the 2×2 quad of pixels. By selecting the combining mode that gives the largest magnitude for the differential coefficients, the least amount of data is lost by combining the differential coefficients for the three channels into a single set of dx, dy and dxy coefficients. In some examples, a slight bias for luma encoding is included since more precision is generally available in this mode (compared with palette encoding) for near-monochromatic blocks.

As mentioned above, in some examples, each pixel in the block of pixels has a further value in an Alpha channel. In this case, the transform module 608 comprises the alpha channel transform module 616A and the coefficient encoding module comprises the alpha coefficient encoding logic 622. The DC encoding module is also configured to encode a DC value for the alpha channel. In this example, when an alpha channel is present in addition to the Red, Green and Blue channels, the encoding unit is configured to encode the values in the Alpha channel independently of the values in the Red, Green and Blue channels.

The alpha channel transform module 616A determines a set of Haar coefficients for the Alpha channel of the 2×2 quad of pixels (as described above for the transform module 208). The set of Haar coefficients for the Alpha channel comprises a plurality of differential Alpha coefficients (dx.a, dy.a and dxy.a) and an average Alpha coefficient (dc.a). The differential Alpha coefficients (dx.a, dy.a and dxy.a) are provided from the alpha channel transform module 616A to the alpha coefficient encoding logic 622, and the average Alpha coefficient (dc.a) is provided from the alpha channel transform module 616A to the DC encoding module 612.

The alpha coefficient encoding logic 622 operates as described above for the coefficient encoding module 210 to thereby determining a first Alpha portion of the compressed data structure using the differential Alpha coefficients determined for the 2×2 quad of pixels. As will be apparent by analogy with the description above in relation to the coefficient encoding module 210, the first Alpha portion comprises: (i) a first set of Alpha bits which indicates an order of the magnitudes of the differential Alpha coefficients; and a second set of Alpha bits which indicates, for one or more of the differential Alpha coefficients which are non-zero, a sign and an exponent.

The DC encoding module 612 determines a second Alpha portion of the compressed data structure using the average Alpha coefficient determined for the 2×2 quad of pixels. In particular, the DC encoding module 612 determines the second Alpha portion of the compressed data structure as described above for the DC encoding module 212. That is, the DC encoding module 612 rounds the average alpha coefficient (dc.a) to determine an indication of the average coefficient, e.g. which has 5 or 6 bits, and which can be included in the compressed data structure.

In the examples described above, the block of pixels is a 2×2 block of pixels, such that it includes a single 2×2 quad of pixels. The examples described above may be referred to as "High Quality" or "HQ" encoding schemes.

Figure 9:
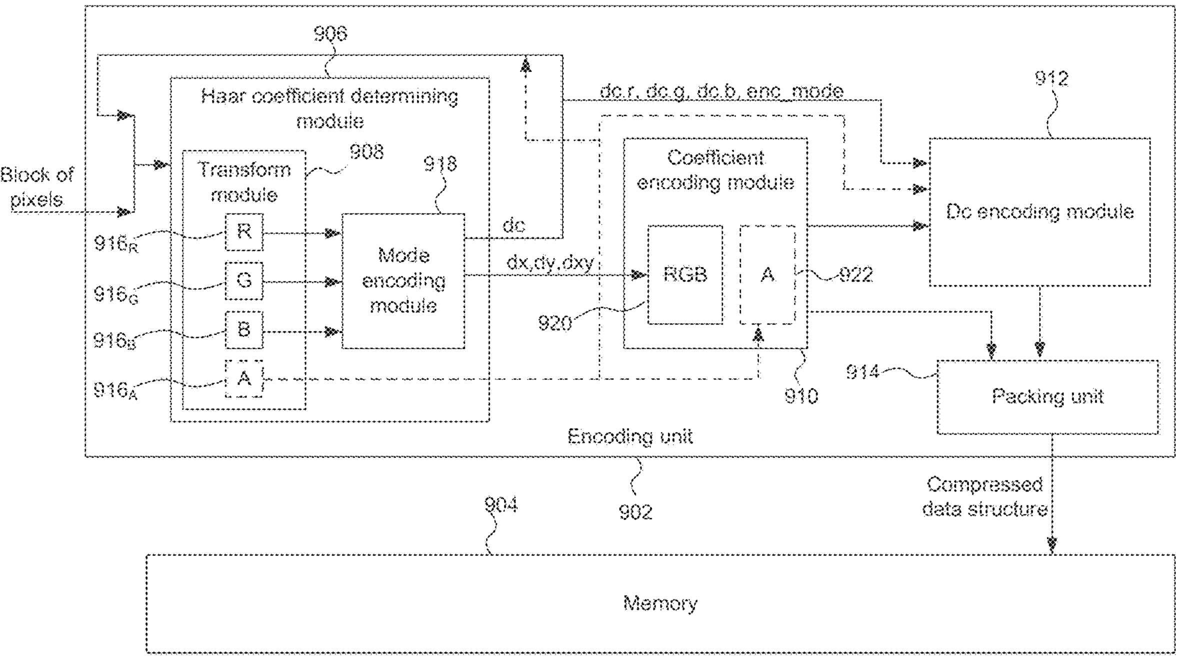
FIG. 9 illustrates a third example encoding system for encoding a block of pixels.

However, in an example described with reference to FIGS. 9 and 10, the block of pixels is a 4×4 block of pixels comprising four 2×2 quads of pixels. FIG. 9 illustrates a third example encoding system for encoding a block of pixels. The encoding system shown in FIG. 9 is very similar to the encoding system shown in FIG. 6, with the main difference being that the average coefficients determined by the Haar coefficient determining module 906 for four 2×2 quads within a 4×4 block of pixels are fed back to the input of the Haar coefficient determining module 906 and can be encoded as a 2×2 quad of coefficients, similar to how a 2×2 quad of pixels is encoded. In particular, the encoding system in FIG. 9 comprises an encoding unit 902 and a memory 904. The encoding unit 902 comprises a Haar coefficient determining module 906, which comprises a transform module 908 and a mode encoding module 918. The encoding unit 902 also comprises a coefficient encoding module 910, a DC encoding module 912 and a packing unit 914. The transform module 908 comprises respective channel transform modules for the Red Green and Blue channels $\mathbf{916}_R$, $\mathbf{916}_G$ and $\mathbf{916}_B$. In some examples, the transform module 908 may also include an alpha channel transform module $\mathbf{916}_A$. The alpha channel transform module $\mathbf{916}_A$ is shown with a dashed box in FIG. 9 because it is not always present, and we first describe an example which does not include the alpha channel transform module $\mathbf{916}_A$. The coefficient encoding module 910 comprises first coefficient encoding logic 920 for encoding the differential coefficients for the Red Green and Blue channels. In some examples, the coefficient encoding module 910 may also include alpha coefficient encoding logic 922. The alpha coefficient encoding logic 922 is shown with a dashed box in FIG. 9 because it is not always present, and we first describe an example which does not include the alpha coefficient encoding logic 922. The components of the encoding unit 902 shown in FIG. 9 may be implemented in hardware (e.g. fixed function circuitry), software, or a combination thereof.

The encoding system shown in FIG. 9 can perform the steps of the flow chart shown in FIG. 3 to encode a 4×4 block of pixels, wherein the pixels have values in Red, Green and Blue channels. As an example, each pixel value in each channel is represented with 8 bits (so 384 bits are used to represent the three channels of the sixteen pixels in a 4×4 block), but it is to be understood that this is just an example, and the same principles could be applied with pixel values having different numbers of bits.

The block of pixel values are received at the Haar coefficient determining module 906 of the encoding unit 902. In step S302 the Haar coefficient determining module 906 determines a set of Haar coefficients for each of the 2×2 quads of pixels within the 4×4 block of pixels. As described above, the set of Haar coefficients comprises, for each channel, a plurality of differential coefficients (dx, dy and dxy) and an average coefficient (dc). In particular, in step S302, the Haar coefficient determining module 906 determines, for each of the channels, differential channel coefficients as described above. So for each 2×2 quad, for the Red channel three differential channel coefficients (dx.r, dy.r and dxy.r) and an average coefficient (dc.r) are determined; for the Green channel three differential channel coefficients (dx.g, dy.g and dxy.g) and an average coefficient (dc.g) are determined, and for the Blue channel three differential channel coefficients (dx.b, dy.b and dxy.b) and an average coefficient (dc.b) are determined. These nine differential coefficients and three average coefficients are provided to the mode encoding module 918. In other examples, the three average coefficients might not be provided to the mode encoding module 918 because the mode encoding module operates on the differential coefficients, not the average coefficients.

Similarly to as described above with reference to the mode encoding module 618 shown in FIG. 6, for each 2×2 quad of pixels, the mode encoding module 918 combines the differential channel coefficients determined for the channels to determine the differential coefficients of the Haar coefficients for the 2×2 quad of pixels, but in this example, only the luma combining mode is used (i.e. the mode where enc_mode=000 as described above). Therefore, for each 2×2 quad of pixels, the mode encoding module 618 may combine the nine channel differential coefficients (dx.r, dy.r, dxy.r, dx.g, dy.g, dxy.g, dx.b, dy.b and dxy.b) to determine three differential coefficients (dx, dy and dxy) as:

$$dx = [dx.r + dx.g + dx.b]/3$$

$$dy = [dy.r + dy.g + dy.b]/3$$

$$dxy = [dxy.r + dxy.g + dxy.b]/3$$

These three differential coefficients for each of the 2×2 quads of pixels are passed to the coefficient encoding module 910.

Figure 10:
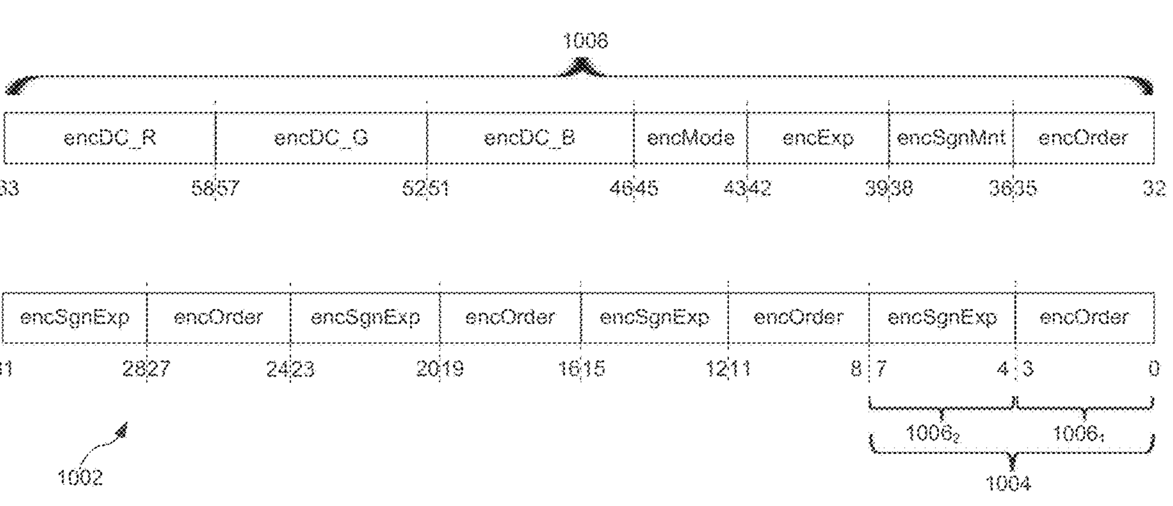
FIG. 10 shows a third example format of data in the compressed data structure.

FIG. 10 shows the format of data in the compressed data structure 1002 in this example. The compressed data structure 1002 comprises a first portion for each of the 2×2 quads. Each of the first portions comprises a first set of bits (denoted "encOrder") and a second set of bits (denoted "encSgnExp"). For a first of the 2×2 quads, the first portion is labelled 1004 in FIG. 10, the first set of bits is labelled $\mathbf{1006_1}$, and the second set of bits is labelled $\mathbf{1006_2}$) 1004. The other quads of pixels have the same respective sets of bits, but they are not labelled in FIG. 10. The compressed data structure 1002 also comprises a second portion 1008, which has a structure similar to the compressed data structure 702 shown in FIG. 7, and as described below encodes a quad of coefficients using the average coefficients determined for the four 2×2 quads of pixels within the 4×4 block of pixels. As described above, in this example, the input data values of the pixels in the 4×4 block are represented with 384 bits and the compressed data structure 1002 has 64 bits, so the compression ratio is 17% in this example (or 12.5% relative to the 32 bit redundantly packed RGBA data, with unused alpha).

In this example, the coefficient encoding module 910 implements a more aggressive compression of the differential coefficients for the 2×2 quads of pixels than described above in order to determine respective first portions 1004 of the compressed data structure 1002 for the 2×2 quads of pixels. In particular, the first set of bits $\mathbf{1006_1}$ is the same as the first set of bits $\mathbf{706_1}$ and $\mathbf{506_1}$ described above (though it may have different behaviour in some special cases). However, the second set of bits $\mathbf{1006_2}$ comprises a single section which indicates, for one or more of the differential coefficients which are non-zero, a sign and an exponent (and sometimes a mantissa bit in examples described herein). This is in contrast to the examples described above in which the second set of bits ($\mathbf{706_2}$ and $\mathbf{506_2}$) comprise two sections.

The second set of bits $\mathbf{1006_2}$ has four bits to indicate the signs and exponents of three differential coefficients. The encoding of the second set of bits $\mathbf{1006_2}$ depends on the number of non-zero differential coefficients (as indicated by the first set of bits $\mathbf{1006_1}$ (encOrder)).

When there are three non-zero differential coefficients and they are not all equal in magnitude (e.g. if encOrder is between 0000 and 0101), the three LSBs of the second set of bits $\mathbf{1006_2}$ are used to encode the signs of the three coefficients. Since there is just one remaining available bit, the two smaller coefficients are forced to have equal magnitude such that the parity of the coefficient ordering is redundant and the LSB of encOrder (which is labelled "orderSgn") is reinterpreted to encode the second LSB of the first coefficient's exponent. The MSB of the second set of bits $\mathbf{1006_2}$ is used to encode the LSB of the first coefficient's exponent. In the example shown below, in all of the possible combinations, the first coefficient has an exponent that lies within the range [4, 7], and the exponents of the other two coefficients are equal to each other and one less than the exponent of the first coefficient. The possible combinations of exponents for the three differential coefficients in this example are summarised in the table below:

| orderSgn | encSgnExp | exponent of first (i.e. largest) coefficient | exponent of second (i.e. middle) coefficient | exponent of third (i.e. smallest) coefficient |
|---|---|---|---|---|
| 0 | 0XXX | 4 | 3 | 3 |
| 0 | 1XXX | 5 | 4 | 4 |
| 1 | 0XXX | 6 | 5 | 5 |
| 1 | 1XXX | 7 | 6 | 6 |

When there are two non-zero differential coefficients (e.g. if encOrder is between 0110 and 1011), the second and third MSBs of the second set of bits $\mathbf{1006_2}$ are used to represent the two signs of the non-zero differential coefficients (the second MSB is used to encode the sign of the first i.e. larger coefficient and the third MSB is used to encode the sign of the second i.e. smaller coefficient), and the MSB and the LSB of the second set of bits $1006_2$ indicate one of a set of four possible combinations of exponents for the two non-zero differential coefficients. In the example shown below, in all of the possible combinations, the first coefficient has an exponent that lies within the range [4, 7], and the exponents of the other non-zero coefficient is one less than the exponent of the first coefficient. In this example, the MSB of the second set of bits ("encSgnExp") gives the LSB of the largest coefficient exponent and the LSB of the second set of bits ("encSgnExp") gives the second bit of the largest coefficient exponent. The possible combinations of exponents for the two non-zero differential coefficients in this example are summarised in the table below:

| encSgnExp | exponent of first (i.e. largest) coefficient | exponent of second (i.e. middle) coefficient |
|---|---|---|
| 0XX0 | 4 | 3 |
| 1XX0 | 5 | 4 |
| 0XX1 | 6 | 5 |
| 1XX1 | 7 | 6 |

When there is one non-zero differential coefficients (e.g. if encOrder is between 1100 and 1110), the second MSB of the second set of bits $1006_2$ is used to represent the sign of the non-zero differential coefficient, the MSB of the second set of bits $1006_2$ is used to represent the LSB of the exponent of the non-zero coefficient and the LSB of the second set of bits $1006_2$ is used to represent the second LSB of the exponent of the non-zero coefficient. If the two LSBs of the exponent of the non-zero coefficient are both zero, then the second LSB of the second set of bits $1006_2$ is used to represent the third LSB of the exponent of the non-zero coefficient, otherwise it is used to represent a single mantissa bit of the non-zero coefficient. The possible exponents for the single non-zero differential coefficient in this example are summarised in the table below:

| encSgnExp | exponent of first (i.e. largest) coefficient |
|---|---|
| 0X00 | 8 |
| 0X10 | 4 |
| 1XX0 | 5 |
| 0XX1 | 6 |
| 1XX1 | 7 |

This more aggressive encoding may be referred to as a "low quality" or "LQ" encoding. In the example given above, this LQ encoding does not provide for three equal magnitude coefficients. Instead, the three equal magnitude coefficient encoding (e.g. if encOrder is 1111) is repurposed to provide additional encodings for one non-zero differential coefficient. Since there is no indication from the coefficient ordering which of the three coefficients is largest (which could be used to determine the nonzero coefficient), the second LSB of the second set of bits $1006_2$ is used to indicate whether the dx coefficient is nonzero (when the second LSB is 0) or whether the dy coefficient is nonzero (when the second LSB is 1); there is no encoding to select the dxy coefficient (as a second order term, it is generally less important). The third LSB of the second set of bits $1006_2$ represents the sign of the non-zero coefficient, the MSB of the second set of bits $1006_2$ represents the LSB of the exponent of the non-zero coefficient and the LSB of the second set of bits $1006_2$ represents the second LSB of the exponent of the non-zero coefficient. If the two LSBs of the exponent of the nonzero coefficient are both zero, the coefficient is treated as being zero (so that a null vector can still be represented with this reinterpreted encoding) and the second and third LSBs, representing the indication of which coefficient is non-zero and its sign respectively, are both redundant and the second LSB of the second set of bits is instead used to indicate a prediction bypass flag (described later). In this example, the non-zero exponents lie in the range [1,3]. The possible exponents for the non-zero differential coefficients are summarised in the table below:

| encSgnExp | exponent of first (i.e. largest) coefficient |
|---|---|
| 0XX0 | NA |
| 1XX0 | 1 |
| 0XX1 | 2 |
| 1XX1 | 3 |

So, for each of the 2×2 quads of pixels the Haar coefficient determining module 906 determines a set of Haar coefficients for the 2×2 quad of pixels, wherein the set of Haar coefficients comprises a plurality of differential coefficients and an average coefficient, and then for each of the 2×2 quads of pixels, the coefficient encoding module 910 determines a respective first portion 1004 of the compressed data structure 1002 for the 2×2 quad of pixels using the differential coefficients determined for the 2×2 quad of pixels.

The second portion 1008 of the compressed data structure 1002 is determined by the encoding unit 902 using the average coefficients (dc) determined for each of the 2×2 quads of pixels. In particular, a 2×2 quad of coefficients represented by the average coefficients determined for each of the 2×2 quads of pixels is determined. As shown in FIG. 9, rather than be fed forward to the dc encoding module, the average coefficients are fed back to the input of the Haar coefficient determining module 906. These average coefficients represent a filtered version of the input block of pixels, e.g. having been filtered with a square box filter having a width of 2 pixels. In other words, the average coefficients are equivalent to a Level 1 ("L1") filtered representation of the input block of pixels.

The Haar coefficient determining module 906 operates on the 2×2 quad of coefficients in the same way that the Haar coefficient determining module 606 described above operates on a 2×2 quad of pixels. In this way, the Haar coefficient determining module 906 determines a set of L1 Haar coefficients for the 2×2 quad of coefficients, wherein the set of L1 Haar coefficients comprises a plurality of L1 differential coefficients and an L1 average coefficient.

The coefficient encoding module 910 determines a first sub-portion (including the "encOrder", "encSgnMnt" and "encExp" fields shown in bit positions 32 to 42 in FIG. 10) of the second portion 1008 of the compressed data structure using the L1 differential coefficients determined for the 2×2 quad of coefficients using the techniques described above with reference to the coefficient encoding module 610. The first sub-portion of the second portion 1008 comprises: (i) a first set of bits ("encOrder") which indicates an order of the magnitudes of the L1 differential coefficients, and (ii) a second set of bits ("encExp" and "EncSgnMnt") which indicates, for one or more of the L1 differential coefficients which are non-zero, a sign and an exponent. As described above, the "encExp" field indicates an exponent for one or more of the L1 differential coefficients which are non-zero, and the "EncSgnMnt" indicates a sign (and possibly one or more bits of mantissa) for one or more of the L1 differential coefficients which are non-zero.

The DC encoding module 910 determines a second sub-portion (including the "encDC_R", "encDC_G" and "encDC_B" fields shown in bit positions 46 to 63 in FIG. 10) of the second portion 1008 of the compressed data structure using the L1 average coefficient determined for the 2×2 quad of coefficients using the techniques described above with reference to the DC encoding module 612. In particular, the second sub-portion of the second portion 1008 of the compressed data structure 1002 comprises bits representing the value of the L1 average coefficient determined for the 2×2 quad of coefficients.

The mode encoding module 918 determines a third sub-portion (including the "encMode" field shown in bit positions 43 to 45 in FIG. 10) of the second portion 1008 of the compressed data structure using the techniques described above with reference to the mode encoding module 618.

In some examples, the values of the differential coefficients (i.e. the dx, dy and dxy coefficients) for a 2×2 quad of pixels are predicted based on the average coefficients (i.e. the dc coefficients) of one or more neighbouring 2×2 quads of pixels. Differences (or "delta values") between the predicted values and the original values of the differential coefficients for the 2×2 quad of pixels can be determined and then used in place of the differential coefficients for the encoding of the differential coefficients (i.e. for determining the first portion of the compressed data structure). The delta values tend to be smaller in magnitude than the differential coefficients themselves. In general, the encoding techniques described herein will be more accurate (i.e. introduce fewer or less significant artefacts) when the values which are encoded as the differential coefficients have smaller magnitude. The average coefficients (i.e. the dc coefficients) are unmodified by the prediction. If the differential coefficients have zero magnitude, a bypass control signal may be set, and in response to this bypass control signal being set, the encoding unit might not implement this prediction technique. This avoids (potentially harmful) prediction in regions of flat colour.

Sometimes the average coefficients of the neighbouring 2×2 quads might not all be available, in which case the dc value of the current 2×2 quad may be used in the prediction. In the explanation given below, the control signals "enable_n", "enable_e", "enable_s" and "enable_w" indicate whether the average coefficient is available for a quad across each of the northern, eastern, southern and western axis-aligned quad boundaries. One or more of these signals may be low when encoding quads at the boundary of a block-based scheme. The original Haar coefficients before the prediction (i.e. "upstream" of the prediction) are denoted "dx_up", "dy_up", "dxy_up" and "dc_up", and the coefficients after the prediction (i.e. "downstream" of the prediction) are denoted "dx_dn", "dy_dn", "dxy_dn" and "dc_dn". As mentioned above, the dc coefficient is not modified by the prediction, so dc_dn=dc_up.

The bypass control signal is set (as described above) such that:

$$\text{bypass} = \begin{cases} \text{true} & \text{if } |\text{dx\_up}| = 0 \wedge |\text{dy\_up}| = 0 \wedge |\text{dxy\_up}| = 0 \\ \text{false} & \text{otherwise} \end{cases}$$

The predictor for the dx coefficient selects eastern and western dc coefficients, as available, for terms $c_e$ and $c_w$ respectively:

$$c_e = \begin{cases} \text{dc\_e} & \text{if enable\_e} \\ \text{dc\_up} & \text{otherwise} \end{cases} \quad c_e = \begin{cases} \text{dc\_w} & \text{if enable\_w} \\ \text{dc\_up} & \text{otherwise} \end{cases}$$

An unnormalised prediction δ', is defined by $\delta'_x = c_e - c_w$. The prediction is normalised by the separation distance of dc terms. If only a single neighbour is available, this distance is half that of when both neighbours are available (since the missing neighbour is replaced by the central value). The (normalised) prediction $\delta_x$ is given by:

$$\delta_x = \begin{cases} \frac{\delta'_x}{4} & \text{if enable\_e} \wedge \text{enable\_w} \\ \frac{\delta'_2}{2} & \text{otherwise} \end{cases}$$

where the value of the normalised prediction $\delta_x$ may be rounded in accordance with a rounding mode, e.g. a round to nearest mode. It is noted that if neither the east nor the west neighbour is available, the prediction is by definition zero, such that the normalisation factor is irrelevant.

The residual dx coefficient (i.e. the delta value representing the difference between the dx coefficient and the prediction of the dx coefficient) is given as $\text{dx\_dn} = \text{dx\_up} - \delta_x$. The value of dx_dn may be rounded in accordance with a rounding mode, e.g. a round to nearest mode.

The predictor for the dy coefficient selects northern and southern dc coefficients, as available, for terms $c_n$ and $c_s$ respectively:

$$c_n = \begin{cases} \text{dc\_n} & \text{if enable\_n} \\ \text{dc\_up} & \text{otherwise} \end{cases} \quad c_s = \begin{cases} \text{dc\_s} & \text{if enable\_s} \\ \text{dc\_up} & \text{otherwise} \end{cases}$$

An unnormalised prediction δ', is defined by $\delta'_y = c_s - c_n$. The prediction is normalised by the separation distance of dc terms. If only a single neighbour is available, this distance is half that of when both neighbours are available (since the missing neighbour is replaced by the central value). The (normalised) prediction $\delta_y$ is given by:

$$\delta_y = \begin{cases} \frac{\delta'_y}{4} & \text{if enable\_n} \wedge \text{enable\_s} \\ \frac{\delta'_y}{2} & \text{otherwise} \end{cases}$$

where the value of the normalised prediction $\delta_y$ may be rounded in accordance with a rounding mode, e.g. a round to nearest mode. It is noted that if neither the north nor south neighbour is available, the prediction is by definition zero, such that the normalisation factor is irrelevant.

The residual dy coefficient (i.e. the delta value representing the difference between the dy coefficient and the prediction of the dy coefficient) is given as $\text{dy\_dn} = \text{dy\_up} - \delta_y$. The value of dy_dn may be rounded in accordance with a rounding mode, e.g. a round to nearest mode.

The predictor for the dxy coefficient selects north-western, north-eastern, south-western and south-eastern dc coefficients, as available, for terms $c_{nw}$, $c_{ne}$, $c_{sw}$ and $c_{se}$ respectively. Ideally, for each term, data across both relevant boundaries is available. Otherwise, the predictor selects which of the relevant northern, eastern, southern and western coefficients are available, if any, for a given term, as follows:

$$c_{nw'} = \begin{cases} \text{dc\_nw} & \text{if enable\_n} \wedge \text{enable\_w else} \\ \text{dc\_n} & \text{if enable\_n else} \\ \text{dc\_w} & \text{if enable\_w} \\ \text{dc\_up} & \text{otherwise} \end{cases}$$

$$c_{nwe'} = \begin{cases} \text{dc\_ne} & \text{if enable\_n} \wedge \text{enable\_e else} \\ \text{dc\_n} & \text{if enable\_n else} \\ \text{dc\_e} & \text{if enable\_e} \\ \text{dc\_up} & \text{otherwise} \end{cases}$$

$$c_{sw'} = \begin{cases} \text{dc\_sw} & \text{if enable\_s} \wedge \text{enable\_w else} \\ \text{dc\_s} & \text{if enable\_s else} \\ \text{dc\_w} & \text{if enable\_w} \\ \text{dc\_up} & \text{otherwise} \end{cases}$$

$$c_{se'} = \begin{cases} \text{dc\_se} & \text{if enable\_s} \wedge \text{enable\_e else} \\ \text{dc\_s} & \text{if enable\_s else} \\ \text{dc\_e} & \text{if enable\_e} \\ \text{dc\_up} & \text{otherwise} \end{cases}$$

An unnormalised prediction $\delta''_{xy}$ is defined by $\delta'_{x'} = \frac{1}{2}(c_{nw}+c_{se}-c_{ne}-c_{sw})$. The prediction is normalised by the separation distance of dc terms along the x and y axes. If only a single neighbour is available along a given axis, this distance is half that of when both neighbours are available (since the missing neighbour is replaced by the central value). The (normalised) prediction $\delta_{xy}$ is given (in terms of an intermediate prediction $\delta'_{xy}$) by:

$$\delta'_{xy} = \begin{cases} \frac{\delta''_{xy}}{4} & \text{if enable\_n} \wedge \text{enable\_s} \\ \frac{\delta''_{xy}}{2} & \text{otherwise} \end{cases}$$

$$\delta_{xy} = \begin{cases} \frac{\delta'_{xy}}{4} & \text{if enable\_e} \wedge \text{enable\_w} \\ \frac{\delta'_{xy}}{2} & \text{otherwise} \end{cases}$$

where the values of the intermediate prediction $\delta'_{xy}$ and the normalised prediction $\delta_{y}$ may be rounded in accordance with a rounding mode, e.g. a round to nearest mode. It is noted that if neither neighbour is available for a given axis, the prediction is by definition zero, such that the normalisation factor is irrelevant.

The residual dxy coefficient (i.e. the delta value representing the difference between the dxy coefficient and the prediction of the dxy coefficient) is given as $\text{dxy\_dn}=\text{dxy\_up}-\delta_{xy}$. The value of dxy_dn may be rounded in accordance with a rounding mode, e.g. a round to nearest mode.

As mentioned above, in some examples, each pixel in the block of pixels has a further value in an Alpha channel. In this case, the transform module 908 comprises the alpha channel transform module 916$_A$ and the coefficient encoding module comprises the alpha coefficient encoding logic 922. The DC encoding module is also configured to encode a DC value for the alpha channel. In this example, when an alpha channel is present in addition to the Red, Green and Blue channels, the encoding unit is configured to encode the values in the Alpha channel independently of the values in the Red, Green and Blue channels. In one example, Haar coefficients are determined for each of the 2×2 quads of pixels using the low quality encoding scheme, and the average coefficients for the alpha channel are fed back to the input of the Haar coefficient determining module 906 so they can be processed as a quad of coefficients to determine the L1 Haar coefficients for the alpha channel, using the high quality scheme. The processing then proceeds as described above for the alpha channel independently of the Red, Green and Blue channels. In another example, the alpha channel is encoded using the high quality encoding scheme only (as in FIGS. 5 and 6) and packed alongside the low quality RGB data. Such a scheme achieves overall 25% compression, with 4 bits per pixel allocated to the RGB data and 4 bits per pixel allocated to the alpha data.

The coefficient encoding modules (210, 610, 910) described above employ a combination of deduction and heuristic to determine a suitable encoding of a block of pixels. As an example, the following conditions, applied to sorted and then suitably rounded (e.g. to the available low precision float formats) input coefficients, may be evaluated in decreasing precedence:

1. If the largest differential coefficient has zero magnitude or a bypass control signal has been set, then 0 non-zero coefficients are encoded and encOrder is set to 1111. The label "PTFC_0D" (which is used to indicate all zero coefficients as a special case of matching coefficients i.e. "PTFC_MD"; this can be useful to distinguish cases that might need remapping as in the RGB dc coefficient encoding described earlier) is assigned to this situation.
2. If the encoding is to be a high quality encoding (such that a "hq" control signal has been set) and the middle of the ordered differential coefficients has zero magnitude (which of course implies that the lowest of the ordered differential coefficients also has zero magnitude), or the hq control signal has not been set (i.e. such that the low quality encoding is used) and the largest of the ordered differential coefficients has a rounded exponent of 8, then 1 nonzero coefficient is encoded, and encOrder is set to one of 1100, 1101 or 1110 depending on the ordering of the differential coefficients as described above. The label "PTFC_1D" is assigned to this situation.
3. If the hq control signal has been set and the differential coefficients have matching exponents or the largest differential coefficient exponent lies outside the closed interval [4,7] and the range in exponents of the differential coefficients is no greater than 1, then 3 nonzero coefficients of equal magnitude are encoded, and encOrder is set to 1111. If the hq control signal has not been set and the exponent of the largest differential coefficient is smaller than 4, at most 1 nonzero coefficient is encoded (encodings ordinarily reserved for matching coefficients are repurposed for 1 coefficient due to encoding sparsity in the low quality mode). However, in either case, the label "PTFC_MD" is assigned.
4. If the hq control signal has been set and the range of the exponents of the coefficients is less than 2, then 3 nonzero coefficients of nonequal magnitude are encoded, and encOrder is set to one of 0000 to 0101 depending on the ordering of the differential coefficients as described above. If the hq control signal is set, the range of the exponents of the coefficients is 2, the mantissa of the major coefficient (rounded to three bits of mantissa) is not equal to 1.375 and the exponent of the largest coefficient lies in the interval [4,7], then 3 nonzero coefficients of nonequal magnitude are encoded, and encOrder is set to one of 0000 to 0101 depending on the ordering of the differential coefficients as described above. If the hq control signal is not set and the exponent range of coefficients is less than or equal to 2, then 3 nonzero coefficients of equal magnitude are encoded, and encOrder is set to one of 0000 to 0101 depending on the ordering of the differential coefficients as described above. The label “PTFC_3D” is assigned.

5. If the hq control signal has been set and the difference in exponent between the two largest coefficients, when the larger coefficient is rounded with 1 bit of mantissa (when available), is less than 1 (it can be negative in the high quality mode due to potentially higher precision representation of the larger coefficient, such that rounding does not preserve the ordering of terms), then 2 nonzero coefficients are encoded, and encOrder is set to one of 0110 to 1011 depending on the ordering of the differential coefficients as described above. If the hq control signal has been set, the two larger coefficients exponent difference is 1 (taking into account rounding when the larger coefficient has 1 bit of mantissa) and the larger exponent lies in the closed exponent interval [4,7], then 2 nonzero coefficients are encoded and encOrder is set to one of 0110 to 1011 depending on the ordering of the differential coefficients as described above. If the hq control signal has not been set and the non-zero coefficient exponent difference is less than 2, then 2 nonzero coefficients are encoded, and encOrder is set to one of 0110 to 1011 depending on the ordering of the differential coefficients as described above. The label “PTFC_2D” is assigned.
6. If the hq control signal has been set, but the largest coefficient exponent (rounded to one bit of mantissa as appropriate for 2 non-zero coefficients encoding) lies outside the closed exponent interval [4,7], then 1 non-zero coefficient is encoded and encOrder is set to one of 1100 to 1110 depending on the ordering of the differential coefficients as described above. If the hq control signal has not been set, then 1 nonzero coefficient is encoded (this is thus the last condition for the low quality encoding and subsequent conditions only apply when the hq control signal has been set). The label “PTFC_1D” is assigned.
7. If the difference in exponent between the two largest coefficients, when the largest coefficient is rounded with 1 bit of mantissa, is 2, then 2 nonzero coefficients are encoded, and encOrder is set to one of 0110 to 1011 depending on the ordering of the differential coefficients as described above. If the 2d exponent range is 3, the mantissa of the rounded 2d major coefficient is 1 and the mantissa of the major coefficient is neither 1.125 nor 1.625, then 2 nonzero coefficients are encoded, and encOrder is set to one of 0110 to 1011 depending on the ordering of the differential coefficients as described above. The label “PTFC_2D” is assigned.
8. If none of the above conditions are satisfied, then 1 nonzero coefficient is encoded, and encOrder is set to one of 1100 to 1110 depending on the ordering of the differential coefficients as described above. The label “PTFC_1 D” is assigned.

The encoding processes described above is efficient to implement (e.g. in terms of latency, power consumption and/or silicon area).

We now go on to describe how a compressed data structure representing a block of pixels is decoded. As described above, the decoding process involves representing a 2×2 quad of pixels as the dc value+some differential term, which is determined by performing a weighted sum of the dx, dy and dxy coefficients.

Figure 11:
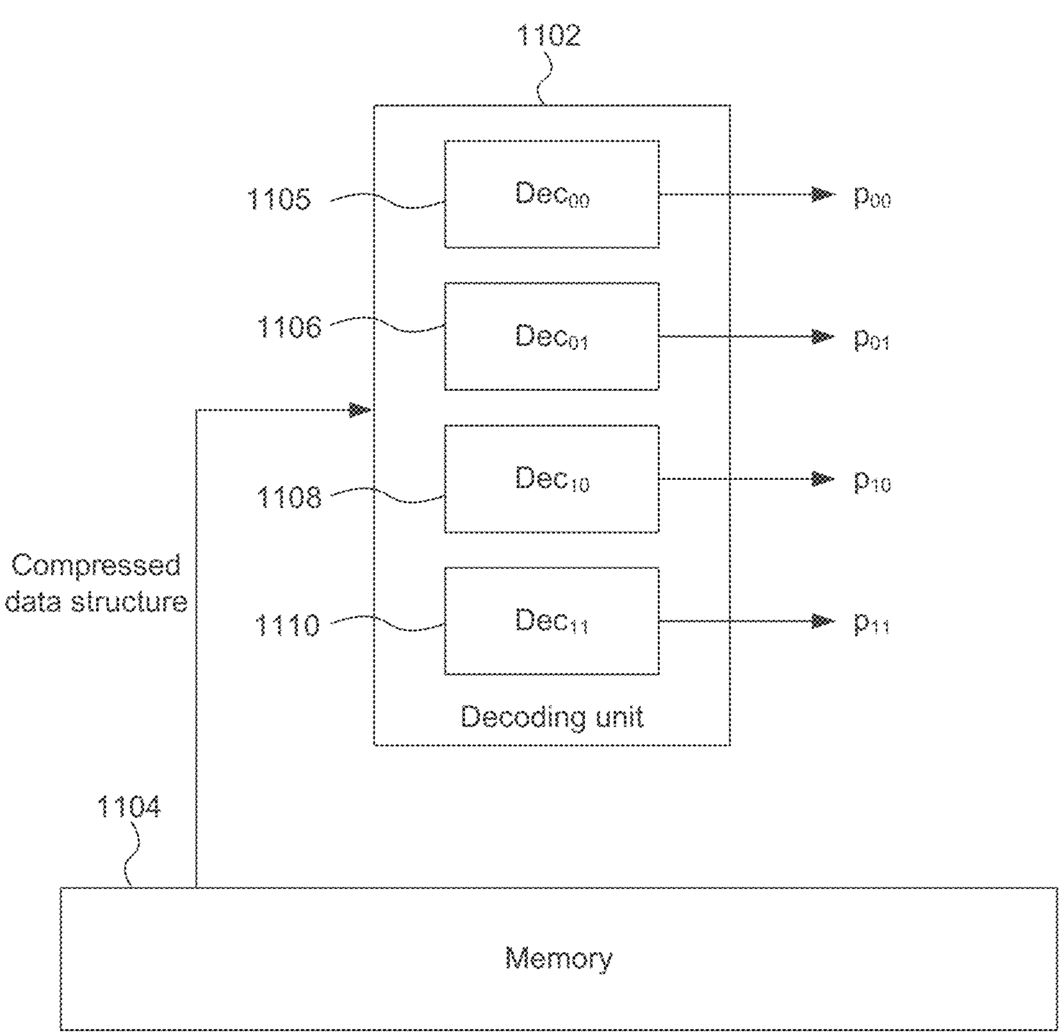
FIG. 11 illustrates a first example decoding system for decoding a compressed data structure.

FIG. 11 illustrates a first example decoding system for decoding a compressed data structure to determine a decoded value. The decoded value represents: (i) a value (e.g. a pixel value) at a pixel position of the 2×2 quad of pixels, or (ii) a filtered value (e.g. a filtered texture value) at a position within the block of pixels. The compressed data structure has been encoded as described above. As such, the compressed data structure encodes a set of Haar coefficients for a 2×2 quad of pixels of a block of pixels, wherein the set of Haar coefficients comprises a plurality of differential coefficients (dx, dy and dxy) and an average coefficient (dc). A first portion (e.g. 504) of the compressed data structure encodes the differential coefficients for the 2×2 quad of pixels and comprises: (i) a first set of bits (e.g. $\mathbf{506_1}$) which indicates an order of the magnitudes of the differential coefficients, and (ii) a second set of bits (e.g. $\mathbf{506_2}$) which indicates a sign and an exponent for each of one or more of the differential coefficients which are non-zero. A second portion (e.g. 508) of the compressed data structure encodes the average coefficient for the 2×2 quad of pixels. The decoding system shown in FIG. 11 comprises a decoding unit 1102 and a memory 1104 (which may be the same as memory 204 as shown in FIG. 2, memory 604 shown in FIG. 6 or memory 904 shown in FIG. 9). The decoding unit 1102 comprises four decoder instances 1105, 1106, 1108 and 1110. Each of the decoder instances operates in parallel to determine a decoded value ($p_{00}$, $p_{01}$, $p_{10}$ and $p_{11}$ respectively) as described below. More generally, the decoding unit 1102 may comprise one or more decoder instance. The components of the decoding unit 1102 shown in FIG. 11 may be implemented in hardware (e.g. fixed function circuitry), software, or a combination thereof.

Figure 12:
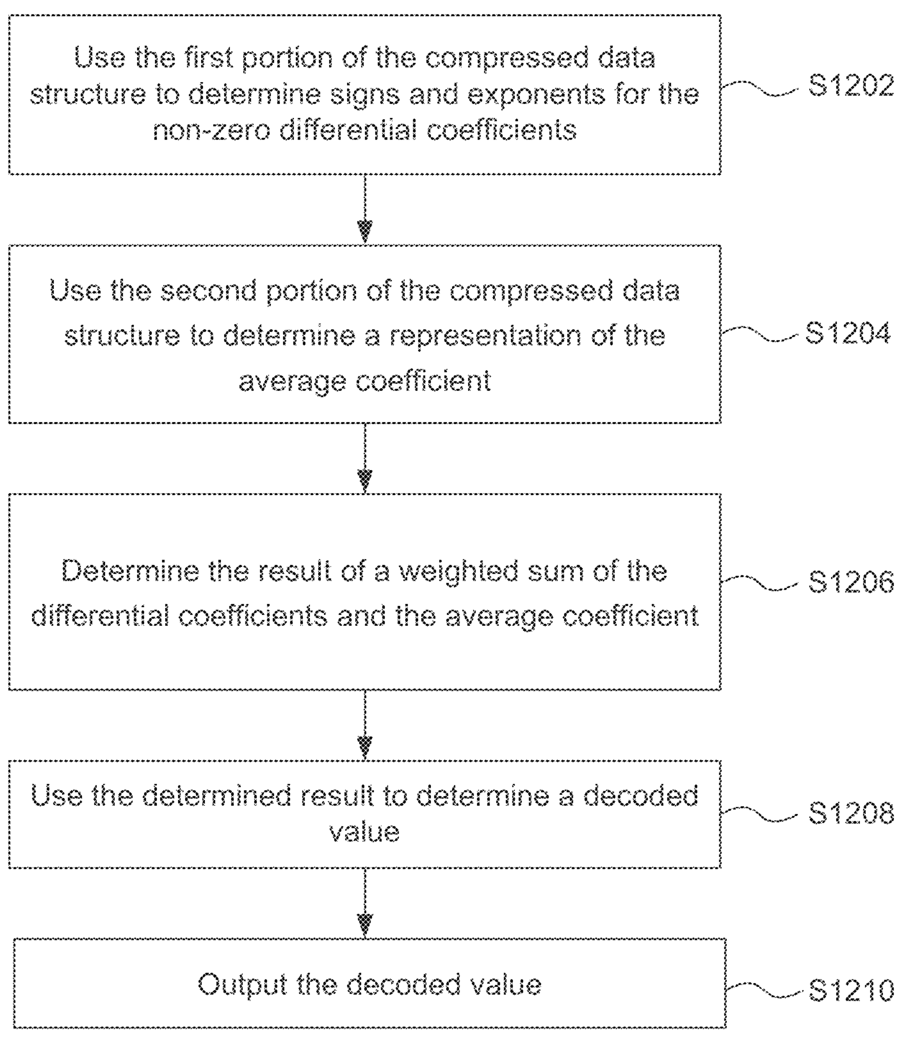
FIG. 12 is a flow chart for a first example method of decoding a compressed data structure to determine a decoded value.

FIG. 12 is a flow chart for a method of decoding a compressed data structure to determine a decoded value in the decoder instance 1105, but it is to be understood that each of the decoder instances (1106, 1108 and/or 1110) can implement the same method. The steps of the method may be performed in hardware (e.g. using dedicated hardware, such as fixed function circuitry) or software or a combination thereof in the decoding unit 1102. We will first describe a simple example in which a compressed data structure is decoded to determine pixel values of a 2×2 quad of pixels, wherein each pixel comprises value in a single channel, but the same steps shown in FIG. 12 are applied in other, more complex, examples as described below. In this example each pixel value in the channel is represented with 8 bits, but it is to be understood that this is just an example, and the same principles could be applied with pixel values having different numbers of bits.

The compressed data structure is received at the decoding unit 1102, e.g. from the memory 1104. In step S1202 the decoding unit 1102 (e.g. the decoder instance 1105) uses the first portion (e.g. 504) of the compressed data structure to determine signs and exponents for the one or more of the differential coefficients which are non-zero for the 2×2 quad of pixels. As described above, the first portion (e.g. 504) of the compressed data structure comprises: (i) a first set of bits (e.g. $\mathbf{506_1}$) which indicates an order of the magnitudes of the differential coefficients, and (ii) a second set of bits (e.g. $\mathbf{506_2}$) which indicates a sign and an exponent for each of one or more of the differential coefficients which are non-zero. Different implementations for how the first portion of the compressed data structure indicates the signs and exponents for the differential coefficients are described above, and it will be apparent how the decoder can determine the signs and exponents for the one or more of the differential coefficients which are non-zero from the first portion of the compressed data structure in the different implementations described above. As described above, the first set of bits also indicates whether any (and if so, which) of the differential coefficients are zero. So in step S1202 the decoding unit 1102 (e.g. the decoder instance 1105) can determine whether any (and if so, which) of the differential coefficients are zero using the first portion (e.g. 504) of the compressed data structure. It is noted that in most situations, the decoding unit 1102 (e.g. the decoder instance 1105) does not determine any mantissa bits for the differential coefficients, although in some situations one or more mantissa bits are determined (as described above).

In step S1204 the decoding unit 1102 (e.g. the decoder instance 1105) uses the second portion (e.g. 508) of the compressed data structure to determine a representation of the average coefficient for the 2×2 quad of pixels. Different implementations for how the second portion of the compressed data structure indicates the average coefficient are described above (including examples in which the first portion (e.g. 504) of the compressed data structure also contribute to the determination of the average coefficient), and it will be apparent how the decoder can determine the average coefficient from the second portion of the compressed data structure in the different implementations described above. For example, the bits of the second portion of the compressed data structure may be a rounded version of the average coefficient.

In step S1206 the decoding unit 1102 (e.g. the decoder instance 1105) determines the result of a weighted sum of the differential coefficients and the average coefficient for the 2×2 quad of pixels. This is done using: (i) the determined signs and exponents for the one or more of the differential coefficients (dx, dy and dxy) which are non-zero, (ii) the determined representation of the average coefficient (dc), and (iii) respective weights ($w_x$, $w_y$ and $w_{xy}$) for the differential coefficients.

The weighted sum of the differential coefficients and the average coefficient for the 2×2 quad of pixels may comprise adding a gamma correction term. For example, the weighted sum may be determined as: $dc+w_x \cdot dx+w_y \cdot dy+w_{xy} \cdot dxy+\gamma$, where $\gamma$ is an optional pseudo gamma correction term. The gamma correction term can be determined empirically, and may be different in different implementations. For example, in some implementations $\gamma=0$. As another example, in other implementations, $\gamma=\alpha[(1-|w_x|)|dx|+(1-|w_y|)|dy|+(1-|w_{xy}|)|dxy|]$, where $\alpha$ is some fixed constant (e.g. $\alpha=1/4$ or $\alpha=1/8$), selected to provide the best approximation for the target application, while minimising computational complexity. If $\alpha$ is known at the point of compression, the transform module (e.g. 208) may be modified to perform gamma correction on the average coefficient dc, either according to the exact gamma response of the colour format or according to the following expression:

$$dc_\gamma = dc + \alpha(|dx| + |dy| + |dxy|)$$

where $dc_\gamma$ is the "gamma correct" average coefficient. With this substitution, the weighted sum simplifies to $$dc_\gamma + w_x \cdot dx + w_y \cdot dy + w_{xy} \cdot dxy - \alpha(|w_x \cdot dx| + |w_y \cdot dy| + |w_{xy} \cdot dxy|)$$

which, assuming $\alpha$ is a simple power of two (or zero), can be implemented in binary arithmetic as a signed sum of shifted terms involving products of the differential coefficients dx, dy and dxy and their respective weights $w_x$, $w_y$ and $w_{xy}$.

Since the differential coefficients are represented as signed exponents, the determination in step S1206 of the result of the weighted sum of the differential coefficients and the average coefficient for the 2×2 quad of pixels does not need to involve performing any multiplication or division operations. For example, it may involve performing a binary shift of the weights in accordance with the exponents that were determined in step S1202 for the respective one or more of the differential coefficients, and summing the representation of the average coefficient that was determined in step S1202 and the shifted weights in accordance with the signs that were determined in step S1202 for the respective one or more of the differential coefficients. If a sign is negative, true negation of the corresponding shifted weight can be approximated with bit inversion (although exact inversion can alternatively be adopted without a significant increase in complexity). In particular, if the weights are supplied in a signed magnitude format (such that a value is encoded with a single bit representing its sign and a plurality of bits representing its magnitude, as in an unsigned integer format), a product of a differential coefficient, represented as a signed exponent, and its respective weight is given by $(-1)^{s_d \oplus s_w} \cdot (2^{e_d}|w|)$ where $s_w$ is the sign of the weight, $s_d$ is the sign of the coefficient and $e_d$ is its exponent, which is particularly efficient to implement using binary arithmetic. For such differential coefficients, the above weighted sum can be written thus:

$$dc_\gamma + (-1)^{s_{d_x} \oplus s_{w_x}} \cdot \left(2^{e_{d_x}}|w_x|\right) + (-1)^{s_{d_y} \oplus s_{w_y}} \cdot \left(2^{e_{d_y}}|w_y|\right) + (-1)^{s_{d_{xy}} \oplus s_{w_{xy}}} \cdot \left(2^{e_{d_{xy}}}|w_{xy}|\right) - \alpha\left(2^{e_{d_x}}|w_x| + 2^{e_{d_y}}|w_y| + 2^{e_{d_{xy}}}|w_{xy}|\right)$$

which is seen in binary arithmetic, if $\alpha$ is a power of two (e.g. $\alpha=1/4$ or $\alpha=1/8$) or zero, to be a signed sum of shifted terms involving (the magnitudes of) $w_x$, $w_y$ and $w_{xy}$. Note that the above efficient representation holds whether or not gamma correction is applied (e.g. when $\alpha=0$).

If there are fewer than three non-zero coefficients, the above expression simplifies further. In some examples, the largest differential coefficient may be represented with one bit of mantissa if no more than two differential coefficients are represented as being non-zero. Furthermore, in some examples, the largest differential coefficient may be represented with two bits of mantissa if only one differential coefficient (i.e. the largest) is represented as being non-zero. Such examples introduce additional precision without increasing the overall arithmetic complexity. A generalised form of the above weighted sum is given by:

$$dc_\gamma + (-1)^{s_{d_0} \oplus s_{w_0}} \cdot \left(2^{e_{d_0}}\left(1 + m_1 2^{-1} + m_2 2^{-2}\right)|w_0|\right) + (-1)^{s_{d_1} \oplus s_{w_1}} \cdot \left(2^{e_{d_1}}|w_1|\right) + (-1)^{s_{d_2} \oplus s_{w_2}} \cdot \left(2^{e_{d_2}}|w_2|\right) - \alpha\left(2^{e_{d_0}}|w_0| + 2^{e_{d_1}}|w_1| + 2^{e_{d_2}}|w_2|\right)$$

where $d_0$, $d_1$ and $d_2$ are the differential coefficients sorted in order of decreasing magnitude, $w_0$, $w_1$ and $w_2$ are their respective (sorted) weights and $m_1$ and $m_2$ are the first and second mantissa bits of the largest coefficient $d_0$. Since $m_2 \neq 0$ implies that $d_1=d_2=0$ the weighted sum may be written $$dc_\gamma + (-1)^{s_{d_0} \oplus s_{w_0}} \cdot \left(2^{e_{d_0}} |w_0|\right) + (-1)^{s_{d_0} \oplus s_{w_0}} \cdot \left(m_1 2^{e_{d_0}-1} |w_0|\right) + (-1)^{s_{d_0} \oplus s_{w_0}} \cdot \left(m_2 2^{e_{d_0}-2} |w_0|\right) - \alpha\left(2^{e_{d_0}} |w_0| + m_1 2^{e_{d_0}-1} |w_0| + m_2 2^{e_{d_0}-2} |w_0|\right)$$

whenever the largest coefficient has two bits of mantissa (and therefore the remaining coefficients are zero). This expression has the same number of shifted additive terms as the pure exponent (i.e. no mantissa) expression and thus has a similar arithmetic complexity. Note that the (single bit) mantissa coefficients $m_1$ and $m_2$ represent values of one or zero and thus act only to include or exclude an additive term (the logic for which may anyway exist to handle zero coefficients). Otherwise, since $m_1 \neq 0$ implies that $d_2=0$ the weighted sum may be written $$dc_\gamma + (-1)^{s_{d_0} \oplus s_{w_0}} \cdot \left(2^{e_{d_0}} |w_0|\right) + (-1)^{s_{d_1} \oplus s_{w_1}} \cdot \left(2^{e_{d_1}} |w_1|\right) + (-1)^{s_{d_0} \oplus s_{w_0}} \cdot \left(m_1 2^{e_{d_0}-1} |w_0|\right) - \alpha\left(2^{e_{d_0}} |w_0| + 2^{e_{d_1}} |w_1| + m_1 2^{e_{d_0}-1} |w_0|\right)$$

whenever the largest coefficient has one bit of mantissa (but not two). This expression has the same number of shifted additive terms as the pure exponent expression and thus has a similar arithmetic complexity. Hence we see that additional precision can be introduced without increasing complexity by replacing terms (using relatively cheap selection logic) involving zero coefficients with partial mantissa products.

In step S1208 the decoding unit 1102 (e.g. the decoder instance 1105) uses the result determined in step S1206 to determine the decoded value. In step S1210 the decoding unit 1102 (e.g. the decoder instance 1105) outputs the determined decoded value. The outputted decoded value may be used in any suitable manner, e.g. processed by a processing unit, transmitted to another device or stored in a memory (e.g. in the memory 1304) to give just a few examples of how the decoded value may be used.

In the example shown in FIG. 11, the decoder unit 1102 is configured to output pixel values representing the original pixel values of a 2×2 quad of pixels prior to being encoded. So in this example, the decoding unit 1102 is not intended to apply filtering to the values, and is instead intended to provide representations of the original pixel values. These representations may be exactly the same as the original pixel values (in a lossless scheme) or they may be approximations of the original pixel values (in a lossy scheme). This approach is useful for a frame buffer decompression process. In the example shown in FIG. 11, the four decoder instances 1105, 1106, 1108 and 1110 each output a different respective one of the original pixel values of the 2×2 quad of pixel values that was encoded. The four decoder instances operate independently and/or in parallel to output the four pixel values. The different decoder instances use different weights ($w_x$, $w_y$ and $w_{xy}$) in order to determine different decoded values representing the different pixels of the 2×2 quad of pixels. In this example, the weights do not need to be changed during runtime, so the weights are predetermined for use by the different decoder instances. For example, the weights may be pre-stored in the decoder instances and/or configured into the hardware (e.g. fixed function circuitry) of the decoder instances.

In the example shown in FIG. 11, the result of the weighted sum determined in step S1206 is the decoded value that is then output from the decoder instance, i.e. no further processing is performed on the result of the weighted sum in order to determine the decoded value. Therefore, in this example, step S1208 of using the determined result to determine the decoded value comprises using the determined result as the decoded value representing a value at a pixel position of the 2×2 quad of pixels.

As mentioned above, steps S1206 and S1208 are performed four times for the respective four pixels of the 2×2 quad of pixels by the respective four decoder instances. Steps S1202 and S1204 may be performed a single time to determine the average coefficient and the signs and exponents of the differential coefficients for the 2×2 quad of pixels, with those values being provided to each of the decoder instances. Alternatively, each of the decoder instances may implement steps S1202 and S1204. As noted above, when the $w_x$, $w_y$ and $w_{xy}$ weights all have unit magnitude and the sign of the $w_{xy}$ weight is the sign of the product of the $w_x$ and $w_y$ weights, then the decoder will reconstruct one of the original 4 pixels in the 2×2 quad. When the $w_x$, $w_y$ and $w_{xy}$ weights all have unit magnitude then the pseudo gamma correction term described above is zero.

As noted above with reference to FIG. 4, $dx=\frac{1}{4}(p_{10}+p_{11}-p_{00}-p_{01})$, $dy=\frac{1}{4}(p_{01}+p_{11}-p_{00}-p_{10})$, $dxy=\frac{1}{4}(p_{00}+p_{11}-p_{10}-p_{01})$ and $dc=\frac{1}{4}(p_{00}+p_{01}+p_{10}+p_{11})$. The predetermined weights ($w_x$, $w_y$ and $w_{xy}$) used by the decoder instance 1105 are $w_x=-1$, $w_y=-1$ and $w_{xy}=+1$. Therefore, the result of the weighted sum determined in step S1206 is given by $\frac{1}{4}(p_{00}+p_{01}+p_{10}+p_{11})-\frac{1}{4}(p_{10}+p_{11}-p_{00}-p_{01})-\frac{1}{4}(p_{01}+p_{11}-p_{00}-p_{10})+(p_{00}+p_{11}-p_{10}-p_{01})+0=p_{00}$.

The predetermined weights ($w_x$, $w_y$ and $w_{xy}$) used by the decoder instance 1106 are $w_x=-1$, $w_y=+1$ and $w_{xy}=-1$. Therefore, the result of the weighted sum determined in step S1206 is given by $\frac{1}{4}(p_{00}+p_{01}+p_{10}+p_{11})-\frac{1}{4}(p_{10}+p_{11}-p_{00}-p_{01})+\frac{1}{4}(p_{01}+p_{11}-p_{00}-p_{10})-\frac{1}{4}(p_{00}+p_{01}-p_{10}-p_{01})+0=p_{01}$.

The predetermined weights ($w_x$, $w_y$ and $w_{xy}$) used by the decoder instance 1108 are $w_x=+1$, $w_y=-1$ and $w_{xy}=-1$. Therefore, the result of the weighted sum determined in step S1206 is given by $\frac{1}{4}(p_{00}+p_{01}+p_{10}+p_{11})+\frac{1}{4}(p_{10}+p_{11}-p_{00}-p_{01})-\frac{1}{4}(p_{01}+p_{11}-p_{00}-p_{10})-\frac{1}{4}(p_{00}+p_{11}-p_{10}-p_{01})+0=p_{10}$.

The predetermined weights ($w_x$, $w_y$ and $w_{xy}$) used by the decoder instance 1110 are $w_x=+1$, $w_y=+1$ and $w_{xy}=+1$. Therefore, the result of the weighted sum determined in step S1206 is equivalent to: $\frac{1}{4}(p_{00}+p_{01}+p_{10}+p_{01})+\frac{1}{4}(p_{10}+p_{11}-p_{00}-p_{01})+\frac{1}{4}(p_{01}+p_{11}-p_{00}-p_{10})+\frac{1}{4}(p_{00}+p_{11}-p_{10}-p_{01})+0=p_{11}$.

The decoder instances shift the weights by the exponents of the corresponding differential coefficients and use the signs of the differential coefficients to sum them correctly. Binary shifts and additions/subtractions are very simple to implement, e.g. in hardware. So the processing power, silicon area and/or latency of the decoding unit 1102 can be reduced compared to conventional decoding units. Furthermore, the compression ratio that can be achieved using the scheme described herein without detrimentally affecting the quality of the data can be improved compared to conventional encoding/decoding schemes.

In some examples described above, the values of the differential coefficients (i.e. the dx, dy and dxy coefficients) for a 2×2 quad of pixels are predicted based on the average coefficients (i.e. the dc coefficients) of one or more neighbouring 2×2 quads of pixels. Differences (or "delta values") between the predicted values and the original values of the differential coefficients for the 2×2 quad of pixels can be determined and then used in place of the differential coefficients for the encoding of the differential coefficients (i.e. for determining the first portion of the compressed data structure). In these examples, step S1208 of using the determined result to determine the decoded value comprises: (i) using the determined result to determine a delta value; and (ii) adding a predicted value to the delta value to determine the decoded value for the block of pixels, wherein the predicted value is determined based on one or more neighbouring blocks of pixels. Since these predicted values are in addition to the coefficients encoded in the compressed data structure (and may not be suited to signed exponent representation), they are typically more suited to such examples as above where filtering is not required and therefore variable weights need not be applied to the predicted terms.

Figure 13:
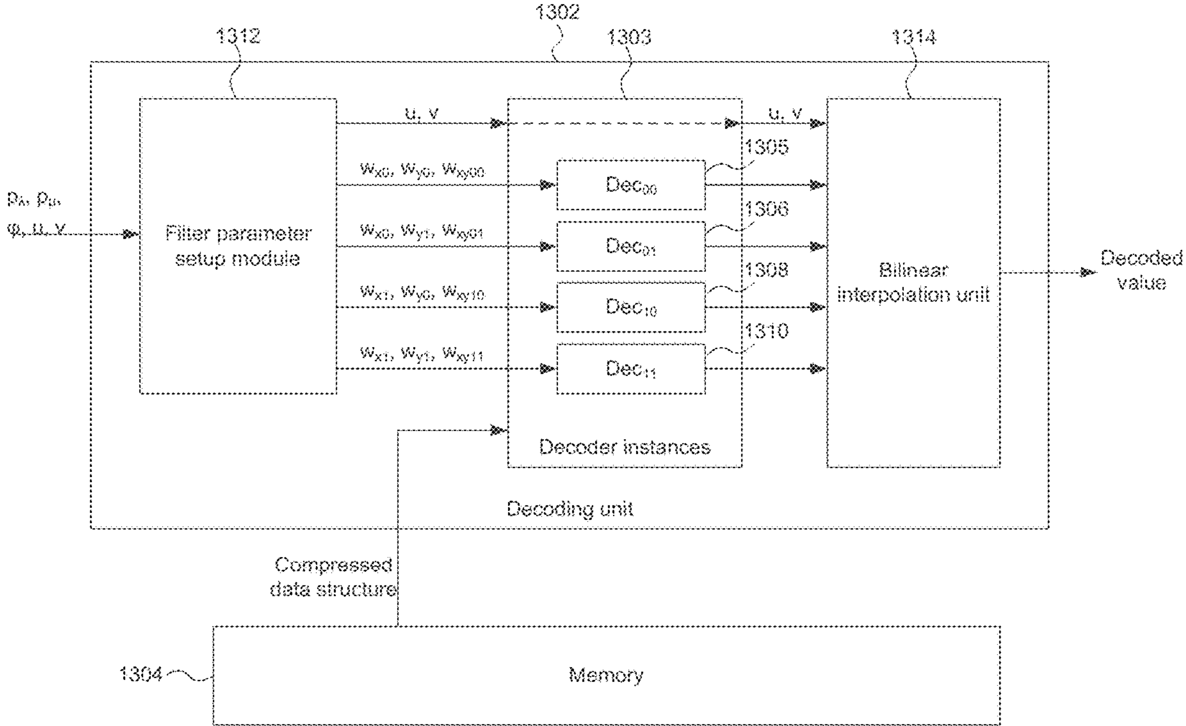
FIG. 13 illustrates a second example decoding system for decoding a compressed data structure.

FIG. 13 illustrates a second example decoding system for decoding a compressed data structure to determine a decoded value. The compressed data structure has been encoded as described above. The decoding system shown in FIG. 13 comprises a decoding unit 1302 and a memory 1304 (which may be the same as memory 204 as shown in FIG. 2, memory 604 shown in FIG. 6, memory 904 shown in FIG. 9 or memory 1104 shown in FIG. 11). The decoding unit 1302 comprises a set of decoder instances 1303, which includes four decoder instances 1305, 1306, 1308 and 1310. The decoding unit 1302 also comprises a bilinear interpolation unit 1314 which is configured to receive outputs from the decoder instances and to output a decoded value. The decoding unit 1302 also comprises a filter parameter setup module 1312 which is configured to determine weights for the decoder instances 1303 and u and v coordinates for the bilinear interpolation unit 1314. The components of the decoding unit 1302 shown in FIG. 13 may be implemented in hardware (e.g. fixed function circuitry), software, or a combination thereof.

Figure 14:
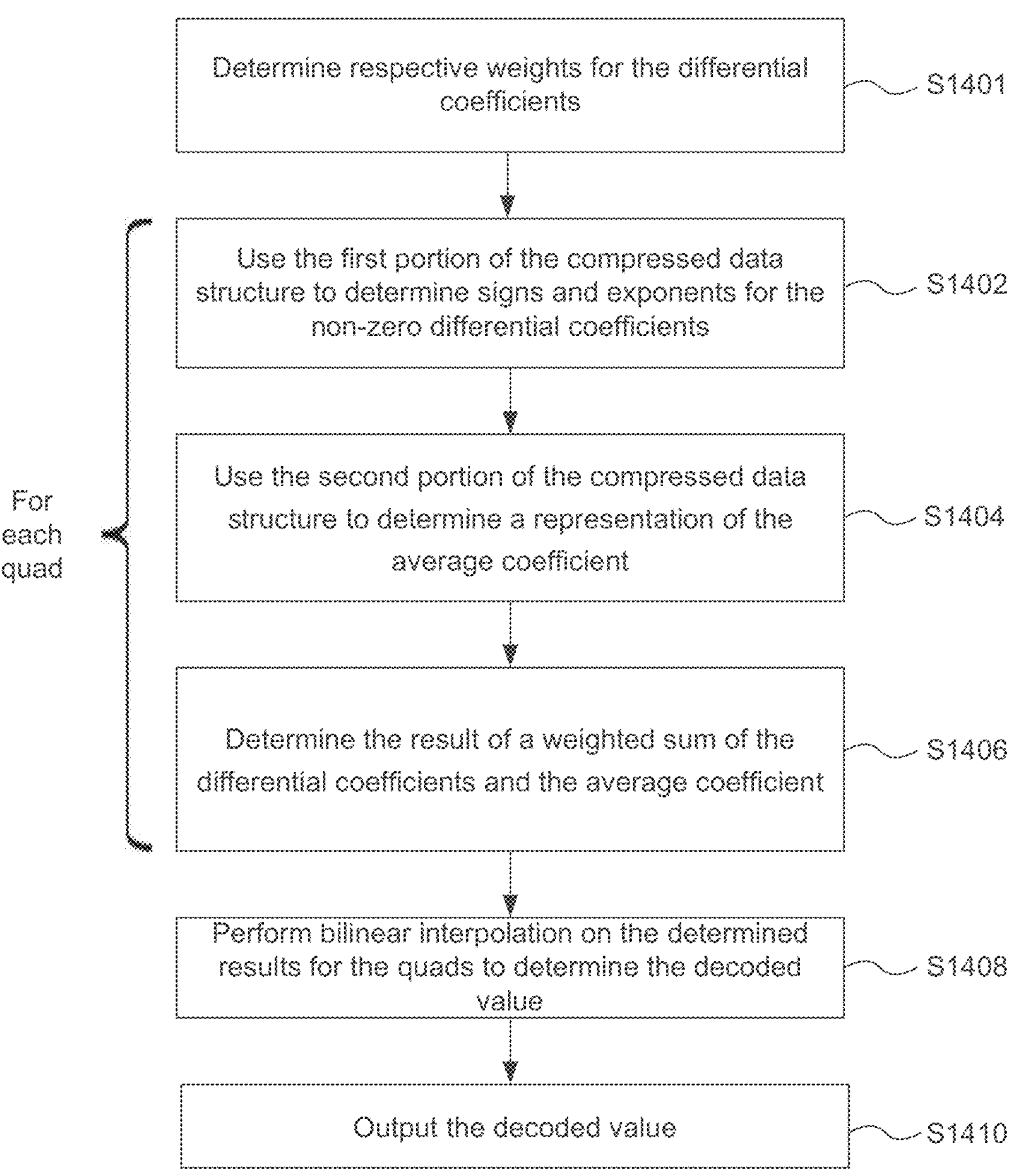
FIG. 14 is a flow chart for a second example method of decoding a compressed data structure to determine a decoded value.

FIG. 14 is a flow chart for a method of decoding a compressed data structure to determine a decoded value in the decoding unit 1302. The steps of the method may be performed in hardware (e.g. using dedicated hardware, such as fixed function circuitry) or software or a combination thereof in the decoding unit 1302.

This example is particularly useful for texture filtering. In this example, the weights are not predetermined. This allows the weights to be altered in runtime to provide different types of filtering, e.g. isotropic filtering or anisotropic filtering with different levels of detail, different anisotropic ratios and different anisotropic directions. In particular, the filter parameter setup module 1312 of the decoding unit 1302 receives an indication of a level of detail along a minor axis of the filtering ($p_\lambda$), an indication of a level of detail along a major axis of the filtering ($p_\mu$) and an anisotropic direction ($\varphi$), as well as u and v coordinates which indicate a position at which a filtered sample is to be determined. In step S1401, the decoding unit 1302 (specifically the filter parameter setup module 1312) determines the respective weights for the differential coefficients. As described in more detail below, the weights can be determined based on one or more of: (i) a position, relative to the 2×2 quad of pixels, that the decoded value is to be determined (e.g. as indicated by the u and v coordinates); (ii) an indication of a level of detail to be provided by the decoded value (e.g. as indicated by the $p_\lambda$ parameter); and (iii) an indication of an amount and/or direction of anisotropy to be provided by the decoded value (e.g. as indicated by the $p_\lambda$, $p_\mu$ and $\varphi$ parameters).

Figure 15A:
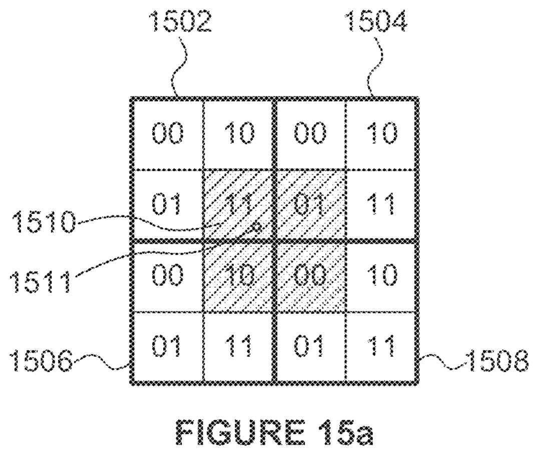
FIGS. 15*a* to 15*c* illustrate a 4×4 block of pixel values, highlighting different regions within the 4×4 block of pixel values.

In this example, the compressed data structure encodes a 4×4 block of pixels. As shown in FIG. 15*a*, the block of pixels comprises four 2×2 quads of pixels (1502, 1504, 1506 and 1508). In other examples, the four 2×2 quads of pixels may be encoded respectively by four compressed data structures. For each 2×2 quad of pixels shown in FIG. 15*a*, the top left pixel is denoted "00", the bottom left pixel is denoted "01", the top right pixel is denoted "10" and the bottom right pixel is denoted "11". This compressed data structure can be used to determine a decoded value at a position that is within the hatched area 1510 which represents the footprint of the four pixels in the centre of the 4×4 block of pixels. For example, a decoded value may be determined at a position 1511 using the compressed data structure which represents the 4×4 block of pixels shown in FIG. 15*a*. The position 1511 is identified using u and v coordinates which include horizontal and vertical coordinates of the position 1511 within the area 1510.

For each of the four 2×2 quads of pixels a respective one of the decoder instances (1305, 1306, 1308 and 1310) determines a result of a weighted sum of the differential coefficients and the average coefficient for that 2×2 quad of pixels as described above based on a respective set of weights ($w_x$, $w_y$ and $w_{xy}$) that it receives from the filter parameter setup module 1312. In particular, steps S1402, S1404 and S1406 are performed for each of the respective 2×2 quads (1502, 1504, 1506 and 1508) by a respective one of the decoder instances (1305, 1306, 1308 and 1310). Steps S1402 to S1406 are now described with reference to the processing of the quad 1502 by the decoder instance 1305, but it is to be understood that the other decoder instances (1306, 1308 and 13010) process their respective quads (1504, 1506 and 1508) in the same way. In step S1402 the decoder instance 1305 uses the first portion (e.g. 504) of the compressed data structure to determine signs and exponents for the one or more of the differential coefficients which are non-zero for the 2×2 quad of pixels. As described above, the first portion (e.g. 504) of the compressed data structure comprises: (i) a first set of bits (e.g. $\mathbf{506}_1$) which indicates an order of the magnitudes of the differential coefficients, and (ii) a second set of bits (e.g. $\mathbf{506}_2$) which indicates a sign and an exponent for each of one or more of the differential coefficients which are non-zero. Different implementations for how the first portion of the compressed data structure indicates the signs and exponents for the differential coefficients are described above, and it will be apparent how the decoder can determine the signs and exponents for the one or more of the differential coefficients which are non-zero from the first portion of the compressed data structure in the different implementations described above. As described above, the first set of bits also indicates whether any (and if so, which) of the differential coefficients are zero. So in step S1402 the decoding unit 1302 (e.g. the decoder instance 1305) can determine whether any (and if so, which) of the differential coefficients are zero using the first portion (e.g. 504) of the compressed data structure. It is noted that in most situations, the decoding unit 1302 (e.g. the decoder instance 1305) does not determine any mantissa bits for the differential coefficients, although in some situations one or more mantissa bits are determined (as described above).

In step S1404 the decoding unit 1302 (e.g. the decoder instance 1305) uses the second portion (e.g. 508) of the compressed data structure to determine a representation of the average coefficient for the 2×2 quad of pixels. Different implementations for how the second portion of the compressed data structure indicates the average coefficient are described above (including examples in which the first portion (e.g. 504) of the compressed data structure also contribute to the determination of the average coefficient), and it will be apparent how the decoder can determine the average coefficient from the second portion of the compressed data structure in the different implementations described above. For example, the bits of the second portion of the compressed data structure may be a rounded version of the average coefficient.

In step S1406 the decoding unit 1302 (e.g. the decoder instance 1305) determines the result of a weighted sum of the differential coefficients and the average coefficient for the 2×2 quad of pixels. This is done using: (i) the determined signs and exponents for the one or more of the differential coefficients (dx, dy and dxy) which are non-zero, (ii) the determined representation of the average coefficient (dc), and (iii) the respective weights ($w_x$, $w_y$ and $w_{xy}$) for the differential coefficients received from the filter parameter setup module.

Each of the decoder instances (1305, 1306, 1308 and 1310) output the determined result of their weighted sum to the bilinear interpolation unit 1314. It is noted that the different decoder instances will determine different results because the weights that they use in the weighted sums (as provided by the filter parameter setup module 1312) are different. In step S1408, the bilinear interpolation unit 1314 combines the four determined results for the respective four 2×2 quads of pixels to determine the decoded value for the block of pixels. In particular, the bilinear interpolation unit 1314 performs bilinear interpolation on the four determined results for the respective four 2×2 quads of pixels to determine the decoded value for the block of pixels. In step S1410 the decoding unit 1302 (e.g. the bilinear interpolation unit 1314) outputs the determined decoded value. The outputted decoded value may be used in any suitable manner, e.g. processed by a processing unit, transmitted to another device or stored in a memory (e.g. in the memory 1304) to give just a few examples of how the decoded value may be used.

Figure 15B:
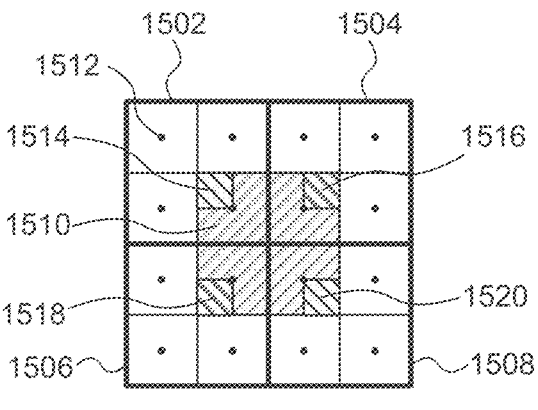

For some locations within the area 1510, a decoded value can be determined from a single 2×2 quad of pixels. In these cases the bilinear interpolation unit 1314 applies a weight of 1 to the determined result for that single 2×2 quad of pixels and it applies a weight of 0 for the other three determined results for the other 2×2 quads of pixels. In other words, if a position at which the decoded value is to be determined is within an area that is representable by considering the pixels of a single one of the 2×2 quads of pixels in the block of pixels then the decoded value for the block of pixels is equal to the determined result for that single 2×2 quad of pixels. FIG. 15*b* shows the same four quads of pixels (1502, 1504, 1506 and 1508) that are shown in FIG. 15*a*, and FIG. 15*b* illustrates the pixel positions with black dots (e.g. 1512 is the position of the top left pixel in the 4×4 block of pixels). In some situations a decoded value may be represented by considering the pixels of a single one of the 2×2 quads if it falls into a square region bounded by the pixel positions of that 2×2 quad. For example, if the location at which a decoded value is to be determined is within the region 1514 then the decoded value may be determined using the determined result for the top left quad (and not using the determined results for the other three quads, e.g. by setting the weights to zero in the bilinear interpolation unit 1314 for the other three quads). As another example, if the location at which a decoded value is to be determined is within the region 1516 then the decoded value may be determined using the determined result for the top right quad (and not using the determined results for the other three quads, e.g. by setting the weights to zero in the bilinear interpolation unit 1314 for the other three quads). As another example, if the location at which a decoded value is to be determined is within the region 1518 then the decoded value may be determined using the determined result for the bottom left quad (and not using the determined results for the other three quads, e.g. by setting the weights to zero in the bilinear interpolation unit 1314 for the other three quads). As another example, if the location at which a decoded value is to be determined is within the region 1520 then the decoded value may be determined using the determined result for the bottom right quad (and not using the determined results for the other three quads, e.g. by setting the weights to zero in the bilinear interpolation unit 1314 for the other three quads). In some situations the regions 1514, 1516, 1518 and 1520 might not be as large as they are shown in FIG. 15*b*. For example, if the decoding unit 1302 is to apply blurring or anisotropy then the regions in which it can determine a decoded value using the determined result for a single quad will be smaller than the regions 1514, 1516, 1518 and 1520 shown in FIG. 15*b* because more information will be used from nearby quads in order to apply blurring or anisotropy.

Figure 15C:
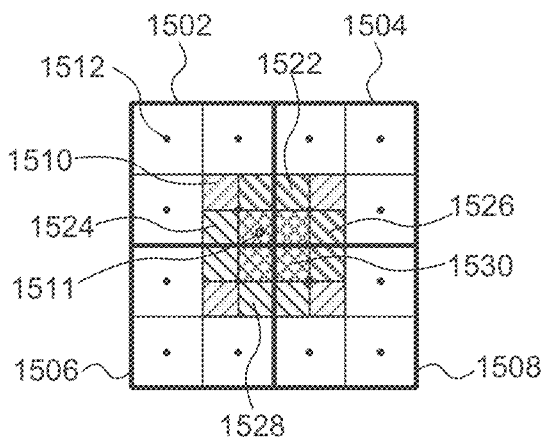

For some locations within the area 1510, a decoded value cannot be determined from a single 2×2 quad of pixels. In these cases the bilinear interpolation unit 1314 blends results determined for two or more of the 2×2 quads of pixels by applying non-zero weights in its weighted sum to the determined results for those two or more of the 2×2 quad of pixels. In other words, if a position at which the decoded value is to be determined is not within an area that is representable by considering the pixels of a single one of the 2×2 quads of pixels in the block of pixels then the decoded value for the block of pixels is the result of a weighted sum of two or more of the determined results for the 2×2 quads of pixels. FIG. 15*c* shows the same four quads of pixels (1502, 1504, 1506 and 1508) that are shown in FIGS. 15*a* and 15*b*, and FIG. 15*c* illustrates the pixel positions with black dots (e.g. 1512 is the position of the top left pixel in the 4×4 block of pixels). If the position at which the decoded value is to be determined (e.g. position 1511) falls into the region 1530 which is shown with cross-hatching in FIG. 15*c* then the decoded value is determined by blending the determined results for all four of the quads, i.e. the bilinear interpolation unit 1314 uses non-zero weights in its weighted sum for all four of the determined results for the four 2×2 quads of pixels. If the position at which the decoded value is to be determined falls into a region which is not part of any of the regions 1514, 1516, 1518, 1520 or 1530 then the decoded value is determined by blending the determined results for two (but only two) of the quads, i.e. the bilinear interpolation unit 1314 uses non-zero weights in its weighted sum for the determined results for two of the 2×2 quads of pixels and uses zero weights in its weighted sum for the determined results for the other two of the 2×2 quads of pixels. For example, if the position at which the decoded value is to be determined falls into the rectangular region 1522 shown with diagonal hatching then the decoded value is determined by blending the determined results for the quads 1502 and 1504 (but not for the quads 1506 and 1508). As another example, if the position at which the decoded value is to be determined falls into the rectangular region 1524 shown with diagonal hatching then the decoded value is determined by blending the determined results for the quads 1502 and 1506 (but not for the quads 1504 and 1508). As another example, if the position at which the decoded value is to be determined falls into the rectangular region 1526 shown with diagonal hatching then the decoded value is determined by blending the determined results for the quads 1504 and 1508 (but not for the quads 1502 and 1506). As another example, if the position at which the decoded value is to be determined falls into the rectangular region 1528 shown with diagonal hatching then the decoded value is determined by blending the determined results for the quads 1506 and 1508 (but not for the quads 1502 and 1504).

The weights that are determined by the filter parameter setup module 1312 for each of the 2×2 quads vary in dependence upon the u and v parameters which define the position at which the decoded value is to be determined. For example, the weights for the differential coefficients can be determined by: (i) determining initial weights based on the LOD indication ($p_\lambda$), an indication of an amount of anisotropy (which may be indicated by $p_\lambda$ and $p_\mu$, or which may be indicated by an anisotropic ratio r) and an indication of a direction of anisotropy (φ) as described in more detail below; and multiplying the determined initial weights by respective transfer functions to determine the weights for the differential coefficients. A transfer function can be considered to be a function which models a module's output for different inputs. As described in more detail below, each of the transfer functions is based on a position, relative to the 2×2 quad of pixels, that the decoded value is to be determined at, and each of the transfer functions: (i) is zero at the centre of the 2×2 quad of pixels, (ii) has a magnitude of one at each of the pixel positions of the 2×2 quad of pixels, and (iii) is extrapolated out to the edges of the area represented by the 2×2 quad of pixels. For example, each of the transfer functions $t_x$ and $t_y$ (which are multiplied by the initial weights for the dx and dy coefficients respectively to determine the final weights for the dx and dy coefficients) is linearly extrapolated out to the edges of the area represented by the 2×2 quad of pixels such that it lies in the range [−2, +2]. The transfer function $t_{xy}$ (which is multiplied by the initial weights for both of the dx and dy coefficients and then added to the initial weight for the dxy coefficient to determine the final weight for the dxy coefficient) is a product of the $t_x$ and $t_y$ transfer functions so the extrapolation of $t_{xy}$ out to the edges of the area represented by the 2×2 quad of pixels is not necessarily linear, and the value of $t_{xy}$ lies in the range [−4, +4].

Figure 15D:
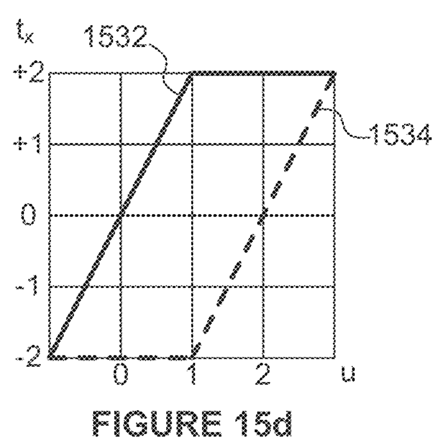
FIG. 15*d* illustrates how transfer functions which are multiplied with the weights applied to dx coefficients vary for different u parameters representing different horizontal positions in the 4×4 block for different 2×2 quads within the 4×4 block of pixels.
Figure 15E:
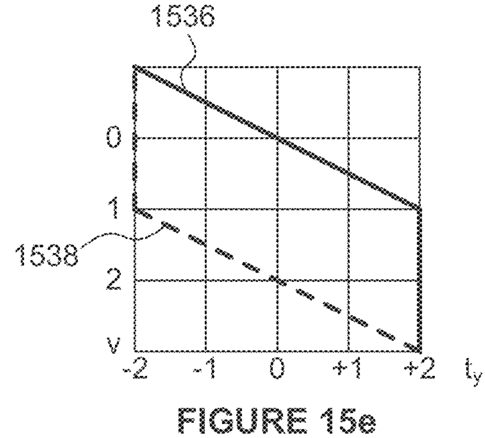
FIG. 15*e* illustrates how transfer functions which are multiplied with the weights applied to dy coefficients vary for different v parameters representing different vertical positions in the 4×4 block for different 2×2 quads within the 4×4 block of pixels.

FIG. 15*d* shows how the value of the transfer function $t_x$ (which is multiplied by the initial weight for the dx coefficient to determine the final weight for the dx coefficient) varies across the 4×4 block of pixel values for different quads, and FIG. 15*e* shows how the value of the transfer function $t_y$ (which is multiplied by the initial weight for the dy coefficient to determine the final weight for the dy coefficient) varies across the 4×4 block of pixel values for different quads. The area 1510 shown in FIGS. 15*a* to 15*c* is the area in which the u and v parameters are valid, and within this region: (i) the u parameter varies linearly from 0 on the left edge to 2 on the right edge, such that it has a value of 1 in the centre of the 4×4 block of pixels, and (ii) the v parameter varies linearly from 0 on the top edge to 2 on the bottom edge, such that it has a value of 1 in the centre of the 4×4 block of pixels.

Each of the transfer functions is determined based on a position, relative to the 2×2 quad of pixels, that the decoded value is to be determined. In FIG. 15*d* the solid line 1532 shows the transfer function $t_x$ which is multiplied with the initial weights for the dx coefficient for the quads on the left of the 4×4 block (i.e. quads 1502 and 1506); whereas the dashed line 1534 shows the transfer function $t_x$ which is multiplied with the initial weights for the dx coefficient for the quads on the right of the 4×4 block (i.e. quads 1504 and 1508). As shown in FIG. 15*d*, the transfer function $t_x$ for a 2×2 quad of pixels: (i) is zero at the centre of the 2×2 quad of pixels (e.g. the line 1532 passes through $t_x$=0 at u=0, and e.g. the line 1534 passes through $t_x$=0 at u=2), (ii) has a magnitude of one at each of the pixel positions of the 2×2 quad of pixels (e.g. the line 1532 passes through $t_x$=−1 at u=−0.5 and through $t_x$=+1 at u=+0.5, and e.g. the line 1534 passes through $t_x$=−1 at u=+1.5 and through $t_x$=+1 at u=+2.5), and (iii) is linearly extrapolated out to the edges of the area represented by the 2×2 quad of pixels, such that it lies in the range [−2, +2] (e.g. the line 1532 has a value of $t_x$=−2 at the left hand edge of the 4×4 block and has a value of $t_x$=+2 in the centre of the 4×4 block, and e.g. the line 1534 has a value of $t_x$=+2 at the right hand edge of the 4×4 block and has a value of $t_x$=−2 in the centre of the 4×4 block). Beyond the left and right edges of the area represented by a 2×2 quad of pixels, the transfer function $t_x$ for the 2×2 quad of pixels is clamped to its value on the nearest edge of that area. For example, the line 1532 is clamped at $t_x$=+2 to the right hand side of the centre of the 4×4 block of pixels, and the line 1534 is clamped at $t_x$=−2 to the left hand side of the centre of the 4×4 block of pixels.

In FIG. 15*e* the solid line 1536 shows the transfer function $t_y$ which is multiplied with the initial weights for the dy coefficient for the quads on the top of the 4×4 block (i.e. quads 1502 and 1504); whereas the dashed line 1538 shows the transfer function $t_y$ which is multiplied with the initial weights for the dy coefficient for the quads on the bottom of the 4×4 block (i.e. quads 1506 and 1508). As shown in FIG. 15*e*, the transfer function $t_y$ for a 2×2 quad of pixels: (i) is zero at the centre of the 2×2 quad of pixels (e.g. the line 1536 passes through $t_y$=0 at v=0, and e.g. the line 1538 passes through $t_y$=0 at v=2), (ii) has a magnitude of one at each of the pixel positions of the 2×2 quad of pixels (e.g. the line 1536 passes through $t_y$=−1 at v=−0.5 and through $t_y$=+1 at v=+0.5, and e.g. the line 1538 passes through $t_y$=−1 at v=+1.5 and through $t_y$=+1 at v=+2.5), and (iii) is linearly extrapolated out to the edges of the area represented by the 2×2 quad of pixels, such that it lies in the range [−2, +2] (e.g. the line 1536 has a value of $t_y$=−2 at the top edge of the 4×4 block and has a value of $t_y$=+2 in the centre of the 4×4 block, and e.g. the line 1538 has a value of $t_y$=+2 at the bottom edge of the 4×4 block and has a value of $t_y$=−2 in the centre of the 4×4 block). Beyond the top and bottom edges of the area represented by a 2×2 quad of pixels, the transfer function $t_y$ for the 2×2 quad of pixels is clamped to its value on the nearest edge of that area. For example, the line 1536 is clamped at $t_y$=+2 below the centre of the 4×4 block of pixels, and the line 1538 is clamped at $t_y$=−2 above the centre of the 4×4 block of pixels.

The final weight for the dxy coefficient is given by the product of the transfer functions $t_x$ and $t_y$, each of which has been weighted by the initial weights for dx and dy respectively as above, to which the initial dxy weight is added (which does not have any spatial (i.e. u and v) dependence). Note that the initial dxy weight is zero whenever the filter response is isotropic such that in these cases the weight for the dxy coefficient is always the product of the weights for the dx and dy coefficients (compare with the simple reconstruction scheme described with reference to FIG. 11). Whereas there exist two distinct weights for each of the dx and dy coefficients for the four 2×2 quads of pixels, there are in general four distinct weights for the dxy coefficients, one for each quad. For example, the final weight for the dxy coefficient of the top left quad 1502 is given by the product of the (weighted) transfer functions given by the solid line 1532 and the solid line 1536, to which the initial weight for the dxy coefficient is added. In another example, the final weight for the dxy coefficient of the top right quad 1504 is given by the product of the (weighted) transfer functions given by the dashed line 1534 and the solid line 1536, to which the initial weight for the dxy coefficient is added. In another example, the final weight for the dxy coefficient of the bottom left quad 1506 is given by the product of the (weighted) transfer functions given by the solid line 1532 and the dashed line 1538, to which the initial weight for the dxy coefficient is added. In another example, the final weight for the dxy coefficient of the bottom right quad 1508 is given by the product of the (weighted) transfer functions given by the dashed line 1534 and the dashed line 1538, to which the initial weight for the dxy coefficient is added. As described above, the transfer function $t_{xy}$ is a product of the $t_x$ and $t_y$ transfer functions so the extrapolation of $t_{xy}$ out to the edges of the area represented by the 2×2 quad of pixels is not necessarily linear, and may be described as "bilinear". The value of $t_{xy}$ lies in the range [−4, +4].

In some examples, in order to apply full weighting on any individual texel within the quad, the texels are mirrored such that the interpolation point falls within a particular quadrant, e.g. the top left quadrant. After mirroring, and depending on the LOD setting for the filter, the input interpolation weights may be modified to apply the correct amount of blending to the samples (or weighted combinations thereof) generated by the decoding unit for each quad of pixels. In general, the pixels within the 4×4 block of pixels are selectively mirrored about neither, one or both of: (i) a horizontal axis passing through the centre of the block of pixels, and (ii) a vertical axis passing through the centre of the block of pixels, so that the position at which the decoded value is to be determined is within a particular quadrant (e.g. the top left quadrant) of the block of pixels.

Figure 16A:
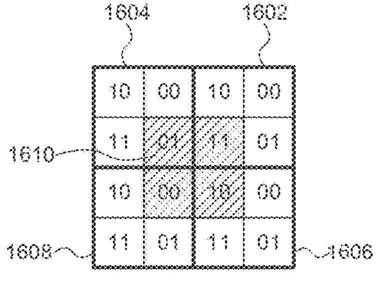
FIG. 16*a* illustrates a 4×4 block of pixel values which has been mirrored through a vertical axis through the centre of the 4×4 block.
Figure 16A:

FIG. 16*a* illustrates a 4×4 block of pixel values which has been mirrored through a vertical axis through the centre of the 4×4 block. The block of pixel values comprises four 2×2 quads of pixels 1602, 1604, 1606 and 1608. Before the mirroring operation, the quads 1602, 1604, 1606 and 1608 correspond with the respective quads 1502, 1504, 1506 and 1508 of the 4×4 block of pixel shown in FIG. 15*a*. However, after the mirroring operation, as shown in FIG. 16*a*, the quads 1604 and 1608 are on the left of the 4×4 block (not the right, as 1504 and 1508 are) and the quads 1602 and 1606 are on the right of the 4×4 block (not the left, as 1502 and 1506 are). Furthermore, within each 2×2 quad, the pixels have been mirrored through a vertical axis such that the top left pixel is denoted "10", the top right pixel is denoted "00", the bottom left pixel is denoted "11" and the bottom right pixel is denoted "01". The area 1510 shown in FIG. 15*a* (before the mirroring operation) corresponds with the area 1610 shown in FIG. 16*a* (after the mirroring operation). This mirroring operation may be applied if the position at which the decoded value is to be determined is within the footprint of the "01" pixel in the 2×2 quad 1504, so that after the mirroring operation, the position at which the decoded value is to be determined is within the footprint of the "01" pixel in the 2×2 quad 1604, which is now in the top left quadrant of the 4×4 block of pixels.

Figure 16B:
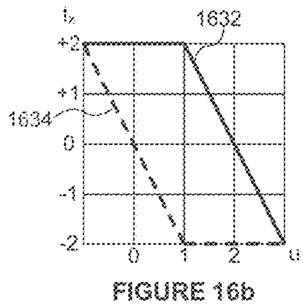
FIG. 16*b* illustrates how transfer functions which are multiplied with the weights applied to dx coefficients vary for different u parameters representing different horizontal positions in the mirrored 4×4 block shown in FIG. 16*a* for different 2×2 quads.

FIG. 16*b* illustrates how the transfer function $t_x$ varies for different u parameters representing different horizontal positions in the mirrored 4×4 block shown in FIG. 16*a* for different 2×2 quads. In FIG. 16*b* the solid line 1632 shows the transfer function $t_x$ which is multiplied with the initial weights for the dx coefficient for the quads on the right of the mirrored 4×4 block (i.e. quads 1602 and 1606); whereas the dashed line 1634 shows the transfer function $t_x$ which is multiplied with the initial weights for the dx coefficient for the quads on the left of the mirrored 4×4 block (i.e. quads 1604 and 1608). As shown in FIG. 16*b*, the transfer function $t_x$ for a 2×2 quad of pixels: (i) is zero at the centre of the 2×2 quad of pixels (e.g. the line 1632 passes through $t_x=0$ at u=2, and e.g. the line 1634 passes through $t_x=0$ at u=0), (ii) has a magnitude of one at each of the pixel positions of the 2×2 quad of pixels (e.g. the line 1632 passes through $t_x=-1$ at u=2.5 and through $t_x=+1$ at u=1.5, and e.g. the line 1634 passes through $t_x=-1$ at u=+0.5 and through $t_x=+1$ at u=−0.5), and (iii) is linearly extrapolated out to the edges of the area represented by the 2×2 quad of pixels, such that it lies in the range [−2, +2] (e.g. the line 1632 has a value of $t_x=-2$ at the right hand edge of the 4×4 block and has a value of $t_x=+2$ in the centre of the 4×4 block, and e.g. the line 1634 has a value of $t_x=+2$ at the left hand edge of the 4×4 block and has a value of $t_x=-2$ in the centre of the 4×4 block). Beyond the left and right edges of the area represented by a 2×2 quad of pixels, the transfer function $t_x$ for the 2×2 quad of pixels is clamped to its value on the nearest edge of that area. For example, the line 1632 is clamped at $t_x=+2$ to the left hand side of the centre of the 4×4 block of pixels, and the line 1634 is clamped at $t_x=-2$ to the right hand side of the centre of the 4×4 block of pixels.

Figure 16C:
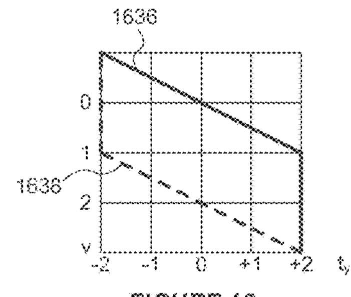
FIG. 16*c* illustrates how transfer functions which are multiplied with the weights applied to dy coefficients vary for different v parameters representing different vertical positions in the mirrored 4×4 block shown in FIG. 16*a* for different 2×2 quads.

FIG. 16*c* illustrates how the transfer function $t_y$ varies for different v parameters representing different vertical positions in the mirrored 4×4 block shown in FIG. 16*a* for different 2×2 quads. In FIG. 16*c* the solid line 1636 shows the transfer function $t_y$ which is multiplied with the initial weights for the dy coefficient for the quads on the top of the mirrored 4×4 block (i.e. quads 1604 and 1602); whereas the dashed line 1638 shows the transfer function $t_y$ which is multiplied with the initial weights for the dy coefficient for the quads on the bottom of the mirrored 4×4 block (i.e. quads 1608 and 1606). As shown in FIG. 16*c*, the transfer function $t_y$ for a 2×2 quad of pixels: (i) is zero at the centre of the 2×2 quad of pixels (e.g. the line 1636 passes through $t_y=0$ at v=0, and e.g. the line 1638 passes through $t_y=0$ at v=2), (ii) has a magnitude of one at each of the pixel positions of the 2×2 quad of pixels (e.g. the line 1636 passes through $t_y=-1$ at v=−0.5 and through $t_y=+1$ at v=+0.5, and e.g. the line 1638 passes through $t_y=-1$ at v=1.5 and through $t_y=+1$ at v=2.5), and (iii) is linearly extrapolated out to the edges of the area represented by the 2×2 quad of pixels, such that it lies in the range [−2, +2] (e.g. the line 1636 has a value of $t_y=-2$ at the top edge of the 4×4 block and has a value of $t_y=+2$ in the centre of the 4×4 block, and e.g. the line 1638 has a value of $t_y=+2$ at the bottom edge of the 4×4 block and has a value of $t_y=-2$ in the centre of the 4×4 block). Beyond the top and bottom edges of the area represented by a 2×2 quad of pixels, the transfer function $t_y$ for the 2×2 quad of pixels is clamped to its value on the nearest edge of that area. For example, the line 1636 is clamped at $t_y=+2$ below the centre of the 4×4 block of pixels, and the line 1638 is clamped at $t_y=-2$ above the centre of the 4×4 block of pixels.

Figure 17A:
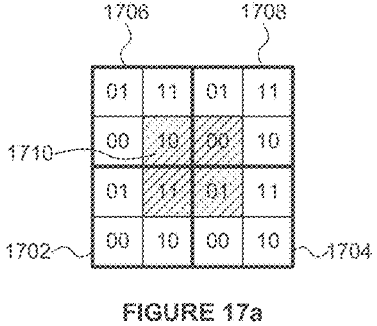
FIG. 17*a* illustrates a 4×4 block of pixel values which has been mirrored through a horizontal axis through the centre of the 4×4 block.

FIG. 17*a* illustrates a 4×4 block of pixel values which has been mirrored through a horizontal axis through the centre of the 4×4 block. The block of pixel values comprises four 2×2 quads of pixels 1702, 1704, 1706 and 1708. Before the mirroring operation, the quads 1702, 1704, 1706 and 1708 correspond with the respective quads 1502, 1504, 1506 and 1508 of the 4×4 block of pixel shown in FIG. 15*a*. However, after the mirroring operation, as shown in FIG. 17*a*, the quads 1702 and 1704 are on the bottom of the 4×4 block (not the top, as 1502 and 1504 are) and the quads 1706 and 1708 are on the top of the 4×4 block (not the bottom, as 1506 and 1508 are). Furthermore, within each 2×2 quad, the pixels have been mirrored through a horizontal axis such that the top left pixel is denoted "01", the top right pixel is denoted "11", the bottom left pixel is denoted "00" and the bottom right pixel is denoted "10". The area 1510 shown in FIG. 15*a* (before the mirroring operation) corresponds with the area 1710 shown in FIG. 17*a* (after the mirroring operation). This mirroring operation may be applied if the position at which the decoded value is to be determined is within the footprint of the "10" pixel in the 2×2 quad 1506, so that after the mirroring operation, the position at which the decoded value is to be determined is within the footprint of the "10" pixel in the 2×2 quad 1706, which is now in the top left quadrant of the 4×4 block of pixels.

Figure 17B:
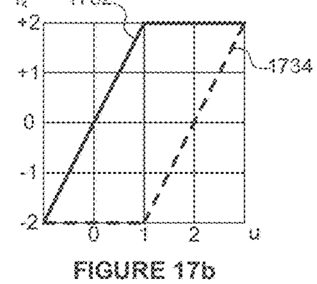
FIG. 17*b* illustrates how transfer functions which are multiplied with the weights applied to dx coefficients vary for different u parameters representing different horizontal positions in the mirrored 4×4 block shown in FIG. 17*a* for different 2×2 quads.

FIG. 17*b* illustrates how the transfer function $t_x$ varies for different u parameters representing different horizontal positions in the mirrored 4×4 block shown in FIG. 17*a* for different 2×2 quads. In FIG. 17*b* the solid line 1732 shows the transfer function $t_x$ which is multiplied with the initial weights for the dx coefficient for the quads on the left of the mirrored 4×4 block (i.e. quads 1702 and 1706); whereas the dashed line 1734 shows the transfer function $t_x$ which is multiplied with the initial weights for the dx coefficient for the quads on the right of the mirrored 4×4 block (i.e. quads 1704 and 1708). As shown in FIG. 17*b*, the transfer function $t_x$ for a 2×2 quad of pixels: (i) is zero at the centre of the 2×2 quad of pixels (e.g. the line 1732 passes through $t_x=0$ at u=0, and e.g. the line 1734 passes through $t_x=0$ at u=2), (ii) has a magnitude of one at each of the pixel positions of the 2×2 quad of pixels (e.g. the line 1732 passes through $t_x=-1$ at u=−0.5 and through $t_x=+1$ at u=+0.5, and e.g. the line 1734 passes through $t_x=-1$ at u=1.5 and through $t_x=+1$ at u=2.5), and (iii) is linearly extrapolated out to the edges of the area represented by the 2×2 quad of pixels, such that it lies in the range [−2, +2] (e.g. the line 1732 has a value of $t_x=-2$ at the left hand edge of the 4×4 block and has a value of $t_x=+2$ in the centre of the 4×4 block, and e.g. the line 1734 has a value of $t_x=+2$ at the right hand edge of the 4×4 block and has a value of $t_x=-2$ in the centre of the 4×4 block). Beyond the left and right edges of the area represented by a 2×2 quad of pixels, the transfer function $t_x$ for the 2×2 quad of pixels is clamped to its value on the nearest edge of that area. For example, the line 1732 is clamped at $t_x=+2$ to the right hand side of the centre of the 4×4 block of pixels, and the line 1734 is clamped at $t_x=-2$ to the left hand side of the centre of the 4×4 block of pixels.

Figure 17C:
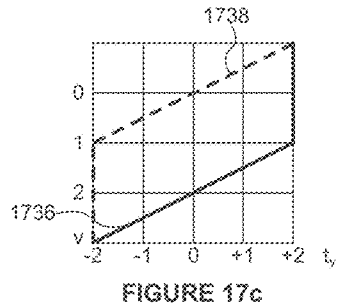
FIG. 17*c* illustrates how transfer functions which are multiplied with the weights applied to dy coefficients vary for different v parameters representing different vertical positions in the mirrored 4×4 block shown in FIG. 17*a* for different 2×2 quads.

FIG. 17*c* illustrates how the transfer function $t_y$ varies for different v parameters representing different vertical positions in the mirrored 4×4 block shown in FIG. 17*a* for different 2×2 quads. In FIG. 17*c* the solid line 1736 shows the transfer function $t_y$ which is multiplied with the initial weights for the dy coefficient for the quads on the bottom of the mirrored 4×4 block (i.e. quads 1702 and 1704); whereas the dashed line 1738 shows the transfer function $t_y$ which is multiplied with the initial weights for the dy coefficient for the quads on the top of the mirrored 4×4 block (i.e. quads 1706 and 1708). As shown in FIG. 17*c*, the transfer function $t_y$ for a 2×2 quad of pixels: (i) is zero at the centre of the 2×2 quad of pixels (e.g. the line 1736 passes through $t_y=0$ at v=2, and e.g. the line 1738 passes through $t_y=0$ at v=0), (ii) has a magnitude of one at each of the pixel positions of the 2×2 quad of pixels (e.g. the line 1736 passes through $t_y=-1$ at v=2.5 and through $t_y=+1$ at v=1.5, and e.g. the line 1738 passes through $t_y=-1$ at v=+0.5 and through $t_y=+1$ at v=−0.5), and (iii) is linearly extrapolated out to the edges of the area represented by the 2×2 quad of pixels, such that it lies in the range [−2, +2] (e.g. the line 1736 has a value of $t_y=-2$ at the bottom edge of the 4×4 block and has a value of $t_y=+2$ in the centre of the 4×4 block, and e.g. the line 1738 has a value of $t_y=+2$ at the top edge of the 4×4 block and has a value of $t_y=-2$ in the centre of the 4×4 block). Beyond the top and bottom edges of the area represented by a 2×2 quad of pixels, the transfer function $t_y$ for the 2×2 quad of pixels is clamped to its value on the nearest edge of that area. For example, the line 1736 is clamped at $t_y=+2$ above the centre of the 4×4 block of pixels, and the line 1738 is clamped at $t_y=-2$ below the centre of the 4×4 block of pixels.

If the position at which the decoded value is to be determined is within the footprint of the "00" pixel in the 2×2 quad 1508 then two mirroring operations may be performed: (i) a mirroring operation through a horizontal axis through the centre of the 4×4 block (e.g. as described above with reference to FIGS. 16*a* to 16*c*), and (ii) a mirroring operation through a vertical axis through the centre of the 4×4 block (e.g. as described above with reference to FIGS. 17*a* to 17*c*). After the two mirroring operations, the position at which the decoded value is to be determined is within a footprint of a "00" pixel in a 2×2 quad which is then in the top left quadrant of the 4×4 block of pixels.

We now provide a detailed example of how the weights may be determined by the filter parameter setup module 1312. The minor LOD ($p_\lambda$) and the major LOD ($p_\mu$) parameters received at the filter parameter setup module 1312 are shifted to determine a shifted minor LOD parameter ($p'_\lambda$) and a shifted major LOD parameter ($p'_\lambda$) such that $p'_\lambda=\frac{3}{4}p_\lambda+\frac{1}{4}$ and $p'\mu, =\frac{1}{4}$, where the values of $p'_\lambda$ and $p'_\mu$ may be rounded in accordance with a rounding mode, e.g. a round to nearest mode. The above shifting operation has been designed to better map the filtering response to the expected sampling characteristics of filtered textures (such as mipmaps) but in some examples may be skipped. In particular, since exact reconstruction of the source pixels is only possible when $p'_\lambda=p'_\mu=0$ and $p_\mu \geq p_\mu \geq 0$, an "interpolating" filter may skip the above shifting operation.

The values of $p'_\lambda$ and $p'_\mu$ are used to define the logarithmic anisotropic ratio $p_\alpha$, such that $p_\alpha=p'_\mu-p'_\lambda$. The direction of anisotropy is given in terms of the sine and cosine of the angle φ from the texture x axis:

$$s = \sin\varphi \text{ and } c = \begin{cases} -\sqrt{1-s^2} & \text{if } \operatorname{sgn}(\cos\varphi) \\ +\sqrt{1-s^2} & \text{otherwise} \end{cases}$$

The square of the sine $s^2$, weighted by the logarithmic anisotropic ratio $p_\alpha$, determines the xy axis variance correction $p_\delta$, such that $p_\delta=s^2\cdot p_\alpha$, where the value of $p_\delta$ may be rounded in accordance with a rounding mode, e.g. a round to nearest mode.

With this, the weights of the xy axes closest to the minor and major axes are determined as $w_\lambda$ and $w_\mu$ respectively as $w_\lambda=1-(p_\lambda+p_\delta)$ and $w_\mu=1-(p_\mu-p_\delta)$.

The sign of the cosine determines the correspondence between $w_\lambda$ and $w_\mu$ and $w_x$ and $w_y$, the axis coefficient weights:

$$(w_x, w_y) = \begin{cases} w_\lambda, w_\mu & \text{if } \operatorname{sgn}(\cos\varphi) \\ w_\mu, w_\lambda & \text{otherwise} \end{cases}$$

The sine of twice the angle φ (2sc), weighted by the logarithmic anisotropic ratio $p_\alpha$, determines the (scaled) xy covariance weight $w_{xy}$, such that $w_{xy}=2\cdot s\cdot c\cdot p_\alpha$ The three weights $w_x$, $w_y$ and $w_{xy}$ may be used as the weights for the dx, dy and dxy coefficients respectively. As described above, in some examples, the weights are multiplied by transfer functions before being used as the weights for the dx, dy and dxy coefficients. An example of how this can be done by the filter parameter setup module 1312 is now described in order to determine sets of weights for the dx, dy and dxy coefficients for each pixel quad in a 4×4 block of pixels, as well as modifying the input interpolation weights (u, v) to feed to the bilinear interpolation unit 1314.

Since the interpolation patch (e.g. the area 1510 shown in FIG. 15*a*) has corners defined at the centroids for four contiguous pixel quads, the interpolating coordinates lie in the semi-open interval [0,2). The bilinear interpolation unit 1314, supplied with parameters in fractional fixed point (non unorm), can only apply integral weighting to at most one corner sample. The coordinates are therefore mirrored (as described above) such that the interpolation point has coordinates in the closed interval [0,1]. Values $s_x$ and $s_y$ can be determined to indicate whether the block of pixels is to be mirrored or not. In particular:

$$s_x = \begin{cases} -1 & \text{if } u > 1 \\ +1 & \text{otherwise} \end{cases} \text{ and } s_x = \begin{cases} -1 & \text{if } v > 1 \\ +1 & \text{otherwise} \end{cases}.$$

A value of $s_x=-1$ means that the block of pixels is mirrored across a vertical axis (e.g. as shown in FIG. 16*a*) and a value of $s_x=+1$ means that the block of pixels is not mirrored across a vertical axis. A value of $s_y=-1$ means that the block of pixels is mirrored across a horizontal axis (e.g. as shown in FIG. 17*a*) and a value of $s_y=+1$ means that the block of pixels is not mirrored across a horizontal axis. Since the pixel quads must also be mirrored, these operations are recorded and output as mirror_x and mirror_y respectively:

$$\text{mirror\_x} = \begin{cases} \text{true} & \text{if } \operatorname{sgn}(s_x) \\ \text{false} & \text{otherwise} \end{cases} \text{ and } \text{mirror\_y} = \begin{cases} \text{true} & \text{if } \operatorname{sgn}(s_y) \\ \text{false} & \text{otherwise} \end{cases}$$

where the Boolean function sgn( ) returns true for negative arguments and returns false for positive arguments.

The mirrored coordinates $u_{mirror}$ and $v_{mirror}$ are then given (in units of pixels) as:

$$u_{mirror} = \begin{cases} 2-u & \text{if } \operatorname{sgn}(s_x) \\ u & \text{otherwise} \end{cases} \text{ and } v_{mirror} = \begin{cases} 2-v & \text{if } \operatorname{sgn}(s_y) \\ v & \text{otherwise} \end{cases}.$$

The global coefficient weights $w_x$, $w_y$ and $w_{xy}$ are used to control the strength of the dx, dy and dxy coefficients associated with each pixel quad in the 4×4 patch. As described above the transfer functions are used to linearly extrapolate the dx and dy coefficients over the patch, saturating at the vertical and horizontal mirror lines respectively:

$$(w_{x0}, w_{x1}) = (2s_x \cdot w_x \cdot u_{mirror}, -2s_x \cdot w_x) \text{ and } (w_{y0}, w_{y1}) = (2s_y \cdot w_y \cdot v_{mirror}, -2s_y \cdot w_y)$$

Note that the $s_x$ and $s_y$ terms ensures the correct sign is applied to the dx and dy coefficients on decode.

The common dx weight for the (mirrored if mirror_x) top left and bottom left pixel quad is output as $w_{x0}$.

The common dx weight for the (mirrored if mirror_x) top right and bottom right pixel quad is output as $w_{x1}$.

The common dy weight for the (mirrored if mirror_y) top left and top right pixel quad is output as $w_{y0}$.

The common dy weight for the (mirrored if mirror_y) bottom left and bottom right pixel quad is output as $w_{y1}$.

The dxy coefficients undergo quadratic extrapolation, to which a constant contribution is added, weighted by the $w_{xy}$ coefficient, such that: $w_{xy00}=w_{xy}+w_{x0}-w_{y0}$, $w_{xy01}=w_{xy}+w_{x0}-w_{y1}$, $w_{xy10}=w_{xy}+w_{x1}-w_{y0}$ and $w_{xy11}=w_{xy}+w_{x1}-w_{y1}$ The dxy weights for the (mirrored if mirror_x/mirror_y) top left pixel quad, top right pixel quad, bottom left pixel quad and bottom right pixel quad are output as $w_{xy00}$, $w_{xy10}$, $w_{xy01}$ and $w_{xy11}$ respectively.

The modified bilinear interpolation factors $u_{mirror}$ and $v_{mirror}$ ensure that pixel quads are independently reconstructed at full resolution (by disabling interpolation) and that their dc coefficients employ ordinary bilinear interpolation, when dx, dy and dxy are zeroed, by applying an outward bias to the coordinates (clamping to zero) proportional to the dx and dy weighting:

The interpolation factors are output for consumption by the bilinear filter unit as the output signals $u_{out}$ and $v_{out}$, such that $u_{out}=\max\{\frac{1}{4}(2_{u_{mirror}}+|w_{x0}|-2w_x), 0\}$ and $v_{out}=\max\{\frac{1}{4}(2_{v_{mirror}}+w_{y0}|-2w_y), 0\}$. By substituting the earlier expression for $|w_{x0}|$, we may write $u_{out}=\max\{\frac{1}{2}(u_{mirror}+w_x(u_{mirror}-1)), 0\}$, from which we see that $u_{out}=\frac{1}{2}u_{mirror}$ when $w_x=0$ (as in conventional (bi)linear interpolation), that $u_{out}=0$ when $u_{mirror}\leq w_x/1+w_x$ (indicating a region in which only the left half of the (mirrored) four quads is interpolated) and that $u_{out}=\frac{1}{2}$ whenever $u_{mirror}=1$ (such that a 50:50 blend is always applied on the vertical mirror line). Similarly, by substituting the earlier expression for $|w_{y0}|$, we may write $v_{out}=\max\{\frac{1}{2}(v_{mirror}+w_y(v_{mirror}-1)), 0\}$, from which we see that $v_{out}=\frac{1}{2}v_{mirror}$ when $w_y=0$ (as in conventional (bi)linear interpolation), that $v_{out}=0$ when $v_{mirror}\leq w_y/1+w_y$ (indicating a region in which only the top half of the (mirrored) four quads is interpolated) and that $u_{out}=\frac{1}{2}$ whenever $u_{mirror}=1$ (such that a 50:50 blend is always applied on the horizontal mirror line).

There are many example encoding formats described above, and the way in which the compressed data structure is to be decoded to determine the signs and exponents of the differential coefficients from the first portion of the compressed data structure and to determine the representation of the average coefficient from the second portion of the compressed data structure would be apparent to a skilled person having read the above description of the way in which the data is encoded into the compressed data structure in the different examples.

For example, the first set of bits (e.g. 506$_1$) of the first portion (e.g. 504) of the compressed data structure indicates the order of the magnitudes of the differential coefficients and may indicates how many of the differential coefficients are non-zero, so the first set of bits can be used by the decoding unit to determine how many of the differential coefficients are non-zero and to determine the ordering of the non-zero differential coefficients that are encoded in the compressed data structure in accordance with the encoding format used (as described above).

As described above, the second set of bits may comprise: (i) a first section (e.g. 507$_1$) which indicates a sign for each of the non-zero differential coefficients, and (ii) a second section (e.g. 507$_2$) which indicates an exponent for of the non-zero differential coefficients. So the decoding unit can use the second set of bits to determine the sign and exponent for each of the non-zero differential coefficients in accordance with the encoding format used (as described above). The first section is comprised of a first series of bits, which indicates a sign for each of said one or more of the differential coefficients which are non-zero, and the second section is comprised of a second series of bits, which indicates an exponent for each of said one or more of the differential coefficients which are non-zero, of the second set of bits.

As described above, if one or more of the differential coefficients are zero, the first section (e.g. $507_1$) may indicate a mantissa bit for the differential coefficient which has the largest magnitude. In this case, the determination of the result of the weighted sum of the differential coefficients and the average coefficient for the 2×2 quad of pixels that is performed in step S1406 comprises including two terms in the weighted sum for the differential coefficient which has the largest magnitude, the two terms being: (i) the weight for that differential coefficient shifted in accordance with the exponent for that differential coefficient, and (ii) the weight for that differential coefficient shifted in accordance with an amount that is one less than the exponent for that differential coefficient. In this way the weighted sum is still performed just as a sum of (up to three) shifted weights which is simple to implement in the decoding unit, and in particular does not include complex operations such as multiplication or division operations.

In some examples described above (e.g. with reference to FIG. 10), the second set of bits ($\mathbf{1006_2}$) comprises a single section which indicates a sign and an exponent for each of the one or more of the differential coefficients which are non-zero. In these examples, the decoding unit can use the second set of bits to determine the sign and exponent for each of the non-zero differential coefficients in accordance with the encoding format used (as described above). The single section of bits is comprised of a single series of bits that indicates a sign and an exponent for each of the one or more of the differential coefficients which are non-zero, of the second set of bits.

In some examples described above (e.g. with reference to FIGS. 6 to 10), each pixel in the block of pixels has a value in a plurality of channels (e.g. Red, Green, Blue channels), and the encoded differential coefficients of the Haar coefficients for the 2×2 quad of pixels in the compressed data structure represent a combination of differential channel coefficients determined for the respective channels. In these examples, the first portion of the compressed data structure is used to determine signs and exponents for one or more of the differential coefficients which are non-zero for each of the channels (in step S1402) in accordance with the encoding format used (as described above).

In some examples described above (e.g. with reference to FIG. 7), a third portion (e.g. 710) of the compressed data structure indicates a combining mode, from a set of predetermined combining modes, according to which the differential channel coefficients determined for the channels are combined to determine the encoded differential coefficients of the Haar coefficients for the 2×2 quad of pixels. In these examples, the decoding unit 1302 may identify the combining mode using the third portion of the compressed data structure in accordance with the encoding format used (as described above). Then the decoding unit 1302 may use the identified combining mode to determine the differential channel coefficients for each of the channels in accordance with the encoding format used (as described above).

In some examples described above (e.g. with reference to FIGS. 6 and 9), the plurality of channels comprise Red, Green and Blue channels, and each pixel in the block of pixels has a further value in an Alpha channel. In these examples, the decoding unit 1302 may decode the alpha channel separately to the Red, Green and Blue channels in accordance with the encoding format used (as described above).

In some examples described above (e.g. with reference to FIGS. 9 and 10) the block of pixels is a 4×4 block of pixels comprising four 2×2 quads of pixels, wherein the compressed data structure comprises a first portion (e.g. 1004) for each of the 2×2 quads of pixels which is determined using differential coefficients for that 2×2 quad of pixels. The second portion (e.g. 1008) of the compressed data structure encodes a set of L1 Haar coefficients for a 2×2 quad of coefficients represented by the average coefficients for each of the 2×2 quads of pixels, wherein the set of L1 Haar coefficients comprises a plurality of L1 differential coefficients and an L1 average coefficient. A first sub-portion of the second portion (e.g. 1008) of the compressed data structure encodes the L1 differential coefficients for the 2×2 quad of coefficients and comprises: (i) a first set of bits which indicates an order of the magnitudes of the L1 differential coefficients, and (ii) a second set of bits which indicates a sign and an exponent for each of one or more of the L1 differential coefficients which are non-zero. A second sub-portion of the second portion (e.g. 1008) of the compressed data structure encodes the L1 average coefficient for the 2×2 quad of coefficients. In this example, the decoding unit 1302 uses the first portion (e.g. 1004) of the compressed data structure for each of the 2×2 quads of pixels to determine signs and exponents for one or more of the differential coefficients which are non-zero for each of the 2×2 quads of pixels in accordance with the encoding format used (as described above). The decoding unit 1302 uses the second portion of the compressed data structure to determine representations of the average coefficients for each of the 2×2 quads of pixels by: (i) using the first sub-portion of the second portion of the compressed data structure to determine signs and exponents for said one or more of the L1 differential coefficients which are non-zero in accordance with the encoding format used (as described above), (ii) using the second sub-portion of the second portion of the compressed data structure to determine a representation of the L1 average coefficient for the 2×2 quad of coefficients in accordance with the encoding format used (as described above), and (iii) determining the result of a weighted sum of the L1 differential coefficients and the L1 average coefficient for the 2×2 quad of coefficients using: (i) the determined signs and exponents for said one or more of the L1 differential coefficients which are non-zero, (ii) the determined representation of the L1 average coefficient, and (iii) respective weights for the L1 differential coefficients. For each of the 2×2 quads of pixels, the respective weights for the L1 differential coefficients are set such that the determined result of the weighted sum provides the determined representation of the average coefficient for that 2×2 quad of pixels.

Figure 18:
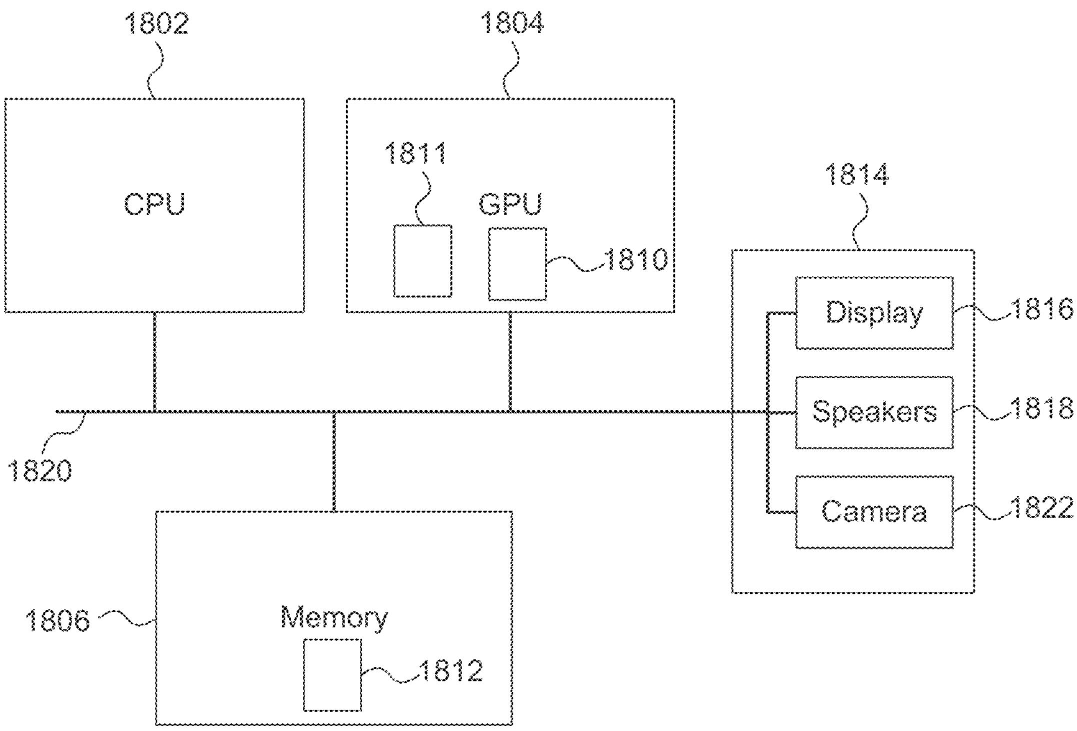
FIG. 18 shows a computer system in which an encoding and/or decoding unit is implemented.

FIG. 18 shows a computer system in which the encoding and/or decoding units described herein may be implemented. The computer system comprises a CPU 1802, a GPU 1804, a memory 1806 and other devices 1814, such as a display 1816, speakers 1818 and a camera 1822. An encoding and/or decoding unit 1810 (corresponding to encoding unit 202, 602 or 902 or the decoding unit 1102 or 1302) is implemented on the GPU 1804, as well as a Neural Network Accelerator (NNA) 1811. In other examples, the encoding and/or decoding unit 1810 may be implemented on the CPU 1802 or within the NNA 1811 or as a separate processing unit in the computer system. The components of the computer system can communicate with each other via a communications bus 1820. A store 1812 (corresponding to memory 204, 604, 904, 1104 or 1304) is implemented as part of the memory 1806.

The encoding and/or decoding units (202, 602, 902, 1102 and/or 1302) are shown as comprising a number of functional blocks. This is schematic only and is not intended to define a strict division between different logic elements of such entities. Each functional block may be provided in any suitable manner. It is to be understood that intermediate values described herein as being formed by an encoding unit or a decoding unit need not be physically generated by the encoding and/or decoding unit at any point and may merely represent logical values which conveniently describe the processing performed by the encoding and/or decoding unit between its input and output.

The encoding and/or decoding units described herein may be embodied in hardware on an integrated circuit. The encoding and/or decoding units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture an encoding and/or decoding unit configured to perform any of the methods described herein, or to manufacture an encoding and/or decoding unit comprising any apparatus described herein. An integrated circuit definition dataset may be, for example, an integrated circuit description.

Therefore, there may be provided a method of manufacturing, at an integrated circuit manufacturing system, an encoding and/or decoding unit as described herein. Furthermore, there may be provided an integrated circuit definition dataset that, when processed in an integrated circuit manufacturing system, causes the method of manufacturing an encoding and/or decoding unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an encoding and/or decoding unit will now be described with respect to FIG. 19.

Figure 19:
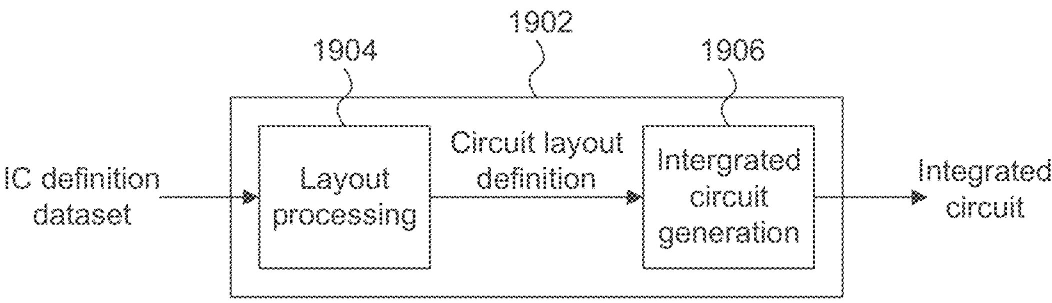
FIG. 19 shows an integrated circuit manufacturing system for generating an integrated circuit embodying an encoding and/or decoding unit.

FIG. 19 shows an example of an integrated circuit (IC) manufacturing system 1902 which is configured to manufacture an encoding and/or decoding unit as described in any of the examples herein. In particular, the IC manufacturing system 1902 comprises a layout processing system 1904 and an integrated circuit generation system 1906. The IC manufacturing system 1902 is configured to receive an IC definition dataset (e.g. defining an encoding and/or decoding unit as described in any of the examples herein), process the IC definition dataset, and generate an IC according to the IC definition dataset (e.g. which embodies an encoding and/or decoding unit as described in any of the examples herein). The processing of the IC definition dataset configures the IC manufacturing system 1902 to manufacture an integrated circuit embodying an encoding and/or decoding unit as described in any of the examples herein.

The layout processing system 1904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1904 has determined the circuit layout it may output a circuit layout definition to the IC generation system 1906. A circuit layout definition may be, for example, a circuit layout description.

The IC generation system 1906 generates an IC according to the circuit layout definition, as is known in the art. For example, the IC generation system 1906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1906 may be in the form of computer-readable code which the IC generation system 1906 can use to form a suitable mask for use in generating an IC.

The different processes performed by the IC manufacturing system 1902 may be implemented all in one location, e.g. by one party. Alternatively, the IC manufacturing system 1902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an encoding and/or decoding unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 19 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 19, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of decoding a compressed data structure to determine a decoded value within a computer graphics system, wherein the compressed data structure encodes a set of Haar coefficients for a quad of pixels of a block of pixels, wherein the set of Haar coefficients comprises a plurality of differential coefficients and an average coefficient, wherein a first portion of the compressed data structure encodes the differential coefficients for the quad of pixels, wherein the first portion of the compressed data structure indicates an order of the magnitudes of the differential coefficients, and indicates a sign and an exponent for each of one or more of the differential coefficients which are non-zero, and wherein a second portion of the compressed data structure encodes the average coefficient for the quad of pixels;

the method comprising:

using the first portion of the compressed data structure to determine signs and exponents for said one or more of the differential coefficients which are non-zero;

using the second portion of the compressed data structure to determine a representation of the average coefficient; and using: (i) the determined signs and exponents for said one or more of the differential coefficients which are non-zero, (ii) the determined representation of the average coefficient, and (iii) respective weights for the differential coefficients to determine the decoded value within the computer graphics system, the decoded value representing: (i) a value at a pixel position of the quad of pixels, or (ii) a filtered value at a position within the block of pixels.

2. The method of claim 1, wherein said using: (i) the determined signs and exponents for said one or more of the differential coefficients which are non-zero, (ii) the determined representation of the average coefficient, and (iii) respective weights for the differential coefficients to determine the decoded value comprises:

determining a result of a weighted sum of the differential coefficients and the average coefficient for the 2×2 quad of pixels using: (i) the determined signs and exponents for said one or more of the differential coefficients which are non-zero, (ii) the determined representation of the average coefficient, and (iii) respective weights for the differential coefficients; and using the determined result to determine the decoded value.

3. The method of claim 2, wherein said determining the result of a weighted sum of the differential coefficients and the average coefficient for the quad of pixels comprises:

performing a binary shift of the weights in accordance with the determined exponents for the respective one or more of the differential coefficients which are non-zero; and summing the determined representation of the average coefficient and the shifted weights in accordance with the determined signs for the respective one or more of the differential coefficients which are non-zero.

4. The method of claim 2, wherein said determining the result of a weighted sum of the differential coefficients and the average coefficient for the quad of pixels does not involve performing any multiplication or division operations and does comprise adding a gamma correction term.

5. The method of claim 2, wherein the respective weights for the differential coefficients are predetermined, and wherein said using the determined result to determine the decoded value comprises using said determined result as the decoded value representing a value at a pixel position of the quad of pixels and wherein the steps of determining the result of a weighted sum of the differential coefficients and the average coefficient for the quad of pixels and using the determined result to determine the decoded value are performed four times for the respective four pixels of the quad of pixels, wherein the predetermined weights for the differential coefficients are different in each of the times that said steps are performed so that four decoded values representing values at the four pixel positions of the quad of pixels are determined.

6. The method of claim 1, further comprising determining the respective weights for the differential coefficients using a transfer function, based on a position relative to the quad of pixels, to model an output for different inputs;

wherein the weights are determined based on one or more of:

a position, relative to the quad of pixels, that the decoded value is to be determined;

an indication of a level of detail to be provided by the decoded value; and an indication of an amount and/or direction of anisotropy to be provided by the decoded value.

7. The method of claim 6, wherein the block of pixels is a 4×4 block of pixels comprising four 2×2 quads of pixels, wherein for each of the four 2×2 quads of pixels a result of a weighted sum of the differential coefficients and the average coefficient for that 2×2 quad of pixels is determined, and wherein the four determined results for the respective four 2×2 quads of pixels are combined to determine the decoded value for the block of pixels.

8. The method of claim 7, wherein the four determined results for the respective four 2×2 quads of pixels are combined to determine the decoded value for the block of pixels by performing bilinear interpolation on the four determined results.

9. The method of claim 7, wherein if a position at which the decoded value is to be determined is within an area that is representable by considering the pixels of a single one of the 2×2 quads of pixels in the block of pixels then the decoded value for the block of pixels is equal to the determined result for that single 2×2 quad of pixels, and if a position at which the decoded value is to be determined is not within an area that is representable by considering the pixels of a single one of the 2×2 quads of pixels in the block of pixels then the decoded value for the block of pixels is the result of a weighted sum of two or more of the determined results for the 2×2 quads of pixels.

10. The method of claim 7, wherein said determining the respective weights for the differential coefficients comprises:

determining initial weights based on an indication of a level of detail to be provided by the decoded value, an indication of an amount of anisotropy and an indication of a direction of anisotropy; and multiplying the determined initial weights by respective transfer functions to determine the weights for the differential coefficients, wherein each of the transfer functions is based on a position, relative to the 2×2 quad of pixels, that the decoded value is to be determined, and wherein each of the transfer functions: (i) is zero at a centre of the 2×2 quad of pixels, (ii) has a magnitude of one at each of the pixel positions of the 2×2 quad of pixels, and (iii) is extrapolated out to the edges of an area represented by the 2×2 quad of pixels.

11. The method of claim 7, wherein the pixels within the 4×4 block of pixels are selectively mirrored about neither, one or both of: (i) a horizontal axis passing through a centre of the block of pixels, and (ii) a vertical axis passing through the centre of the block of pixels, so that the position at which the decoded value is to be determined is within a particular quadrant of the block of pixels.

12. The method of claim 1, wherein the first portion of the compressed data structure comprises:

a first section which indicates a sign for each of said one or more of the differential coefficients which are non-zero; and a second section which indicates an exponent for each of said one or more of the differential coefficients which are non-zero, or the first portion of the compressed data structure comprises a single section which indicates a sign and an exponent for each of the one or more of the differential coefficients which are non-zero.

13. The method of claim 12, when the first portion of the compressed data structure comprises the first section and the second section, wherein if one or more of the differential coefficients are zero, the first section indicates a mantissa bit for the differential coefficient which has a largest magnitude, wherein said using: (i) the determined signs and exponents for said one or more of the differential coefficients which are non-zero, (ii) the determined representation of the average coefficient, and (iii) respective weights for the differential coefficients to determine the decoded value comprises:

determining a result of a weighted sum of the differential coefficients and the average coefficient for the 2×2 quad of pixels using: (i) the determined signs and exponents for said one or more of the differential coefficients which are non-zero, (ii) the determined representation of the average coefficient, and (iii) respective weights for the differential coefficients; and using the determined result to determine the decoded value, wherein said determining the result of a weighted sum of the differential coefficients and the average coefficient for the quad of pixels comprises including two terms in the weighted sum for the differential coefficient which has the largest magnitude, the two terms being: (i) a weight for that differential coefficient shifted in accordance with the exponent for that differential coefficient, and (ii) a weight for that differential coefficient shifted in accordance with an amount that is one less than the exponent for that differential coefficient.

14. The method of claim 1, wherein each pixel in the block of pixels has a value in a plurality of channels, and wherein the encoded differential coefficients of the Haar coefficients for the quad of pixels in the compressed data structure represent a combination of differential channel coefficients determined for the respective channels, wherein said using the first portion of the compressed data structure to determine signs and exponents for said one or more of the differential coefficients which are non-zero comprises determining signs and exponents for one or more differential channel coefficients for each of the channels.

15. The method of claim 14, wherein a third portion of the compressed data structure indicates a combining mode, from a set of predetermined combining modes, according to which the differential channel coefficients determined for the channels are combined to determine the encoded differential coefficients of the Haar coefficients for the quad of pixels, and wherein the method comprises identifying the combining mode using the third portion of the compressed data structure and using the identified combining mode to determine the differential channel coefficients for each of the channels.

16. The method of claim 1, wherein the block of pixels is a 4×4 block of pixels comprising four 2×2 quads of pixels, wherein the compressed data structure comprises a first portion for each of the 2×2 quads of pixels which is determined using differential coefficients for that 2×2 quad of pixels;

wherein the second portion of the compressed data structure encodes a set of L1 Haar coefficients for a 2×2 quad of coefficients represented by the average coefficients for each of the 2×2 quads of pixels, wherein the set of L1 Haar coefficients comprises a plurality of L1 differential coefficients and an L1 average coefficient, wherein a first sub-portion of the second portion of the compressed data structure encodes the L1 differential coefficients for the 2×2 quad of coefficients and comprises: (i) a first set of bits which indicates an order of the magnitudes of the L1 differential coefficients, and (ii) a second set of bits which indicates a sign and an exponent for each of one or more of the L1 differential coefficients which are non-zero, wherein a second sub-portion of the second portion of the compressed data structure encodes the L1 average coefficient for the 2×2 quad of coefficients, wherein the method comprises:

using the first portion of the compressed data structure for each of the 2×2 quads of pixels to determine signs and exponents for one or more of the differential coefficients which are non-zero for each of the 2×2 quads of pixels; and using the second portion of the compressed data structure to determine representations of the average coefficients for each of the 2×2 quads of pixels by:

using the first sub-portion of the second portion of the compressed data structure to determine signs and exponents for said one or more of the L1 differential coefficients which are non-zero;

using the second sub-portion of the second portion of the compressed data structure to determine a representation of the L1 average coefficient for the 2×2 quad of coefficients; and determining the result of a weighted sum of the L1 differential coefficients and the L1 average coefficient for the 2×2 quad of coefficients using: (i) the determined signs and exponents for said one or more of the L1 differential coefficients which are non-zero, (ii) the determined representation of the L1 average coefficient, and (iii) respective weights for the L1 differential coefficients;

wherein, for each of the 2×2 quads of pixels, the respective weights for the L1 differential coefficients are set such that the determined result of the weighted sum provides the determined representation of the average coefficient for that 2×2 quad of pixels.

17. The method of claim 1, further comprising:

outputting the determined decoded value; and using the outputted decoded value, wherein said using the outputted decoded value comprises one or more of: (i) processing the outputted decoded value, (ii) transmitting the outputted decoded value, and (iii) storing the outputted decoded value in a memory.

18. A decoding unit which is implemented in hardware, the decoding unit configured to decode a compressed data structure to determine a decoded value within a computer graphics system, wherein the compressed data structure encodes a set of Haar coefficients for a quad of pixels of a block of pixels, wherein the set of Haar coefficients comprises a plurality of differential coefficients and an average coefficient;

wherein a first portion of the compressed data structure encodes the differential coefficients for the quad of pixels, wherein the first portion of the compressed data structure indicates an order of the magnitudes of the differential coefficients, and indicates a sign and an exponent for each of one or more of the differential coefficients which are non-zero;

wherein a second portion of the compressed data structure encodes the average coefficient for the quad of pixels;

wherein the decoding unit is configured to:

use the first portion of the compressed data structure to determine signs and exponents for said one or more of the differential coefficients which are non-zero;

use the second portion of the compressed data structure to determine a representation of the average coefficient;

use: (i) the determined signs and exponents for said one or more of the differential coefficients which are non-zero, (ii) the determined representation of the average coefficient, and (iii) respective weights for the differential coefficients to determine the decoded value within the computer graphics system, the decoded value representing: (i) a value at a pixel position of the quad of pixels, or (ii) a filtered value at a position within the block of pixels.

19. The decoding unit according to claim 18, further comprising a filter parameter setup module configured to determine the respective weights for differential coefficients using a transfer function, based on a position relative to the quad of pixels, to model an output for different inputs;

wherein the block of pixels is a 4×4 block of pixels comprising four 2×2 quads of pixels, and a decoder unit further comprises:

four decoder instances, each of which is configured to determine, for a respective one of the four 2×2 quads of pixels, a result of a weighted sum of the differential coefficients and the average coefficient for that 2×2 quad of pixels; and a bilinear interpolation unit configured to combine the four determined results for the respective four 2×2 quads of pixels to determine the decoded value for the block of pixels by performing bilinear interpolation on the four determined results.

20. A non-transitory computer readable storage medium having stored thereon an integrated circuit dataset definition that, when processed in an integrated circuit manufacturing system, configures the integrated circuit manufacturing system to manufacture a decoding unit implemented in hardware which is configured to decode a compressed data structure to determine a decoded value within a computer graphics system, wherein the compressed data structure encodes a set of Haar coefficients for a quad of pixels of a block of pixels, wherein the set of Haar coefficients comprises a plurality of differential coefficients and an average coefficient, wherein a first portion of the compressed data structure encodes the differential coefficients for the quad of pixels wherein the first portion of the compressed data structure indicates an order of the magnitudes of the differential coefficients, and indicates a sign and an exponent for each of one or more of the differential coefficients which are non-zero;

wherein a second portion of the compressed data structure encodes the average coefficient for the quad of pixels, wherein the decoding unit is configured to:

use the first portion of the compressed data structure to determine signs and exponents for said one or more of the differential coefficients which are non-zero;

use the second portion of the compressed data structure to determine a representation of the average coefficient;

use: (i) the determined signs and exponents for said one or more of the differential coefficients which are non-zero, (ii) the determined representation of the average coefficient, and (iii) respective weights for the differential coefficients to determine the decoded value within the computer graphics system, the decoded value representing: (i) a value at a pixel position of the quad of pixels, or (ii) a filtered value at a position within the block of pixels.

* * * * *